April 16, 1963  C. B. HATFIELD ETAL  3,085,391
AUTOMATIC HYDRAULIC TRANSMISSION
Filed Oct. 13, 1960  28 Sheets-Sheet 1

April 16, 1963  C. B. HATFIELD ETAL  3,085,391
AUTOMATIC HYDRAULIC TRANSMISSION
Filed Oct. 13, 1960  28 Sheets-Sheet 4
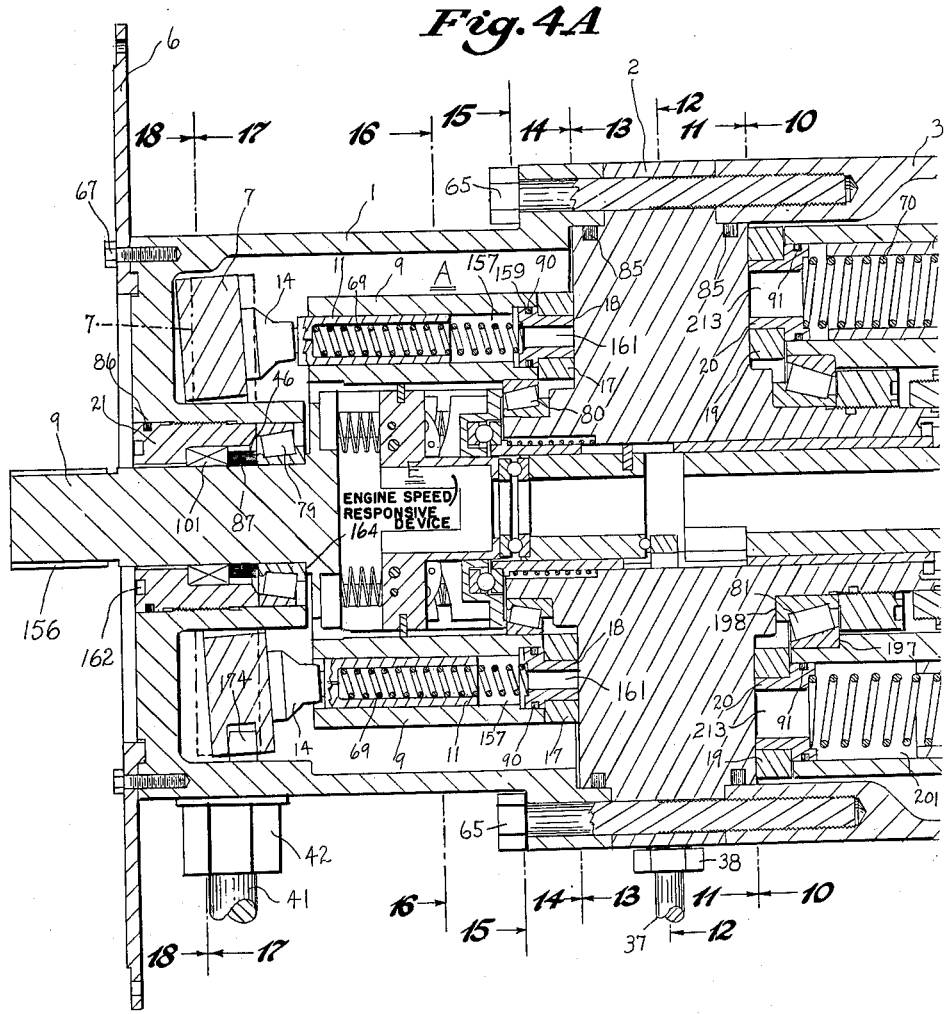
Fig. 4A
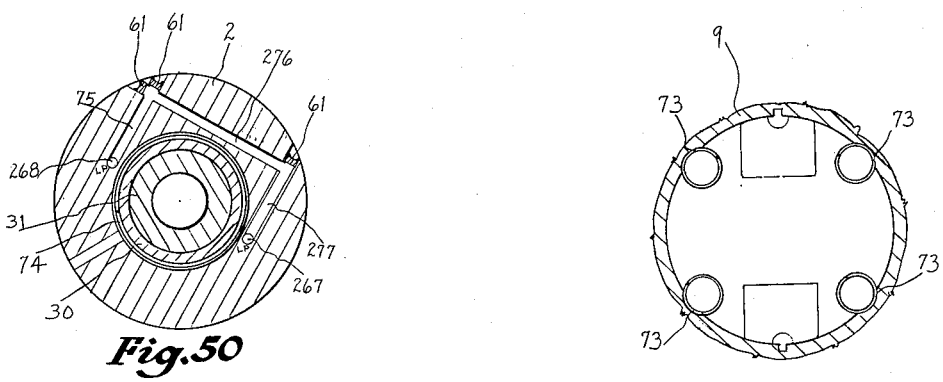
Fig. 50
Fig. 63

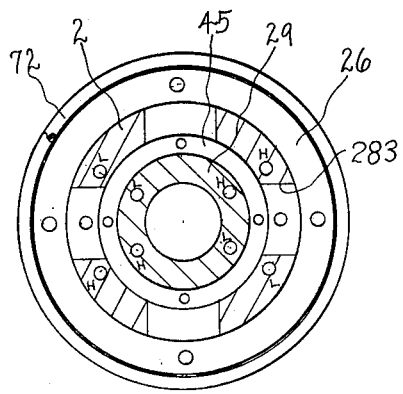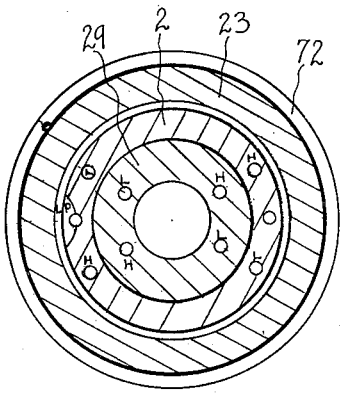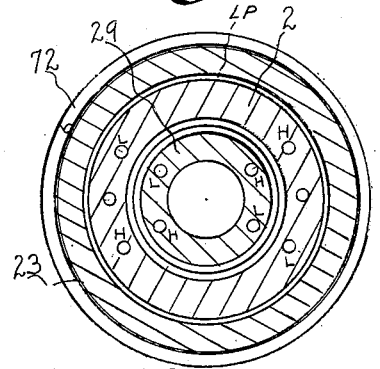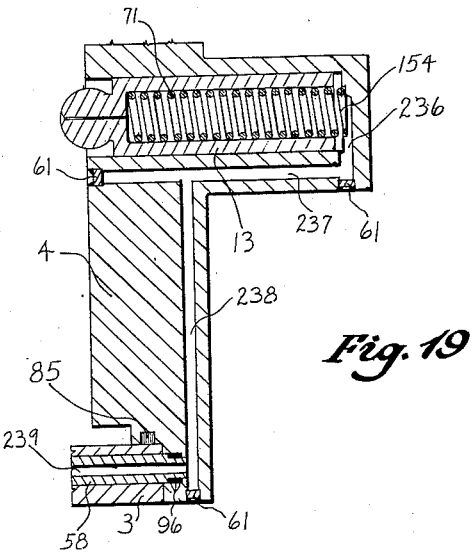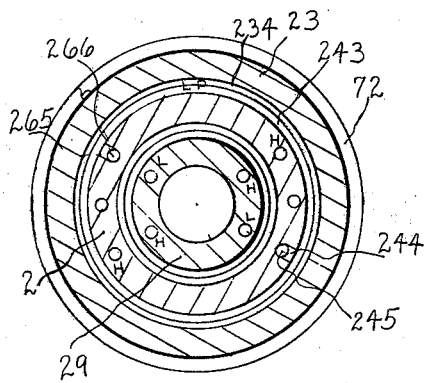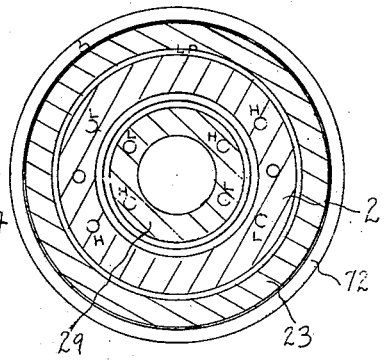

April 16, 1963 C. B. HATFIELD ETAL 3,085,391
AUTOMATIC HYDRAULIC TRANSMISSION
Filed Oct. 13, 1960 28 Sheets-Sheet 22

April 16, 1963 C. B. HATFIELD ETAL 3,085,391
AUTOMATIC HYDRAULIC TRANSMISSION
Filed Oct. 13, 1960 28 Sheets-Sheet 23
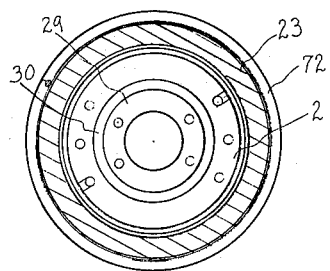
Fig.28
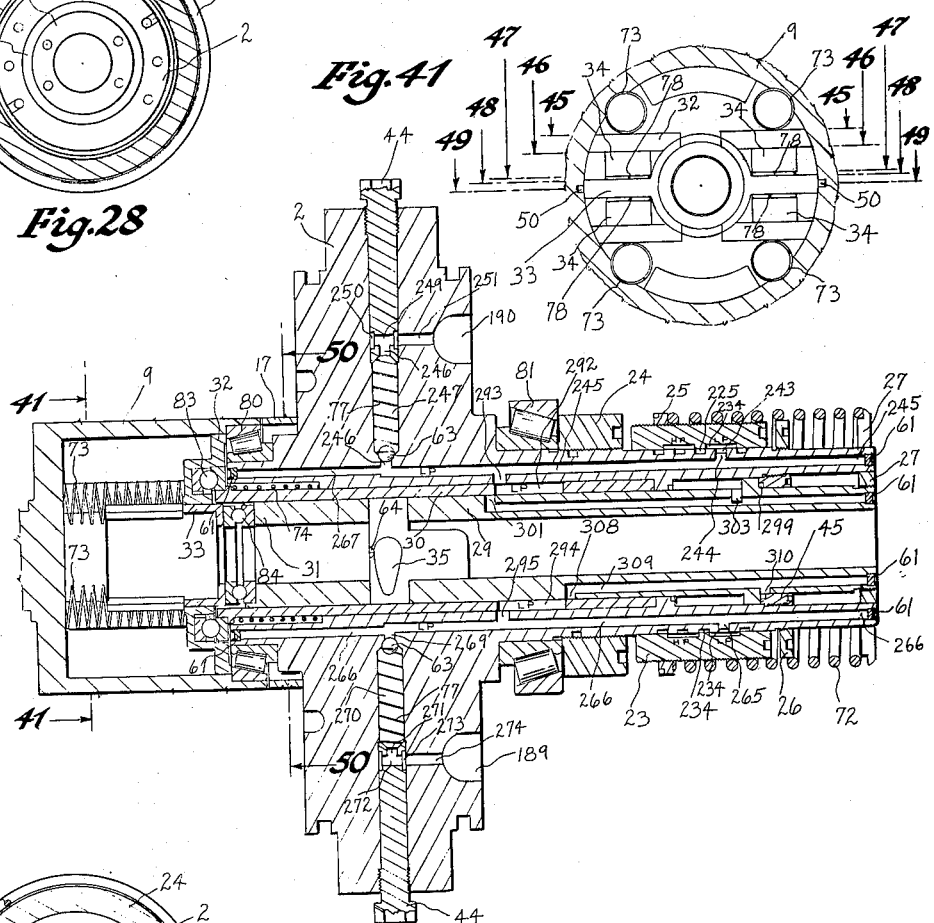
Fig.41
Fig.39
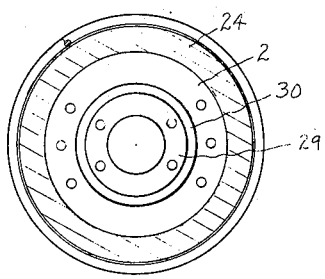
Fig.31

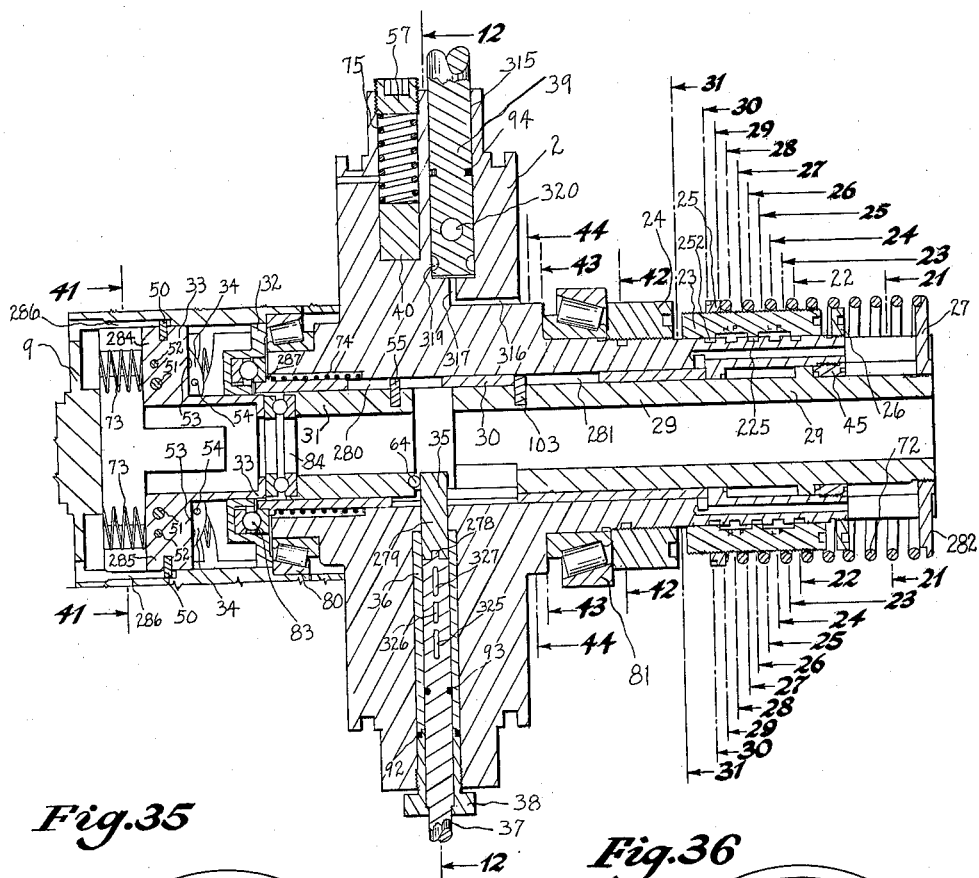
Fig.33
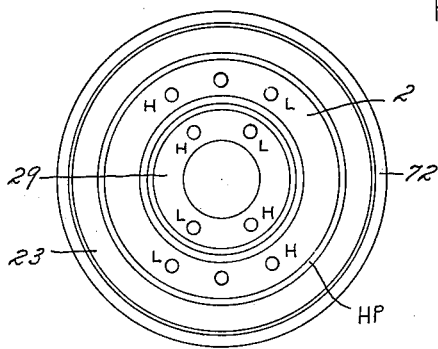
Fig.35
Fig.36

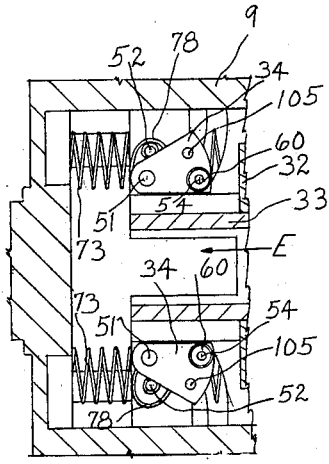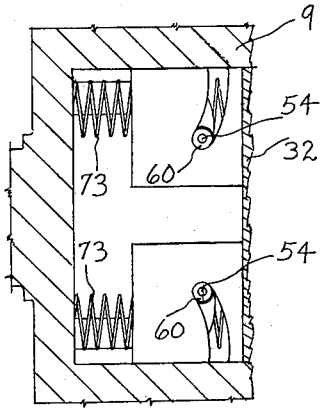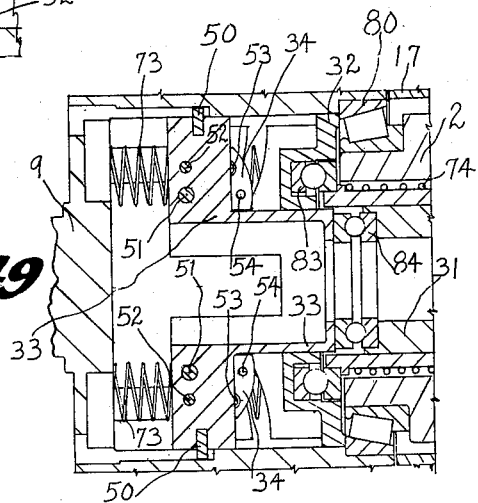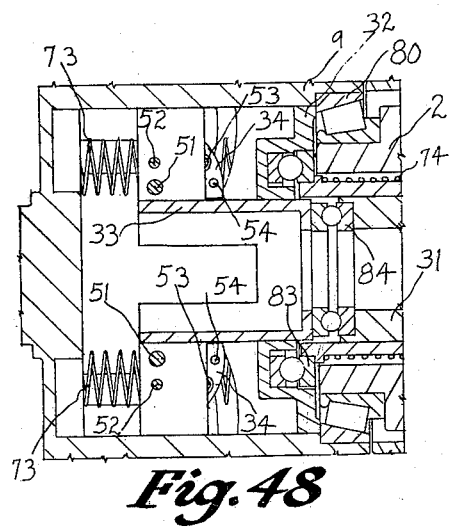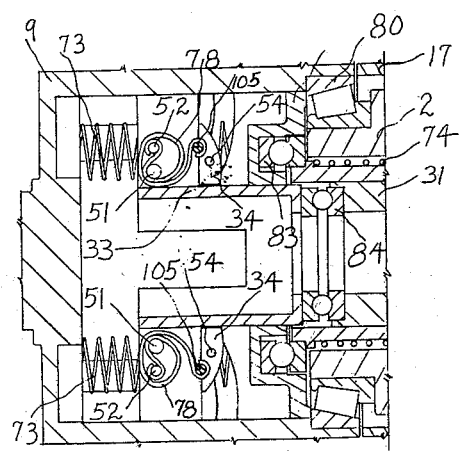

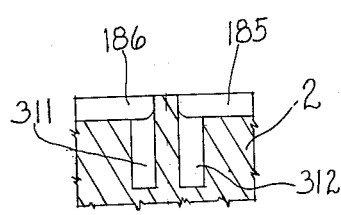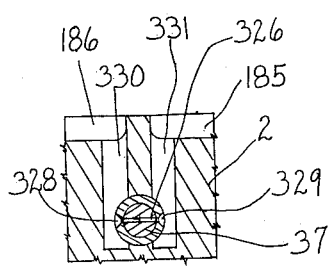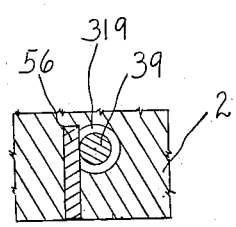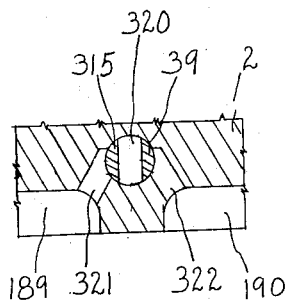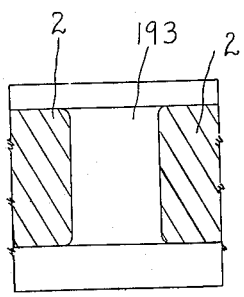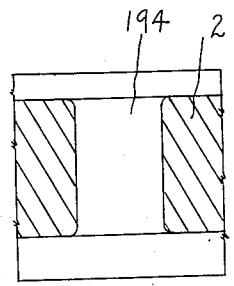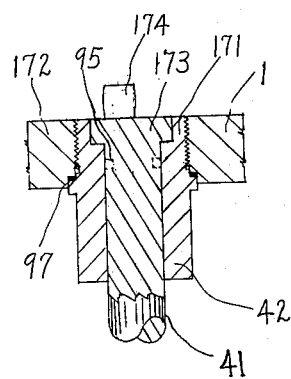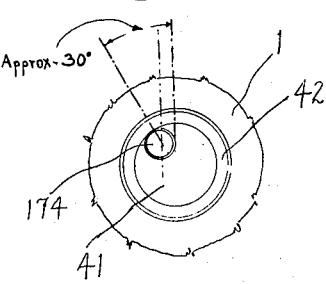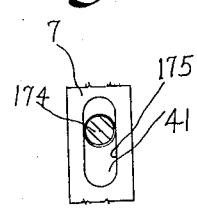

United States Patent Office 3,085,391
Patented Apr. 16, 1963

3,085,391
AUTOMATIC HYDRAULIC TRANSMISSION
Cleburne B. Hatfield and Maximilian R. Speiser, New York, N.Y., and Arra S. Avakian, Weston, Mass., assignors to S. & M. Products Company, Inc., New York, N.Y., a corporation of New York
Filed Oct. 13, 1960, Ser. No. 62,458
4 Claims. (Cl. 60—19)

This invention relates to hydraulic automatic power drives or transmissions, and particularly to hydraulic transmissions of the hydrostatic or the positive displacement type; which are adapted to all types of vehicles which are driven by an engine, including both the wheeled vehicle type and of other types of vehicles to which this invention may be applied.

Among the objects of this invention is to provide a transmission which has a performance, in fuel saving, acceleration, ease of driving and other performance of the vehicle, which is superior to that of other transmission now in use.

With the transmission of the present invention, during all forward driving of the vehicle, the performance of the automatic transmission is such that the engine of the vehicle is automatically, continuously, and at all times, loaded at its torque of maximum efficiency. This transmission constantly and continuously adjusts the power or speed ratio between the engine and the drive shaft of the vehicle so that the exact and proper power ratio is provided the engine at all times.

Another object of this invention is to provide an automatic transmission of the hydrostatic type which will have an infinite number of torque ratios, as a result of the functioning of the mechanism, through hydraulic means only. Furthermore, this infinite number of power or speed ratios will be provided between wide limits.

With the unique and novel concept and construction of this hydraulic transmission, very large ranges between high and low power ratio may be easily provided; ratios with a range of between 1 to 1 and 1 to 20 or even a range from 1 to 1 and 1 to 40, maybe readily and conveniently provided.

Another object herein is to provide an automatic and continuous hydraulic control of this power ratio so that the ratio may be varied in accordance with the exact road conditions or engine condition. This permits the precisely correct power ratio to be provided at all times.

According to the invention, a unique sensing device is included which will, at all times, sense the torque on the drive shaft of the vehicle and detect whether or not the torque on the drive shaft is increasing or decreasing as the road conditions or cross-country conditions, vary. As these conditions vary, any variations, as to whether the torque on the vehicle drive shaft is increasing or decreasing, are instantly detected and the power ratio varied in accordance with the change in torque. As examples of conditions which change the torque on the drive shaft, we may recite an increase, or decrease, in steepness of the grade of the roadway or terrain and/or the increase, or decrease, of the sand or mud the vehicle is encountering.

Further, in addition to detecting a change in torque on the drive shaft of the vehicle, the transmission also instantly and continuously detects or senses the conditions or status of the engine as to its parameters and/or capabilities or producing torque. These parameters include throttle position, or rate of fuel consumption, speed of rotation of the engine and/or other parameters which determine the torque, which the vehicle is best capable of providing at the moment.

These factors or parameters are all continuously detected or sensed, and taken into consideration by the automatic transmission and entered into, and participate in, the changing of the torque ratio. The end result is that between the crank shaft of the engine and the drive shaft there is interposed the transmission of the present invention; which after taking all the above factors and parameters into consideration, determines instantly and continuously the exact power ratio, which is the correct power ratio at the given instant. This transmission then almost instantly provides this correct power ratio. As a result, the engine is at all times loaded at its most desirable torque, or its torque of maximum efficiency.

A further object of this invention is to provide an automatic transmission which is so uniquely arranged, and so instant and continuous in its functioning and adaptability, that the transmission will permit the engine to rapidly accelerate in its speed of rotation, largely independently of the forward motion of the vehicle. This capability of rapid increase in the speed of rotation of the engine permits the engine, when the fuel feeding foot throttle is pressed quickly downward, to rapidly increase the horsepower output of the engine as a result of this increase in engine speed; without hampering this quick acceleration of engine speed, which hampering would result if the engine was required to simultaneously accelerate the heavy vehicle in forward linear movement. This sharp increase in horsepower output, having been attained, is in turn then promptly utilized by the engine and by this transmission, to rapidly increase the rotational speed of the engine. The end result of this unique arrangement is to make possible the rapid acceleration of a heavy vehicle in forward linear velocity to a much greater extent, in proportion to the size of the engine, than is possible with any other transmission. The transmission, in other words, by its functioning, provides or makes possible a remarkable "pickup" or acceleration capability to the vehicle.

Another object of the invention is to provide unique, and novel all hydraulic means, for engaging or disengaging the vehicle, through the transmission, to the engine for forward travel, for throwing the transmission into "neutral" position, so the engine may then rotate without driving the vehicle. This eliminates wear and provides a trouble-free arrangement.

A further object of the invention is to provide an all hydraulic reversing means, without springs, gears, clutches or other similar parts or components, which not only permits a trouble-free reversing arrangement, without maintenance or wear, but also provides a smooth reversability of the transmission without shock or strain, and bility of the transmission without clutching action. The vehicle may be wholly without clutching action. The vehicle may be thrown into reverse while in forward motion, without shock or damage and by doing so, the vehicle may be made to quickly decelerate in its forward motion, come to a dead stop and then, if desired, quickly accelerated in a reverse direction.

A further object herein is to provide a transmission of the hydrostatic type, which, unlike current commercially used transmissions, is fully positive in its action. Also, a further object is a transmission which may be used to achieve a measure of breaking action, when on a downgrade, by means of the vehicle driving the engine while coasting, as was possible in the conventional, formerly used, spur gear transmission. This feature has great desirability for convenience of driving and for saving wear, tear and replacement of parts, on vehicle brakes, which otherwise would be necessary.

Another object herein is to provide an automatic hydraulic transmission, comprised of an "A" end or hydraulic pump of a positive displacement type, and a variable displacement "B" end or hydraulic motor also of a positive displacement type. According to this invention, the hydraulic fluid from the "A" end or hydraulic pump, flows into the "B" end or hydraulic motor, and drives it; the fluid then returning to the "A" end, through passageways, forming a closed hydraulic circuit. The rotational force or torque, provided by the "B" end, thence rotates the drive shaft of the vehicle. Although the preferred form of this invention discloses an "A" end or pump, comprised of a multiplicity of axially disposed pistons, and a "B" end or motor, also comprised of a multiplicity of axially disposed pistons, with the "B" end capable of variable displacement; it is also understood that it is not required that the "A" end pump or the "B" end motor be of the axially disposed piston type. Other forms of positive type hydraulic pumps and motors may be used in this invention, such as radial type piston pumps and motors, or vane type pumps or motors, and the like, without departing from the spirit and concept of this invention.

A further object herein lies in the provision of hydraulic servo means to vary torque ratio by varying the displacement of the "B" end or hydraulic motor as a result of the combined parameters of the conditions confronting the engine at the instant, combined with the parameter which is determined by the torque on the drive shaft of the vehicle.

The overall torque ratio, provided by this transmission at a given instant, is determined by the instantaneous relationship established by a hydraulic servo system, which provides, by a first servo, an adjustment, as determined by the parameters or conditions of the engine; and which is superimposed on an adjustment, which is made by a second hydraulic servo, sensitive to the torque on the vehicle drive shaft. The result of the functioning of said two hydraulic servo, the one superimposed on the other, is to provide an overall adjustment and control of the displacement of the "B" end, or hydraulic motor. By the variation in displacement of this hydraulic motor, the overall relative displacement between the "A" end pump and the "B" end motor is varied and controlled. This provides the proper power ratio as provided by the transmission which is the proper and correct ratio at any and every given instant. The "A" end, or hydraulic pump, in the preferred form of this invention, is constant in its displacement, all variation in power ratio, through the wide limits of which the transmission is capable, being provided by varying the displacement of the "B" end or hydraulic motor.

A further object of this invention, as a result of the related functioning of the actions described above, is to provide a transmission, in which the correct determination of, and adjustment to, the correct power ratio is constant and continuous; and in which this adjustment in power ratio is exactly the right power ratio, at all times, to suit the engine and road conditions at the immediate moment. The result of the above is to provide that the engine is loaded at each instant, exactly as it should be, that it is never overloaded or underloaded and is loaded at all times, at its optimum torque, for its torque of maximum efficiency.

As the corollary of the above object, the engine functions at a greater efficiency, and at a greater fuel saving than is possible with other transmissions in use at the present time.

Another object of this invention is to provide a unique and novel hydraulic dousing or limiting mechanism for controlling the flow of hydraulic fluid between the "A" end, or hydraulic pump, and the "B" end or hydraulic motor. This unique hydraulic valving means may be appropriately described as a hydraulic commutator, whereby a flat type of rotary valve mechanism collects fluid under pressure on the "A" end or pump.

The rotary hydraulic commutator then transmits this fluid to short stationary hydraulic conduits or passageways through which this high pressure fluid then flows to the flat plate type of "B" end rotating hydraulic commutator. The "B" end hydraulic commutator then collects the high pressure fluid and transmits it to the cylinders of the "B" end motor. The high pressure fluid, after rotating the "B" end, or hydraulic motor, then returns as low pressure fluid through the low pressure side of the "B" end flat plate type hydraulic valve or commutator, thence through the low pressure return passageway, and thence through the "A" end flat plate type of hydraulic commutator and then to the low pressure or intake side of the "A" end hydraulic pump.

Another object of this invention is to provide a unique and novel arrangement and combination of parts, wherein the cylinders, the flat plate commutators, the passageways, the servo systems, and the like, are constantly and completely filled with the hydraulic fluid but, at the same time, the volumetric spaces in which the tilt plates of the "A" end pump, and the "B" end motor, respectively, rotate, are largely free and only partially filled with hydraulic fluid, to permit rotation of the "A" end shaft and the "B" end shaft without extensive efficiency losses, due to hydraulic turbulence. The overall leakage from the cylinders, and the system of fluid connecting passageways and the like, as subsequently shown, collects in a lower space which is located in the bottom portion of the transmission housing. All the hydraulic fluid in the high pressure passageways, which escapes from these passageways by leakage, flows to this low pressure fluid reservior or pool.

The hydraulic fluid leakage losses which occur in the high pressure side of the system are replaced in the closed system by intake valves, which permit fluid to be replenished from this reservior or pool and go into the low pressure side of the hydraulic circulatory system, when required, as will be subsequently fully described.

A further object of this invention is to provide a unique arrangement and configuration of parts wherein a substantial number of the parts, comprising the transmission, may be made of light materials, such as aluminum, resulting in a lighter total weight of the transmission unit. As a related object, a transmission of relatively small size, compactness, and of a light overall weight, is provided.

A further object of this invention is to provide a transmission which will, by its configuration, have a minimum of wear, and will require a minimum of maintenance.

Another object of this invention is to provide a transmission which is comprised of parts of such unique shape, configuration and interrelation, that the transmission may be manufactured by simple machine tools, by simple machining and manufacturing processes, thereby resulting in a lower economical cost per unit for manufacture of the transmission unit.

These and other objects, including the adaptation of this automatic transmission concept not only to vehicles driven by a single drive shaft, but also to wheeled vehicles with individual hydraulically driven wheels, will appear more fully upon consideration of the detailed description of the embodiment of the invention which follows. Although only one specific form of machine is described and illustrated in the accompanying drawings, it is especially understood that these drawings are for the purpose of illustration only and are not to be construed as defining the scope of the invention, for which latter purpose reference should be had to the appended claims.

Referring now to the drawings wherein like reference characters indicate like parts throughout the several views:

FIGURES 4A and 4B are an approximately vertical longitudinal section through the transmission, taken along the lines 4—4 of FIGURE 9.

FIGURES 6 to 18, inclusive are transverse sectional views through the transmission, taken along the respective section lines 6—6 to 18—18, inclusive on FIGURE 4.

Figure 6:
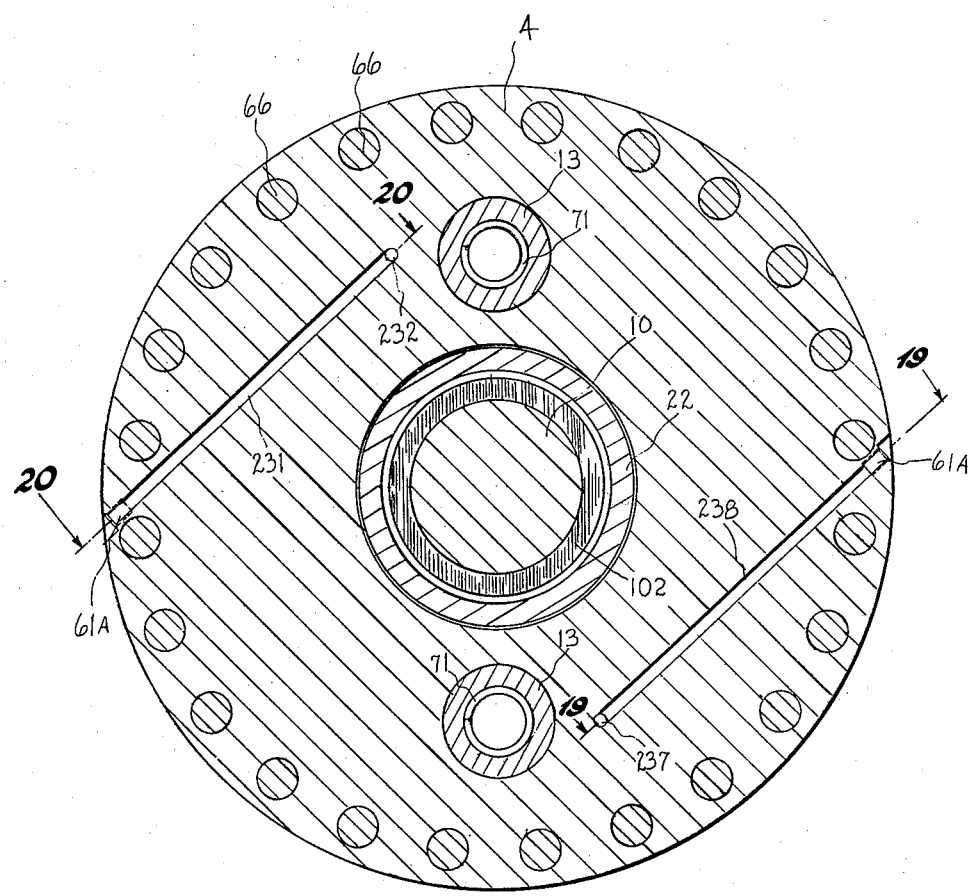
Figure 7:
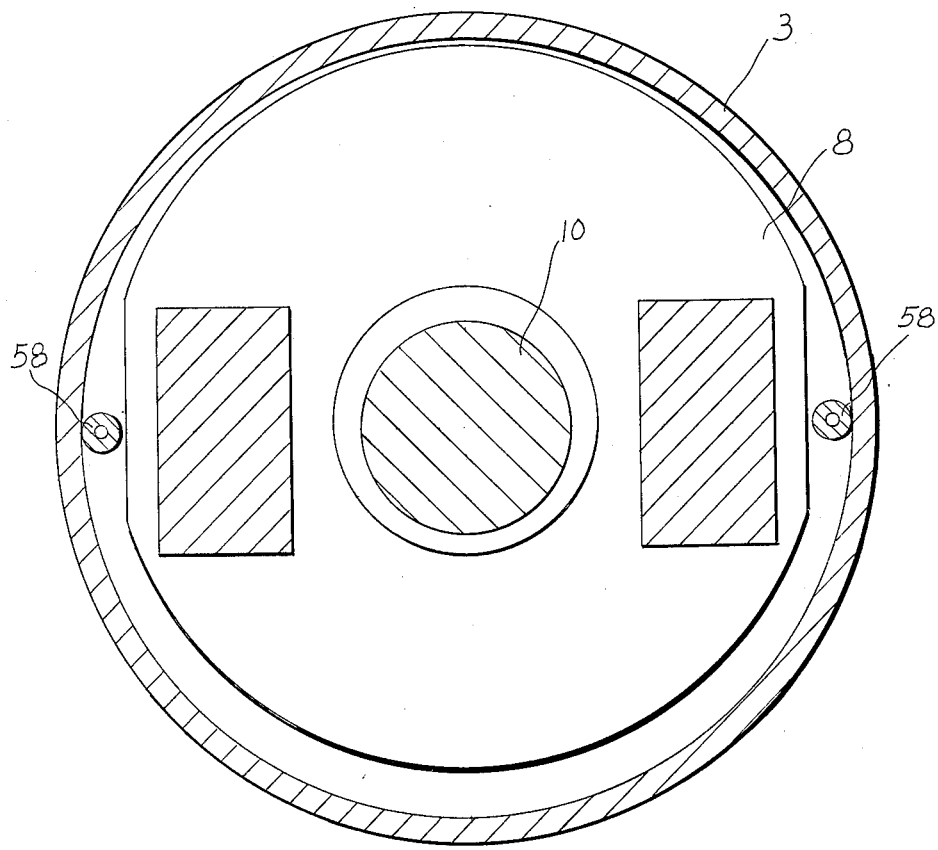
Figure 8:
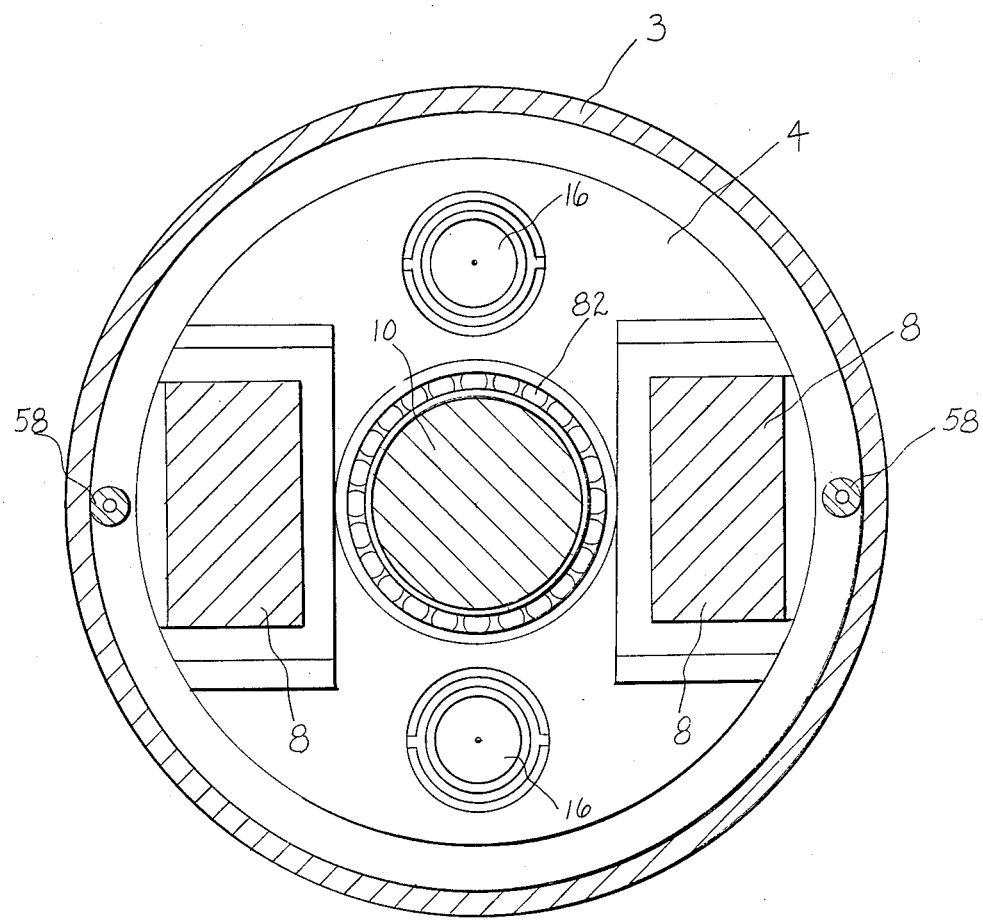

FIGURE 19 is a fragmentary longitudinal section taken along the lines 19—19 of FIGURE 6 showing hydraulic passageways to the right "B" end tilt plate control cylinder.

Figure 20:
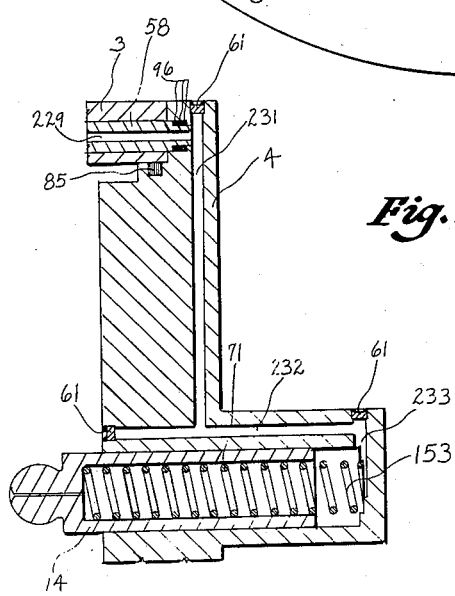

FIGURE 20 is a fragmentary longitudinal section taken along the lines 20—20 of FIGURE 6, showing hydraulic passageways to the left "B" end tilt plate control cylinder.

FIGURES 21 to 31, inclusive, are fragmentary transverse sectional views through the hydraulic servo mechanism, taken respectively along the lines 21—21 to 31, inclusive on FIGURE 33.

Figure 34:
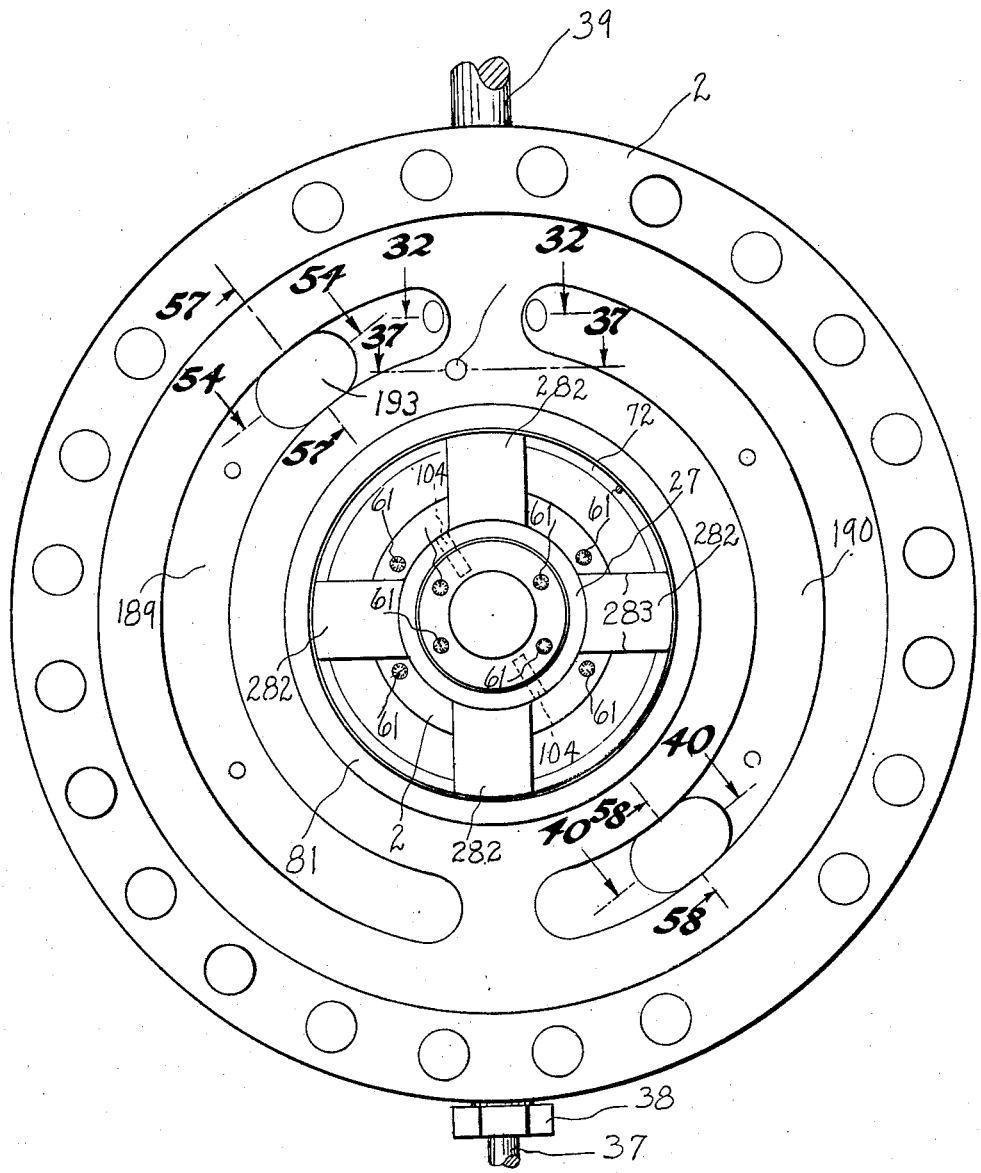

FIGURE 32 is a fragmentary transverse section showing the passageways through the hydraulic neutral mechanisms, taken along the lines 32—32 of FIGURE 34.

Figure 12:
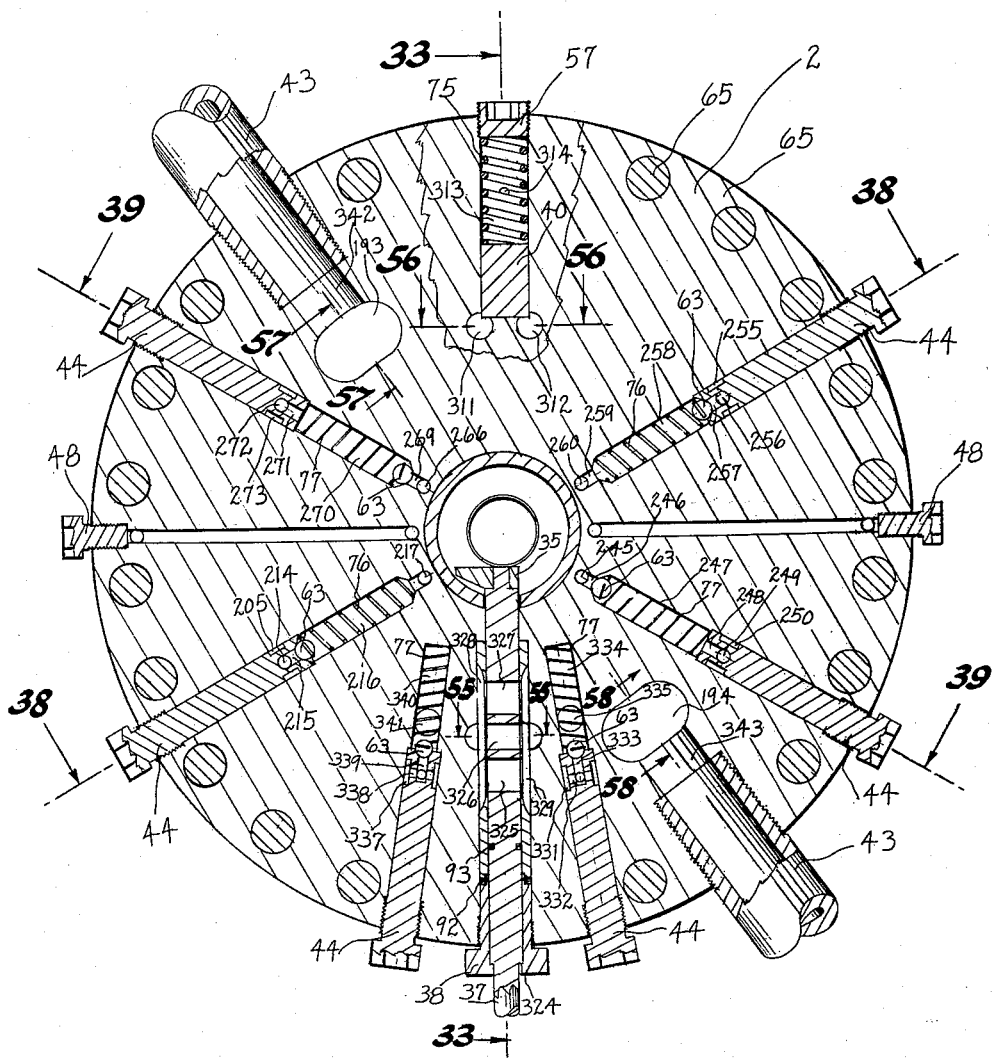
Figure 13:
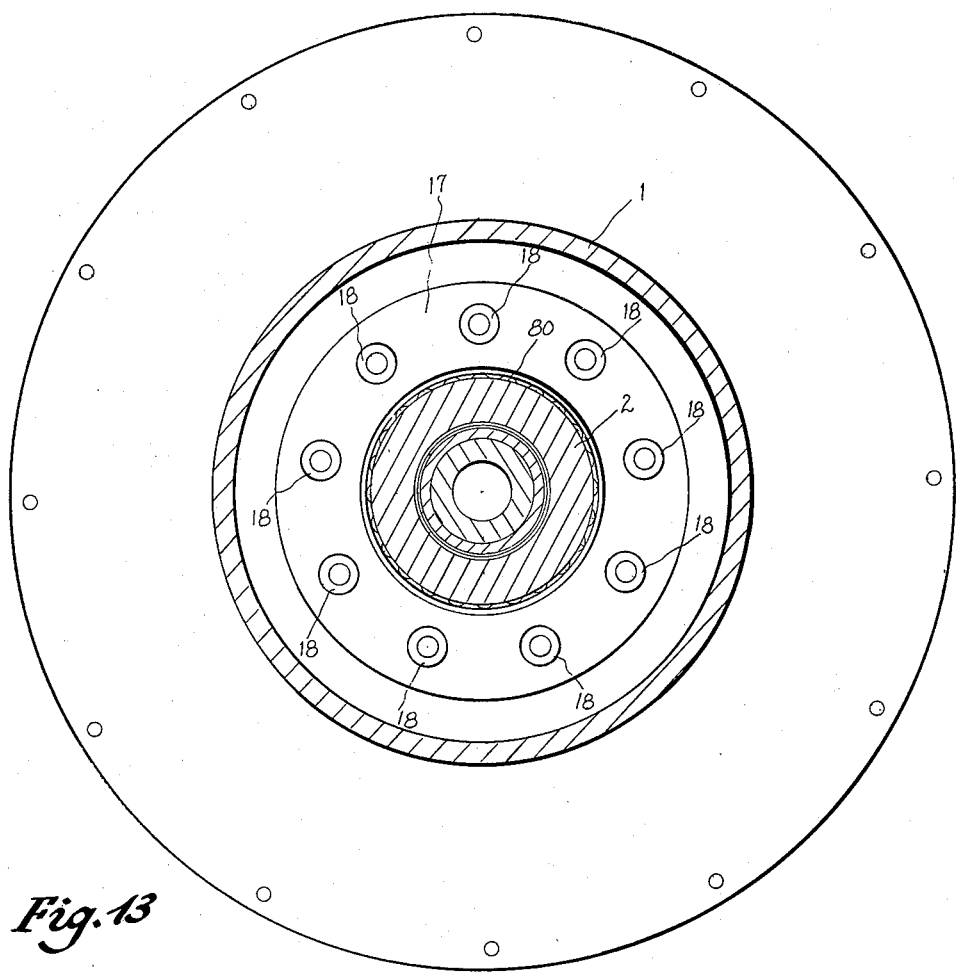

FIGURE 33 is a partial longitudinal section, showing servo and servo control mechanisms, taken along the lines 33—33 of FIGURE 12.

FIGURE 34 is a rear view of the servo control mechanisms assembly.

Figure 38:
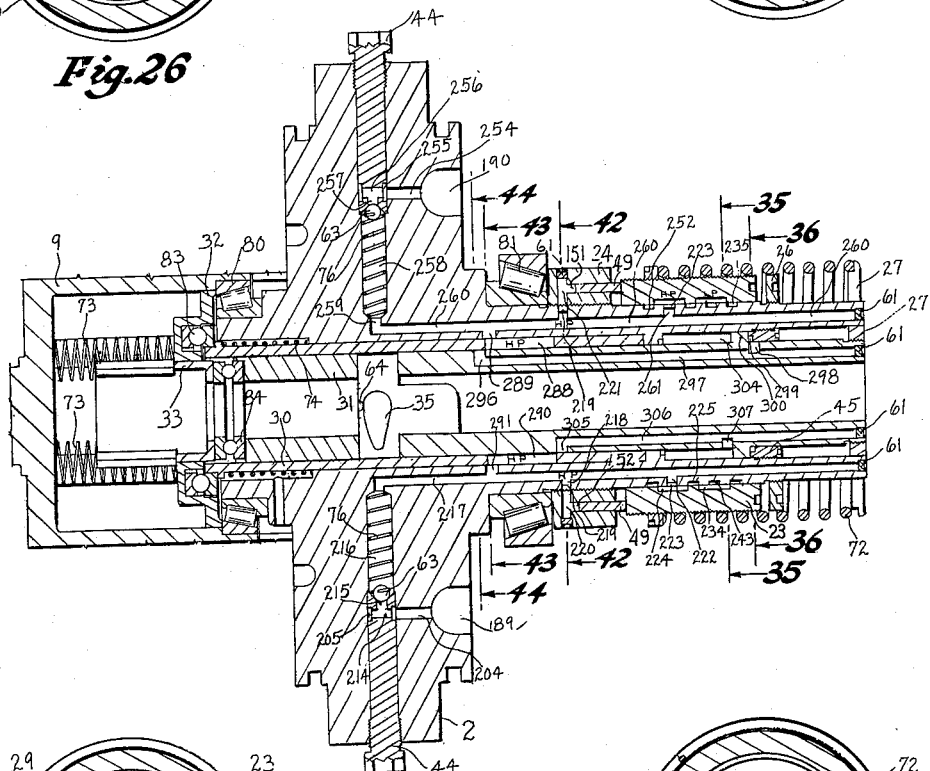
Figure 29:
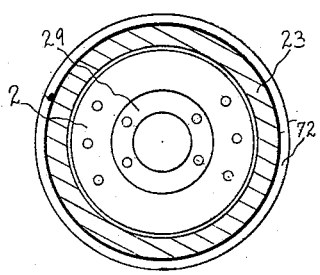

FIGURE 35 is a fragmentary transverse section, through the hydraulic servo mechanism, taken along the lines 35—35 on FIGURE 38.

FIGURE 36 is a fragmentary transverse section, through the hydraulic servo mechanisms, taken along the lines 36—36 of FIGURE 38.

FIGURE 37 is a fragmentary transverse section, showing the pin locking means of the hydraulic neutral shaft, taken along the line 37—37 of FIGURE 34.

FIGURE 38 is a partial longitudinal section, showing the servo control mechanisms and the high pressure passageways thereto, taken along the lines 38—38 of FIGURE 12.

FIGURE 39 is a partial longitudinal section showing the servo control mechanism and the low pressure passageways thereto, taken along the line 39—39 of FIGURE 12.

FIGURE 40 is a fragmentary longitudinal section showing the hydraulic fluid passageway from the "A" end to the "B" end, which contains low pressure fluid when the vehicle is being driven forward, taken along the lines 40—40 of FIGURE 34.

FIGURE 41 is a fragmentary transverse sectional view, showing the front end view of the centrifugal mechanism for servo control, taken along the lines 41—41 of FIGURE 33.

Figure 42:
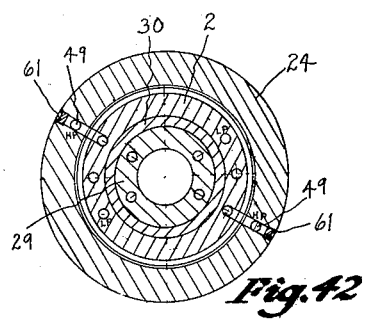

FIGURE 42 is a fragmentary transverse section through the hydraulic servo mechanisms, taken along the lines 42—42 on FIGURE 33.

Figure 43:
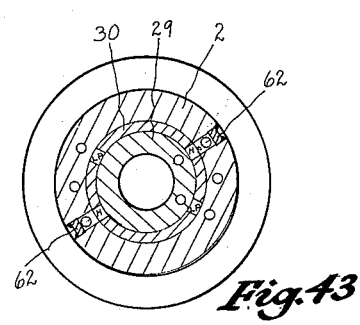

FIGURE 43 is a fragmentary transverse section through the hydraulic servo mechanisms, taken along the lines 43—43 of FIGURE 33.

Figure 44:
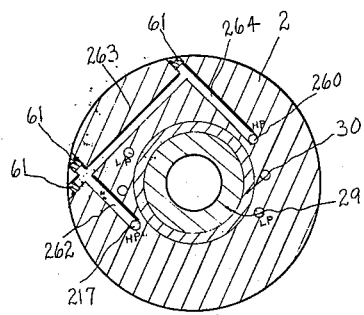
Figure 26:
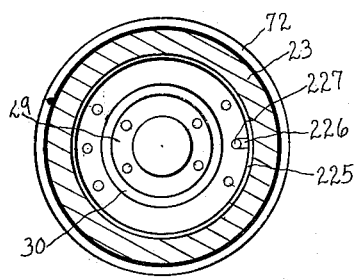
Figure 27:
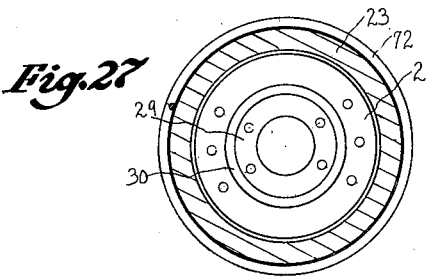

FIGURE 44 is a fragmentary transverse section through the hydraulic servo mechanisms, showing common fluid passage connection to the servo high pressure supply lines, taken along the lines 44—44 of FIGURE 33.

FIGURES 45 to 49, inclusive, are fragmentary longitudinal sectional views showing a portion of the centrifugal governor mechanism for servo control, taken respectively along the lines 45—45 to 49—49, inclusive on FIGURE 41.

FIGURE 50 is a fragmentary transverse section, showing the common connecting hydraulic passageways to the two low pressure hydraulic supply lines to the servo systems, taken on lines 50—50 of FIGURE 39.

Figure 18:
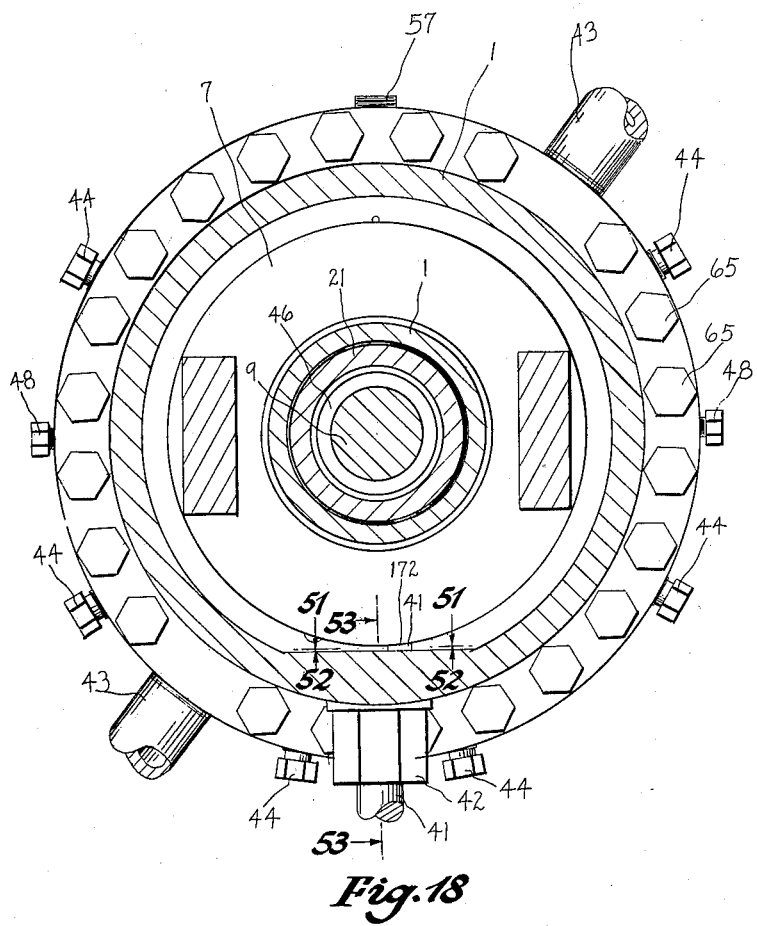

FIGURE 51 is a fragmentary section, showing an end view of the "A" end tilt plate control shaft, taken along the lines 51—51 of FIGURE 18.

FIGURE 52 is a fragmentary section, showing the mating slot, and entering finger of the "A" end tilt plate control mechanism, taken along the line 52—52 of FIGURE 18.

FIGURE 53 is a fragmentary section, showing a longitudinal section through the A end tilt plate control shaft, taken along the line 53—53 of FIGURE 18.

FIGURE 54 is a fragmentary section, showing the hydraulic fluid passageways from the A end to the B end, which contain high pressure fluid, when the vehicle is being driven forward, taken on the line 54—54 of FIGURE 34.

FIGURE 55 is a fragmentary section, showing the hydraulic passageways leading from the high pressure and low pressure sides of the A end to the engine idling by-passageways, taken along the line 55—55 of FIGURE 12.

FIGURE 56 is a fragmentary section, showing the hydraulic passageways leading from the high pressure and low pressure sides of the A end to the double acting high pressure release valve mechanism, taken along the line 56—56 of FIGURE 12.

Figure 57:
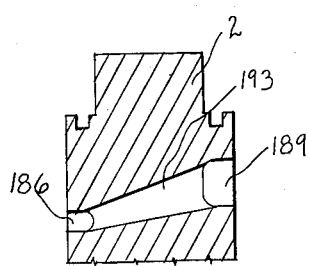

FIGURE 57 is a fragmentary section, showing the hydraulic fluid passageway from the A end to the B end, which contains high pressure fluid, when the vehicle is being driven forward, taken along line 57—57 of FIGURES 12 and 34.

Figure 58:
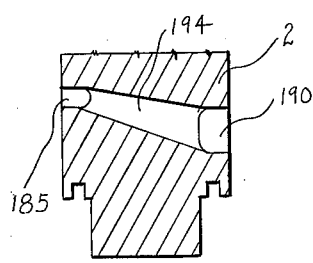

FIGURE 58 is a fragmentary section, showing the hydraulic fluid pasageways from the A end to the B end, which contains low pressure fluid, when the vehicle is being driven forward, taken along line 58—58 of FIGURES 12 and 34.

Figure 59:
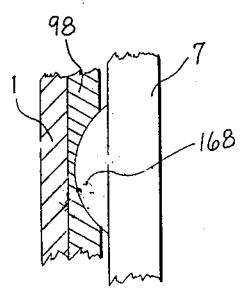

FIGURE 59 is a fragmentary section, showing the seating of semi-circular busses of A end tilt plate in their respective seats, taken on line 59—59 of FIGURE 5.

Figure 60:
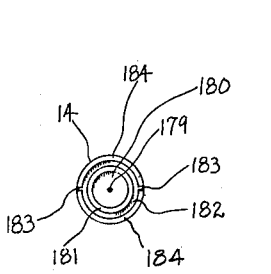

FIGURE 60 is a fragmentary section, showing the end of the shoes 14 which make contact with the flat surface of the tilt plate 7 taken along line 60—60 of FIGURE 5.

Figure 61:
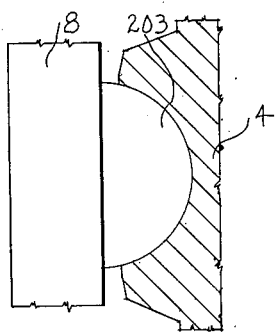

FIGURE 61 is a fragmentary section, showing the seating of the semi-circular busses 203 of the B end tilt plate 8, and the cooperating semi-circular seats in the rear end casting, taken along the line 61—61 of FIGURE 5.

Figure 62:
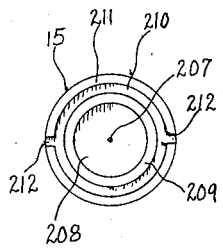

FIGURE 62 is a partial section which shows the end of the shoes 15, which bear against a tilt plate 8, taken along the line 62—62 of FIGURE 5.

FIGURE 63 is a fragmentary transverse section, through a portion of the A end shaft, showing cut-away sections to eliminate interference with the centrifugal weights, taken along the line 63—63 of FIGURE 33.

Figure 64:
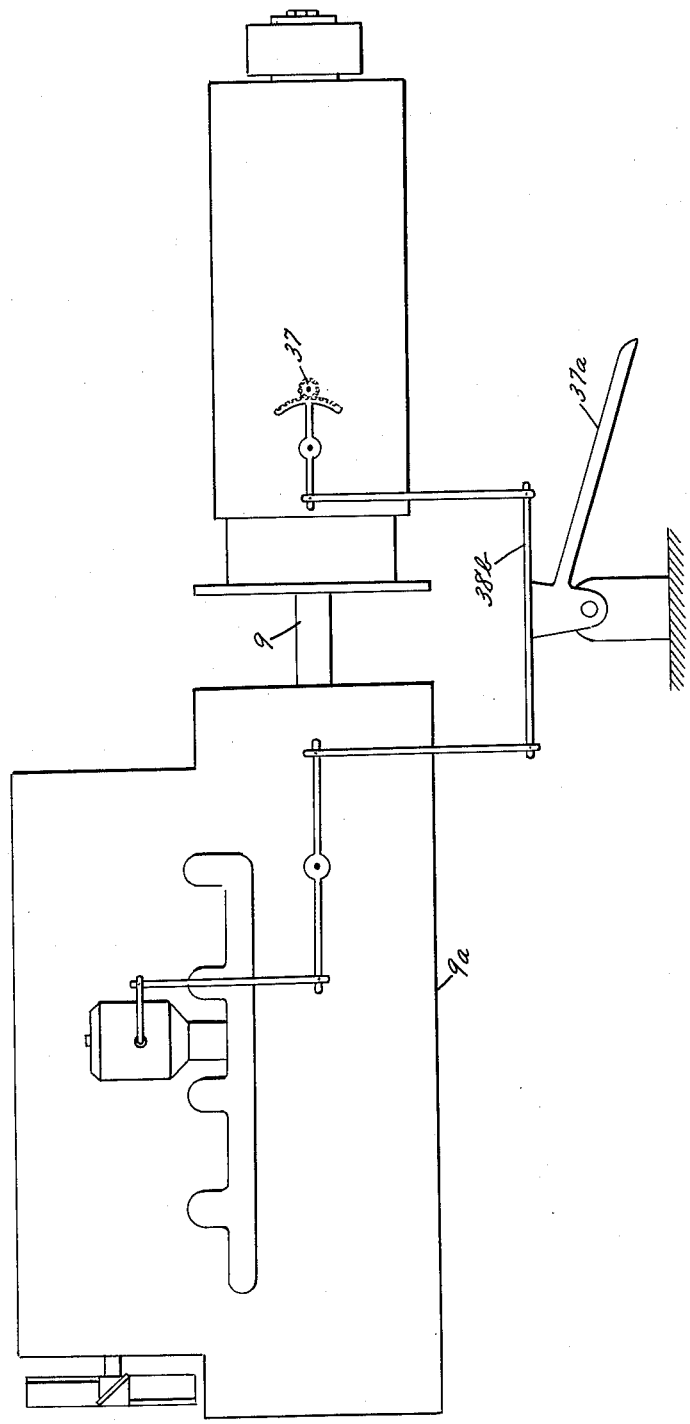

FIGURE 64 is a schematic view showing the interconnection of a foot-operated throttle and an internal combustion engine with the transmission.

Figure 1:
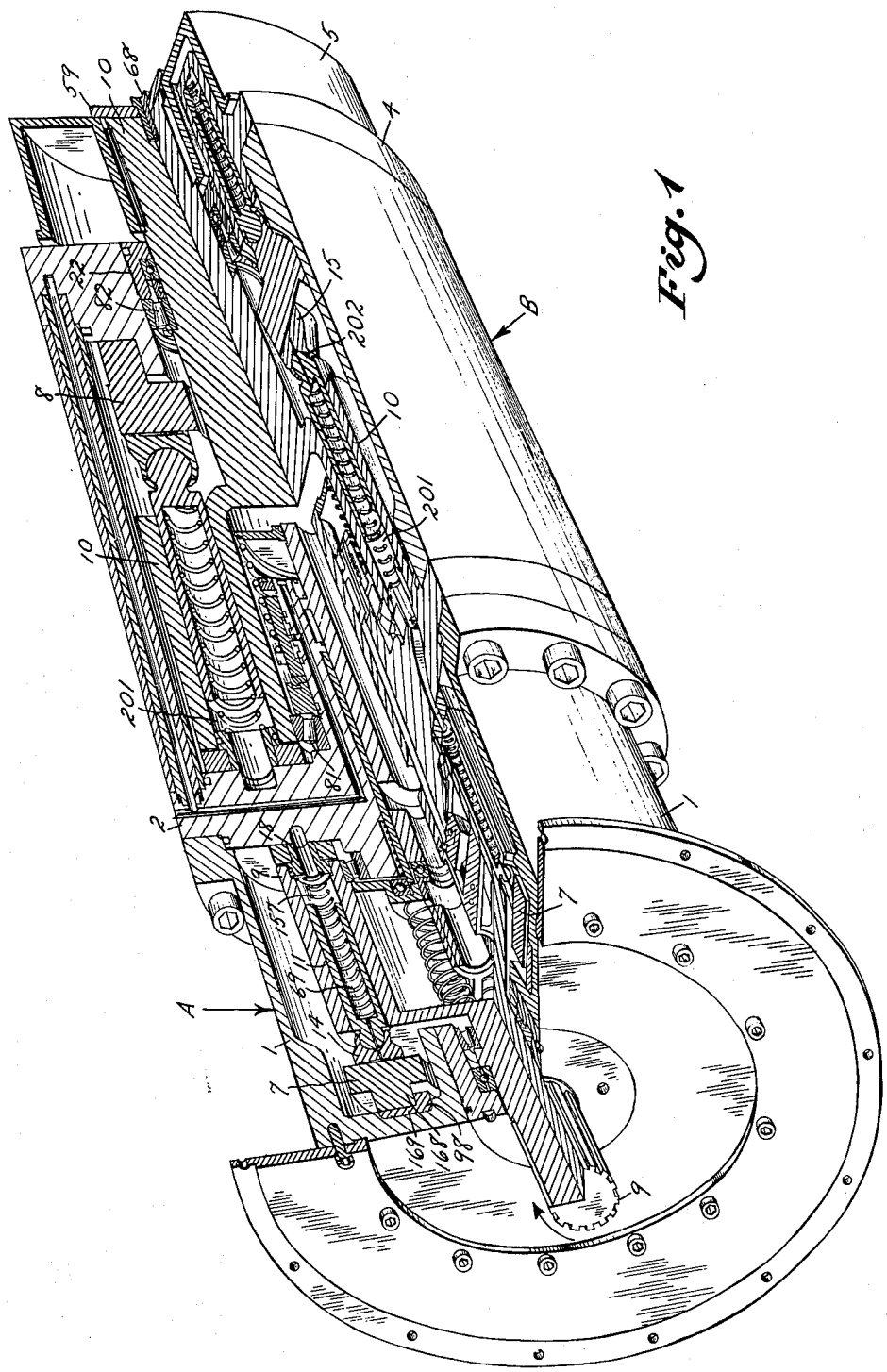
FIGURE 1 is a fragmentary perspective view of the transmission.
Figure 5A:
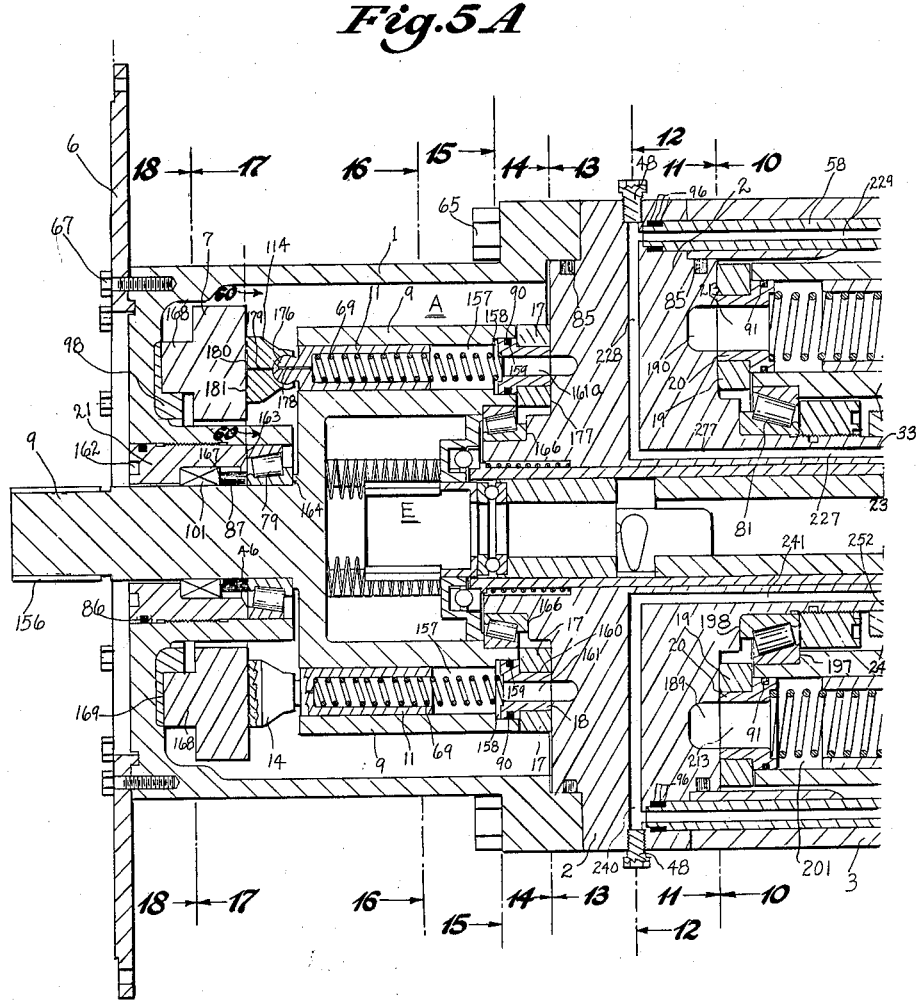
FIGURES 5A and 5B are an approximately horizontal longitudinal section through the transmission, taken along the lines 5—5 of FIGURE 9.
Figure 5B:
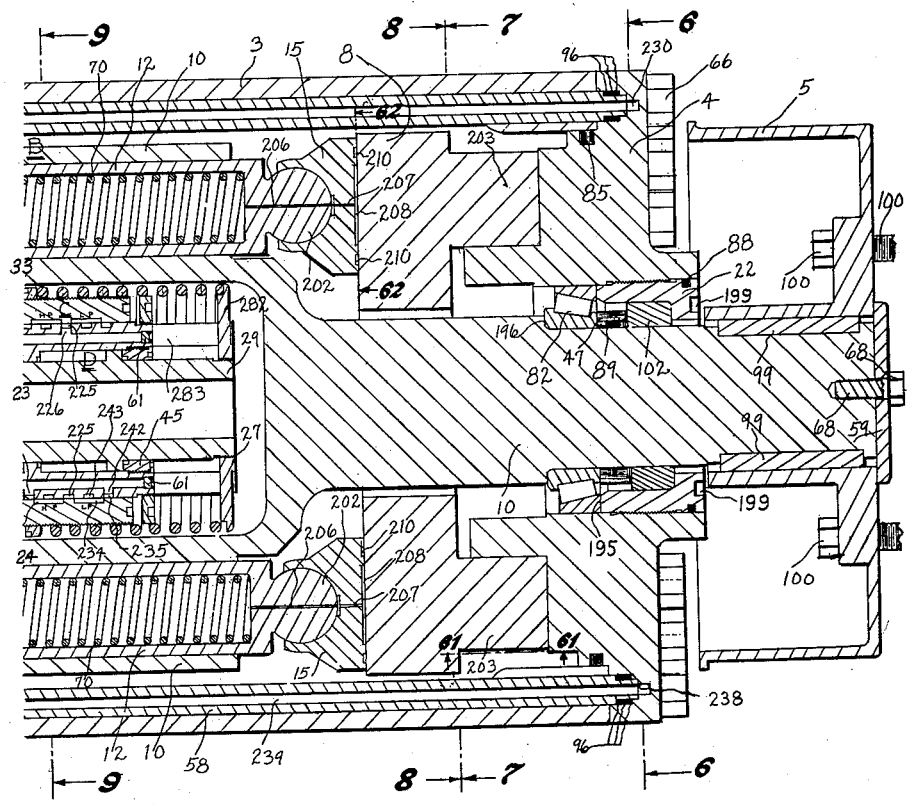

In accordance with the invention, the transmission is comprised of a positive displacement type hydraulic pump, generally indicated by reference character A, and a positive displacement type motor, which is driven by the pump, generally indicated by reference character B (see FIGURES 1, 5A and 5B).

The pump A is preferably of the axial piston type, and of constant displacement. The pump A is driven by the vehicle engine 9a through the shaft 9, and of constant displacement, when the transmission is functioning to drive the vehicle, in either a forward or reverse direction. When the vehicle is being driven forward by the transmission, the tilt plate 7 of the A end or hydraulic pump is secured at an angle. When the transmission of the vehicle is in hydraulic "neutral" as shown in FIGURE 5A the tilt plate, by a means subsequently to be described, is in a vertical position, or is secured at an angle at which the plane surface of the tilt plate is perpendicular to the axis of rotation of the shaft 9. When the transmission is adjusted to drive the vehicle in reverse, the tilt plate 7 is adjusted in an angular position which is equal in angle of tilt, but in the opposite direction of tilt.

By a means more fully set forth below, the tilt plate 7 may be adjusted by manual means, into the forward driving position, or to perpendicular position as shown in FIGURE 5a, or to a tilting position which is equal in angle, but opposite in direction.

At the vertical perpendicular position of the tilt plate 7, the vehicle engine 9a (see FIGURE 64), when running, rotates the shaft 9, but there is no fluid pumping action by pump A. Thus the vehicle engine may run but there is no forward or rearward propelling of the vehicle regardless of the speed of the vehicle engine.

When tilt plate 7 is set at an angle, such as shown in FIGURE 4A, the pistons 11 of the A end are caused to reciprocate and hydraulic fluid is pumped by the cylinders of the A end pump, through the passageways and into the B end or axial piston type hydraulic motor. The hydraulic fluid passes through this hydraulic motor, rotates the motor, or B end, and returns through low pressure fluid passageways, to the low pressure side of the A end or hydraulic pump. Thus, B end shaft 10 rotates and drives the drive shaft of the vehicle. A pulley 5 is secured on the shaft 10 by the angular plate 59, which is secured in place by the machine screw 68, the pulley 5 prevented from rotation with respect to the shaft 10 by the keys 99 as shown in FIGURE 5B. The pulley may be used in connection with friction brake bands for mechanical braking purposes. The drive shaft of the vehicle may be secured to the transmission by means of the machine screws 100, as shown in FIGURE 5B.

Figure 4B:
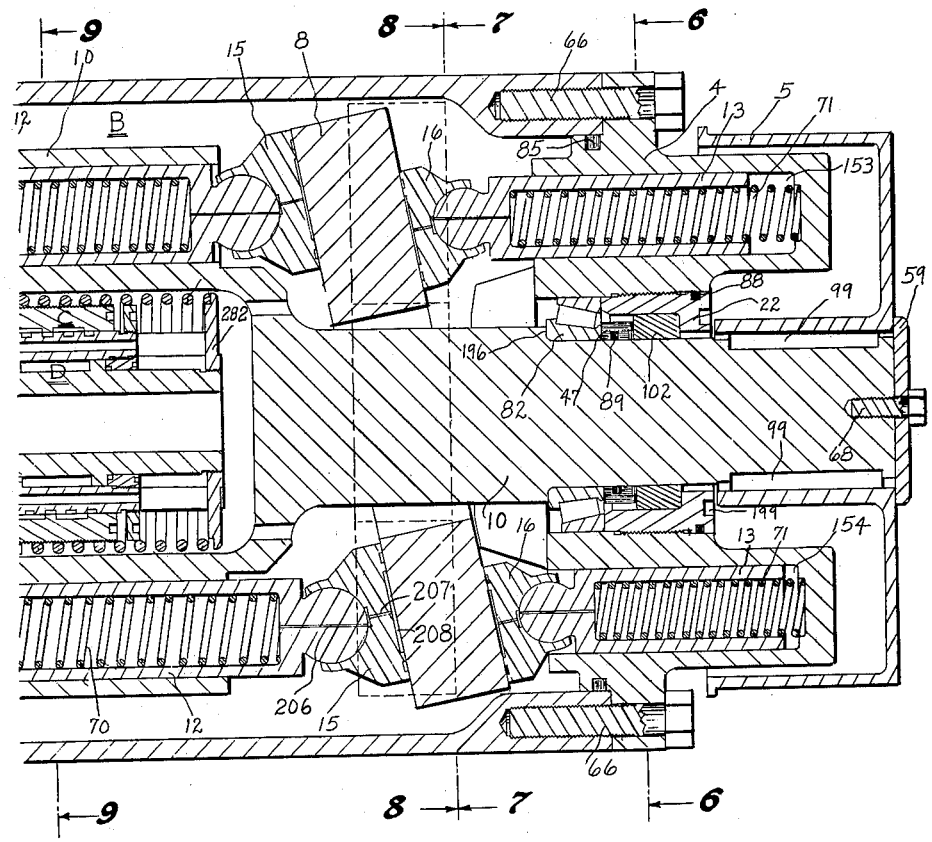

The B end or hydraulic motor is positive in its displacement, but is variable as to its volume of displacement. This variation in displacement is accomplished by the variation in the angle of tilt of the tilt plate 8, of the B end (see FIGURE 4B). When the tilt plate 8 is tilted to a greater angle of tilt, the pistons 12 of the B end hydraulic motor are caused to reciprocate through a greater distance during the rotation of the B end or hydraulic motor. This causes the pistons and containing cylinders to receive more hydraulic fluid during one revolution of the B end. As previously stated, the volume of displacement per revolution of the A end or hydraulic pump is constant. Thus, when the tilt plate 8 is tilted at a substantial angle, such as shown in FIGURE 4B, the engine and the A end, or hydraulic pump, rotate a greater number of times to pump enough fluid to rotate the B end, or hydraulic motor one revolution. In this condition, of adjustment, the transmission is adjusted in what would be equivalent to an extremely "low gear," in descriptive terms related to the conventional spur gear type of transmission.

However, when the tilt plate is adjusted at an angle of tilt which is nearer the perpendicular, the pistons 12 reciprocate a shorter distance, and the fluid displacement per revolution of the B end, or hydraulic motor is less. In this condition of adjustment, the vehicle engine and the A end or pump will not be required to rotate as many times, to cause the B end or hydraulic motor to rotate one revolution. This corresponds to a "higher gear," in terms of description of the conventional spur gear transmission.

When the angle of tilt of the B end tilt plate 8 becomes less and less, and nearer the perpendicular, it reaches a point at which the displacement per revolution of the B end is exactly the same as the displacement per revolution of the A end. When this occurs, the B end and also the vehicle drive shaft, rotate one revolution for each revolution of the A end, or vehicle engine and the power ratio of the transmission is at 1 to 1. It is obvious that the power ratio of this transmission, which corresponds to the extreme "low gear" ratio of conventional gear transmissions, may be several times lower than the one to one ratio; as for example, in truck transmissions, 1-16. However, it is understood that the transmission of this invention may be designed for other ranges of extreme ratios. Examples of this would be ranges from 1-1 to 1-20; or from 1-1 to 1-8, depending upon the needs of the vehicle or on which the transmission is employed.

Since this transmission is fully automatic, and the power ratio provided by the transmission may be changed by merely varying the angle of tilt of the B end tilt plate 8, fully automatic means is provided for changing of the angle of the tilt plate 8.

Three inputs or parameters are automatically and simultaneously used as inputs which influence the power ratio adjustment of the transmission. These are, the torque requirements on the drive shaft of the vehicle, the speed of rotation of the engine, and the throttle position which feeds fuel to the engine. The torque requirements on the drive shaft vary in accordance with the road conditions. Obviously if the vehicle is traversing a level road, or a gentle slope, and the grade becomes steeper, a greater torque is required on the drive shaft of the vehicle, to maintain the same forward speed. If the vehicle is traversing a smooth level terrain and then encounters deep sand, the torque requirements on the drive shaft of the vehicle are increased. Conversely, when a vehicle is climbing a steep grade, and the grade becomes less steep, again there is a change in torque requirement on the drive shaft. This time the torque requirement becomes less. Thus the torque requirement on the drive shaft of the vehicle is one of the parameters or factors involved in causing this transmission to automatically change its power ratio.

The speed of rotation of the vehicle engine is also a factor in the automatic power ratio adjustment. It is well known that an internal combustion piston type engine, similar to those used in passenger cars, trucks and other vehicles, varies in its torque producing capabilities as the speed of revolution of the engine varies. For instance, when the engine is rotating at 600 revolutions per minute, the torque, which the engine is capable of producing, is less than the torque producing capabilities of the engine at, for instance, a speed of 1800 revolutions per minute. This torque producing capability of an engine of this type increases as the speed of revolution of the engine increases up until a speed of about 2400 or 2800 revolutions per minute is reached. This speed of maximum torque depends upon, and varies with, the type of engine employed. After this speed of optimum torque is reached in a particular engine, the torque producing capability of the engine declines as the speed of revolution of the engine further increases. When the engine has reached a speed of revolution of 3600 or 4000 revolutions per minute, the torque producing capability of the engine is considerably less than at 2400 to 2800 revolution per minute, although the horse power produced by the engine will be greater at 3600 or 4000 revolutions per minute than at 2400 or 2800 revolutions per minute.

It will thus be apparent that the speed or rotation of the engine must be considered, in the determination of the power ratio at which the transmission must be adjusted.

The quantity of fuel being fed into the engine, which is a function of the throttle position, when the throttle is controlled either by foot or hand throttles, must also be taken into consideration. If more fuel is being fed into the engine, over a time increment, by the throttle position being open to a further degree, more fuel energy is then being consumed by the engine, which, other things being equal, affects the torque capability of the engine. At a given speed of revolution of the engine, if the throttle is open wider, the consuming of more fuel will cause the engine to be capable of providing somewhat greater torque than would be the case if the same engine were rotating at the same speed, but with the throttle open less widely and less fuel being consumed by the engine. Thus throttle position must also be considered as a factor when the transmission automatically adjusts itself to the proper power ratio.

It is obvious that the two parameters, of throttle position and speed of revolution, must be superimposed on each other and the instantaneous totalization, or total value of these two parameters must be used to contribute to the automatic determination of what power ratio the transmission should provide.

The greatest factor or parameter influencing the transmission is the torque requirement on the drive shaft of the vehicle. The torque requirement variations extend over a wider range, than the variation due to the combined parameters of speed of the engine, and throttle position. Thus, in the functioning of this automatic transmission, the torque requirements of the drive shaft provide the major change or influence in the power ratio needs. The additional correction, determined by the combined value or totalization of the throttle position and engine speed is superimposed on the principal factor which controls the automatic adjustment of the transmission power ratio, this factor being the torque requirement on the drive shaft.

The automatic and continuous self adjustment of the power ratio of the transmission is carried out by the combined functioning of the two hydraulic servos, the construction and functioning of which are subsequently fully explained. The servo controlling the power ratio of the transmission, with respect to the drive shaft torque requirements, is located in the general area shown at C in FIGURES 4B and/or 5B. The hydraulic servo is a pressure sensitive servo, which senses a small increment of change in the pressure level of the hydraulic fluid, in the high pressure side of the transmission.

If the vehicle, for instance, is climbing a gentle grade and the grade or slope increases, the torque requirement on the vehicle drive shaft increases. The drive shaft thus becomes more difficult to rotate. Then, assuming the same power ratio but between the engine and drive shaft, the hydraulic fluid pressure, in the high pressure side of the transmission, suddenly increases in pressure level. When this pressure increase occurs high pressure fluid flows from the high pressure side of the transmission, through passageways into two passageways, 151 and 152, behind the ends of the pins 49 (FIGURE 38).

Prior to this sudden increase in pressure level of the high pressure fluid, the high pressure fluid is exerting a force against the inner ends of the pins 49, exerting a pressure which exactly balances the opposing pressure of the spring 72. The pressure of the end of the spring 72 is exerted against the ring 25, which is threadedly secured to the slideable sleeve 23. The outer ends of the pins 49 bear against the end of the slideable sleeve 23, as shown in FIGURE 38.

The hydraulic fluid pressure and the force exerted by the spring 72, before the above-mentioned sudden increase in hydraulic fluid pressure, are in exact balance with the sleeve 23 being disposed in a neutral position as shown in FIGURE 38. In this neutral position all hydraulic fluid passageways, both high and low pressure, to the fluid spaces or cylinders 153 and 154, which move the tilt plate angle control pistons 13, are closed and the pistons 13 are hydraulically locked in position.

The high pressure surge of the hydraulic fluid, due to the increase in torque requirement on the drive shaft, immediately causes an unbalance in the equilibrium of pressure, between the high pressure fluid against the inner ends of the pins 49, and the force exerted by the spring 72. The hydraulic fluid pressure force in this case becomes greater than the opposing spring pressure force. The spring 72 is then further compressed and the slideable sleeve 23 moves to the right, as viewed in FIGURE 38.

When the sleeve 23 moves to the right, it opens both high pressure and lower pressure passageways, which will subsequently be fully traced and explained. These passageways are opened by the moving of the sleeve 23, in such a way that high pressure fluid may flow and does flow from the high pressure side of the hydraulic system, into the cylinder 153, behind the upper piston 13 as viewed in FIGURE 4B. This pushes the upper piston 13 outward, toward the tilt plate 8. Simultaneously, the movement of the sleeve 23, to the right, as viewed in FIGURE 5B, opens low pressure hydraulic passageways, subsequently fully traced and explained, from the cylinder 154, behind the lower piston 13 as viewed in FIGURE 4B to the low pressure side of the hydraulic system. As a result, the hydraulic fluid may flow from the cylinder 154, behind the lower piston 13, back to the low pressure side of the passageways, between the A and B ends. This simultaneous opening of the low pressure line to allow the fluid to flow out of the cylinder 154, is necessary to prevent hydraulic locking, and prevention of the rotating of the tilt plate 8.

The above valving action of the sleeve 23 thus permits the tilt plate 8 in response to high pressure fluid in cylinder 153 and low pressure fluid exit from cylinder 154, to rotate the tilt plate 8 to a still greater angle of tilt. When this occurs the distance of travel or reciprocation of pistons 12, as subsequently fully explained, are increased and it requires more hydraulic fluid to rotate the B end motor one revolution. Then the engine, and the constant displacement pump or A end, must rotate more times to pump enough hydraulic fluid to rotate the B end or hydraulic motor one revolution. Thus the power ratio between the engine and the drive shaft, through the transmission, is increased and the new adjustment corresponds hydraulically to a "lower gear." Then the engine is able to drive or rotate the drive shaft imparting greater torque thereto, even though the high pressure fluid pressure level is now less, than it was when the high pressure surge occurred. The sudden increase of pressure, of course, occurred due to the sudden increase in torque on the vehicle drive shaft.

This process of adjustment continues, the angle of tilt of the tilt plate 8 being increased, until the displacement of the B end or hydraulic motor has increased and the power ratio has thus increased. This power increases to the extent that the engine can now rotate the drive shaft, by the hydraulic equivalent of a "lower gear" ratio, at a fluid high pressure level which will again balance the spring 72. At this pressure balance, between the pins 49 and the spring 72, the slideable sleeve 23 is again in the neutral position, as seen in FIGURES 5A and 5B.

Let us now analyze what events happen when the reverse occurs in torque requirement, from that described above. Let us suppose that the vehicle is climbing a slope or grade and the spring 72, and the pins 49 which are pushed by the hydraulic high pressure, are in equilibrium and balance. Then suppose that the grade or slope becomes less steep. When this occurs there is less torque required to rotate the drive shaft, and at the power ratio and the angle at which the tilt plate 8 is at the instant adjusted, it requires less fluid pressure, than that now existing in the high pressure side of the circulatory system, to provide the lesser torque requirement on the drive shaft. The vehicle immediately starts to accelerate, and the fluid pressure drops in the high pressure side of the system.

When this occurs, the pressure of the fluid on the inner ends of the pins 49 then exerts a force, which is less than the force exerted by the spring 72. The greater force of this spring then pushes the slideable sleeve 23 to the left, as viewed in FIGS. 5A and 5B. This movement to the left, on the sleeve 23, opens a set of high pressure hydraulic passageways, which allow high pressure fluid from the high pressure side of the hydraulic fluid circulator system, to flow into the cylinder 154 behind the lower piston 13, as viewed in FIG. 4B. These passageways will be subsequently fully traced and explained.

Simultaneously with this valving action, the same movement of the sleeve 23 also opens low pressure hydraulic passageways, from the cylinder 153, behind the upper piston 13, as viewed in FIG. 4B, to the low pressure side of the hydraulic fluid circulatory system, which connects the "A" end and the "B" end. These passageways will be subsequently fully traced and described.

As a result of the above described high pressure and low pressure valving action, which is simultaneously carried out by the sleeve 23, which pressure fluid flows into the lower cylinder 154, and low pressure fluid flows out of the cylinder 153, and back to the low pressure side of the hydraulic circulatory system. This causes the tilt plate to rotate in a direction toward the perpendicular or vertical, and assume an angle of less tilt. This lessens the travel or reciprocation of the pistons 12, of the "B" end, and lessens the volumetric displacement per revolution of the "B" end or hydraulic motor. This in turn changes the power ratio of the transmission. The engine and the "A" end now are required make fewer revolutions to pump enough fluid to cause the "B" end to rotate once. This hydraulically corresponds to a "higher gear," in terms common to description of a conventional spur gear transmission.

When this adjustment occurs, a higher fluid pressure in the high pressure side of the circulatory system is now required to cause the vehicle drive shaft to rotate against the road conditions. This adjustment of the angle of the tilt place continues, until a hydraulic power ratio is reached which will permit the engine to rotate the drive shaft, through the transmission, at a fluid pressure on the high pressure side of the circulatory system, which will again balance the spring 72. The slidable sleeve then returns to its neutral position, as shown in FIGS. 5A and 5B. In this neutral position all passages to the cylinders 153 and 154 are closed, and the tilt plate 8 is hydraulically locked in its angle of the moment.

This condition continues until a change in the torque requirements on the vehicle drive shaft again occurs, at which time, by the functioning explained above, the angle of the tilt plate is again adjusted, to a greater or lesser tilt, as the new torque requirements on the drive shaft require.

It can be seen that the adjustment may occur very quickly, and as continuously as the needs may require. It will be also be seen that an infinite number of power ratio adjustments, between the maximum and minimum ratios permitted by the design, may be provided by this transmission. Also this provides a continuous smooth transmission, by hydraulic means, rather than a step function, as is now provided by current transmissions of both a spur gear type and of the so-called "automatic" type.

The superimposition of the engine speed of rotation and throttle position inputs, into the transmission power ratio, will now be described in a general way, subsequently a detailed description of the interrelation and functioning of the parts causing this action will be described.

A second hydraulic servo D is provided, which is disposed concentrically within the outer servo C, in the location D, as viewed in FIG. 5B. Also a centrifugal mechanism E is provided, which cooperates in functioning with the servo D, and this mechanism is disposed in the general location E, as shown in FIG. 5A.

The servo C, as previously explained, is a pressure sensitive servo, and functions when there has been a change in hydraulic fluid pressure in the high pressure side of the circulatory system, between the "A" end and the "B" end. The servo D is a positioning type of servo, and functions differently from the pressure-sensitive servo C.

It will be noted that one end of the spring 72 which is under compression, bears against the threaded spring 25, and the opposite end of the spring 27 bears against the four fingers of the end stop 27, which in turn is threadedly secured to the servo actuated sleeve 29. The sleeve 23 is limited in its linear movement. The threaded ring 24 forms a stop for the leftward end of the sleeve 23, as viewed in FIGS. 4A and 5A, and the threaded ring 26 forms a stop for the rightward end of the sleeve 23. Regardless of the increase or the drop of the fluid pressure in the spaces 151 and 152, behind the inner end of the pins 49, the sleeve 23 can move linearly only the limited distance allowed by the leftward stop 24 and the rightward stop 26. The sleeve 23, when the spring pressure reverses the hydraulic pressure, is balanced and remains in the middle, or neutral, position, as shown in FIGS. 5A and 5B. As a result of the above, the leftward end of the spring 72 is fixed within the narrow limits shown.

It will be seen, however, that the rightward stop 27 of the spring 72 may move a considerable distance to the left. The stop 27, as viewed in FIG. 5B is shown in its extreme rightward position of possible movement. If the right end stop 27, of the spring 72, constantly remains in its position as shown, the spring 72 will be provided with a constant initial or assembled compression. As a result a constant or specific force, due to hydraulic pressure in the spaces 151 and 152, behind the inner end of the pins 49, would hold the sleeve 23 in its neutral position, against the force exerted by the compression of the spring 72.

If this condition of a constant position of the spring and stop 27 were always true, one definite pressure would always be automatically maintained in the high pressure side of the circulatory system, between the "A" end and the "B" end, because of reasons subsequently to be explained. This pressure would automatically be maintained by the functioning described in the passages above, whereby, when there occurred an increase in the torque required on the drive shaft of the vehicle, and a sudden increase in fluid pressure resulting, the angle of the tilt plate 8 would be increased. The transmission would then function at a greater power ratio, corresponding to a "lower gear" ratio, and this adjustment would continue until the power ratio relationship, to the torque requirement, on the vehicle drive shaft was such that the fluid in the high pressure side of the circulatory system would again balance the spring 72, and hold the sleeve 23 in its neutral position as shown.

If the torque requirement on the vehicle drive shaft decreased, the angle of the tilt plate 8 would be decreased, in the manner described above, until the transmission assumed the hydraulic equivalent to a "higher gear" ratio, and assumed such a relationship between power ratio and drive shaft torque requirement that the hydraulic fluid pressure level again balanced the spring pressure 72. The sleeve 23 would then again come to rest in its neutral position, as shown in FIGS. 5A and 5B.

If the right end stop 27 of the spring 72 always remains at the same position such as, for instance, the position shown in FIGURE 5B, the hydraulic fluid pressure in the high pressure side of the circulatory system would always, after self-adjustment of power ratio, return to the same pressure level.

Now it will be readily seen that if the end stop 27, of the spring 72, is moved to the leftward, as viewed in FIGS. 4B and 5B, the total length of the spring 72 will be shortened, and the initial or assembled compression of the spring will be greater. At this greater initial compression of the spring 72, it will require a higher fluid pressure in the spaces 151 and 152, against the inner ends of the pins 49, to balance and to hold in equilibrium the increased initial compression and pressure of the spring 72. This means that the transmission will reach equilibrium, as to its power ratio, in relationship to the torque requirements on the vehicle drive shaft, at a higher fluid pressure. This in turn means that, since the displacement of the "A" end hydraulic pump is constant, and the engine is driving or rotating the "A" end, that the engine will be loaded with a greater torque, than when the stop 27 is at its right most position and the total length of the spring 72 is greater.

It will thus be seen that the variation and the length of the spring, results in a variation in the torque with which the engine of the vehicle is loaded. Thus when the engine is rotating at the speed of revolution at which it provides its maximum torque and, if the throttle is opened to a wide degree, and a maximum amount of fuel is thus being fed into the engine, we have a summation of parameters. With these two parameters superimposed, the exactly correct torque load that should be placed upon the engine is considerably greater than the proper torque load that should be placed on the engine, for instance, when the speed of the engine is low and the fuel throttle is opened only to a small degree.

Under the latter condition of low engine rotational speed and minimum throttle opening, the position of the end stop 27 of the spring 72 should be at the extreme rightward position, as is now shown in FIGURE 4B. In this position the minimum torque is placed upon the engine because the transmission now finds equilibrium at a lower fluid pressure, in the high pressure side of the circulatory system, as previously explained. But if the engine is rotating at its speed at which it provides maximum torque, and if at the same time the throttle position is wide open, the engine is able to provide a considerably greater torque. Under these conditions, the end stop 27, to the spring 72, should be moved to its extreme leftward position, and the spring 72 is thus considerably shortened. The initial or assembled compression of the spring is then substantially greater, and the forces provided by the high pressure fluid, in the spaces 151 and 152, against the ends of the pins 49, to balance the force of the spring 72, must be considerably greater. Under these conditions the hydraulic transmission seeks equilibrium at a substantially higher fluid pressure level, in the high pressure side of the circulatory system. This in turn results in a greater torque being placed upon the engine, since the engine drives the "A" end pump and the pump is of constant displacement.

The concept and function of this transmission is, therefore, that the change in torque requirements of the drive shaft of the vehicle is accommodated by varying the displacement of the "B" end or hydraulic motor. This is done by varying the angle of the tilt plate. This variation is controlled by the pressure-sensitive servo C. The initial compression of the spring 72 is used as a reference value in comparison with which the servo C senses a change in fluid pressure. But in order to incorporate the additional parameters, of throttle position and speed of rotation of the engine, the two latter values are combined or totalized. Then the fluid pressure level at which the pressure sensitive servo functions, and the pressure level about which the transmission automatically seeks equilibrium, is varied in correspondance with, and in proportion to, the total value of the sum of the parameters, of throttle position and speed of revolution.

In other words, the change in torque requirements on the vehicle drive shaft are adjusted for by varying the volumetric displacement of the "B" end. And the summation of the two inputs, of engine speed and throttle position, are introduced as a "vernier correction" onto the system. This is done by superimposing on the system a variation in hydraulic fluid pressure level, to correspond to the total value of these two parameters.

This change in the high pressure fluid pressure level is provided by varying the length of the pressure-sensitive spring 72. This is accomplished by moving the rightmost end stop 27, as viewed in FIG. 4B, to the left to a suitable degree or distance. This movement is accomplished by hydraulic servo means, through the functioning of the positioning type servo D. In this positioning the sleeve 29, to which the end stop 27 is threadedly secured, is moved to the left, from its extreme rightward position, as viewed in FIG. 4B, by hydraulic servo means, which will be subsequently fully explained.

The valving for this positioning servo action, is provided by the sleeve 30, which is moved in a linear direction an amount which is equivalent to the summation of the values of the throttle position and the engine speed of rotation. In a manner subsequently more fully explained, as to the functioning of the combination of parts, the throttle position, as an input to the transmission, is introduced by the cam 35, shown in FIGS. 33 and 38. This cam is rotated by the shaft 37, which in turn is secured rotationalwise to the foot throttle 37a of the vehicle by mechanical linkages. The throttle position input is not necessarily a linear function to the transmission and, if not, the contact surface of the cam 35 is an irregular curve and must be designed to accommodate a particular engine.

The cam moves the sleeve 31 in a linear direction which in turn, as described below, moves the centrifugal mechanism shown at E in a linear direction. The centrifugal mechanism, as described below, is interposed between the motion imparted by the cam 35, and the linear motion imparted to the valving sleeve 30. The centrifugal mechanism, operating through the cam slots 155, translates the speed of rotation of this engine, as detected by centrifugal means, into a linear movement to the sleeve 30, which movement is added to the linear movement imparted by the throttle position cam 35.

As a result of the combined action of the two cams, which function mechanically in series, a linear movement is imparted to the valving sleeve 30, which is a linear movement corresponding to the value of the combined parameters of engine speed and throttle position at the moment.

The sleeve 30 then, as described below, opens and closes high pressure and low pressure passageways in such a manner as to cause the sleeve 29 to constantly follow the linear movement of the valving sleeve 30. The sleeve 29 also comes to rest in the exact linear position that the sleeve 30 comes to rest. Since the end stop 27 to the spring 72 is threadedly secured to the sleeve 29, the end stop will move the same linear distance but the sleeve 29 moves and also stops after having moved the same distance. As a result the spring 72 is shortened, or lengthened, through the action of the positioning type servo D, in an amount exactly corresponding to the linear movement of the valving sleeve 30. Thus, by the above means the throttle position and engine speed as parameters, are introduced to the transmission, and are caused to affect the power ratio adjustment of the transmission, by causing a variation in the fluid pressure in the high pressure side, at which pressure level the transmission operates, and at which pressure level the transmission seeks equilibrium.

Having completed a general description of the theory and functioning of the transmission, a detailed description of the component parts of operation of the transmission will now be given.

*"A" End or Hydraulic Pump*

As will be seen, the transmission of this invention is enclosed in an exterior housing, comprised of the front end housing 1, the central hydraulic valving and fluid passageway casting 2, the "B" end housing 3, and the rear end casting 4.

The housing 1, the central casting 2, and end housing 3, are connected preferably by the bolts 65, (FIG. 4B). The casting 4 is secured to housing 3, by the bolts 66.

Figure 16:
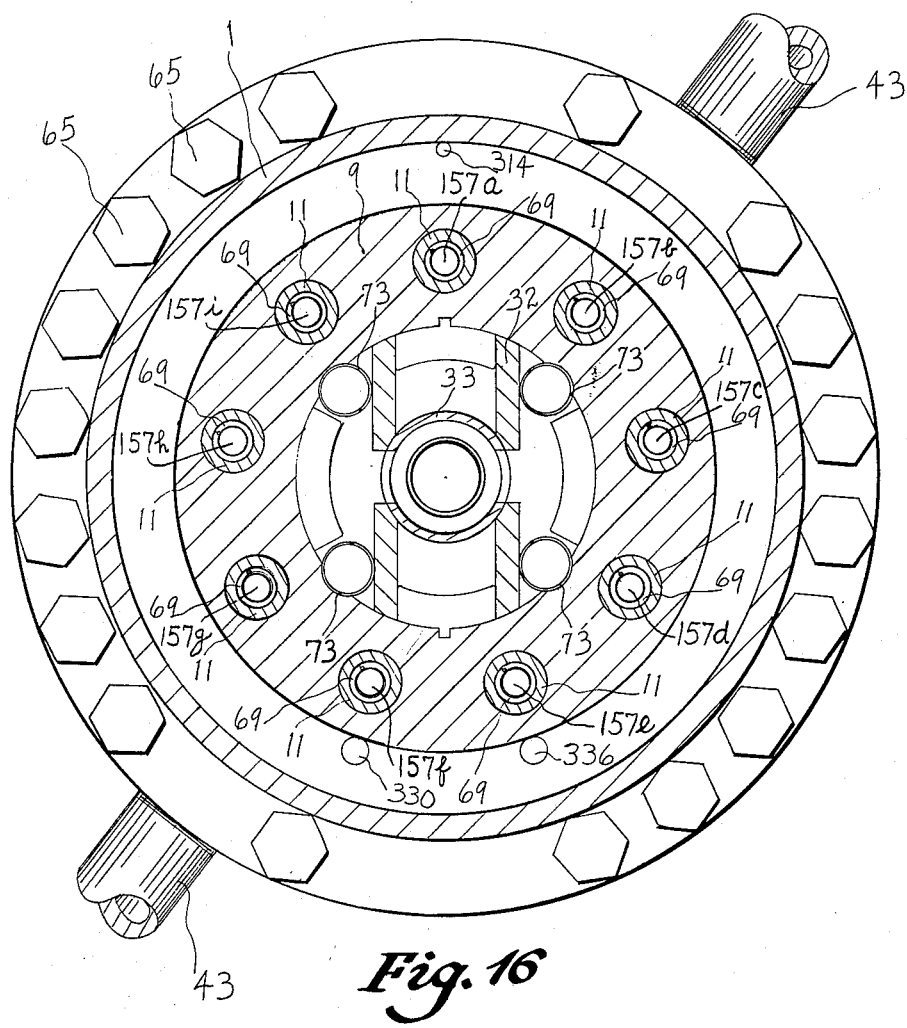
Figure 17:
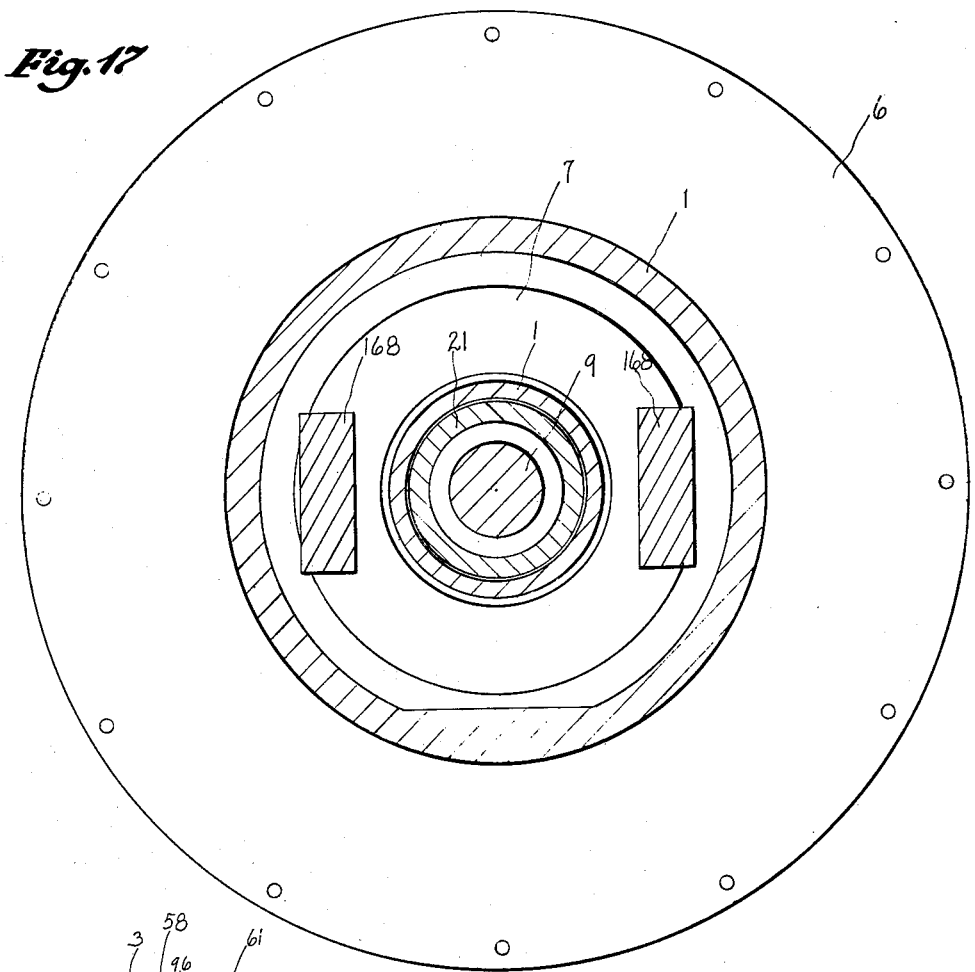

The "A" end or hydraulic pump A is of the piston type, seen in longitudinal section of FIGS. 4A and 5A, and in the transverse section shown in FIGURE 16, and the shaft 9 is connected to the vehicle engine through the splines 156, in the forward end of shaft 9.

In FIGS. 4A and 16 the rear end of shaft 9 is enlarged to form a hollow cylindrical shape, and a multiplicity of cylinders 157 are formed (FIG. 16), within the cylindrical or annular portion of the rear part of shaft 9. These cylinders are disposed axially, with respect to the axis of the shaft of the "A" end. As will be seen in FIGS. 4B, 5B, 13 and 15, an enlargement 158 is formed in the rearmost ends of each of the cylinders 157. This enlargement receives the annular cylinder end plugs 18, one of which is disposed in the rear end of each cylinder, the enlarged annular inner portion of the plug 18 contains the O ring grooves 159 having disposed therein the O rings 90. The O rings 90 prevent hydraulic leakage between the outer annular surface of the end plugs 18 and the inner cylindrical surface of the enlarged portions 158 of the cylinders.

A smaller cylindrical portion 160 of each of the cylinder end plugs 18, is inserted in cooperating holes and the sliding contact of ring plate 17 which is carried around with shaft 9. As shaft 9 rotates the plates 17 rotationally slide against the hydraulic valve fluid passageways casting 2. Plugs 18 are slidably disposed in the cylindrical enlargements 158. This permits a certain hydraulic differential pressure, explained below, to press the sliding contact ring plate 17 against the flat surface of the casting 2, with a suitable and proper pressure to minimize hydraulic leakage. Round concentric holes 161 are formed in the cylinder end plugs 18, which permit the hydraulic fluid to flow in and out of the cylinders 157, as the pistons 11 reciprocate.

Pumping action of pistons 11 is as follows: Shaft 9 is journalled in the tapered roller bearings 79 and 80 which are preloaded to the desired degree by the collar 21, threadedly secured in the front end housing shown. An O ring 86 is disposed in an annular groove, which is formed in the outer surface of the collar, to prevent leakage of hydraulic fluid from the inside of the housing of the transmission to the outside. The collar 21 is adjusted by a spanner wrench for the holes 162, in the forward end of the collar 21.

The rear end 163 of the collar 21 bears against the bearing 79, in turn bearing against shoulder 164 in shaft 9. Force exerted against shoulder 164, is transmitted to the shaft 9, and against the bearing 80, to the shoulder 165 on shaft 9. The opposite surface of bearing 80 bears against shoulder 166 in the hydraulic valving and fluid passageway casting 2. By these opposing pressures, both the tapered roller bearing 79 and 80 may be subjected to an initial loading, the amount determined by the degree of threaded adjustment of the collar 21.

A collar 46 concentrically surrounds the shaft 9. An O ring 87 is disposed in the interior of the collar 46, within an annular groove which is formed for that purpose (FIG. 5A). The forward end 167 of collar 46 bears against a cooperating surface in the fluid commercial seal 101 and forms a rotationally sliding contact seal, which prevents the leakage of the hydraulic fluid from within the hydraulic transmission to the outside. The leakage of hydraulic fluid is thus prevented by the O ring 87, which rotates with the shaft 9. Also by the O ring 86, which is stationary, and the rotatable sliding contact sealing surface formed at 167, between the collar 46 and the commercial seal 21.

An "A" end tilt plate 7 is provided, which has two semicircular shaped bosses 168, which are integrally formed with the tilt plate. The two bosses 168 are seated in cooperating semi-circular seats 169, which are formed in the seating ring 98, as shown in FIGURES 1, 5A, 17 and 59, and the seating ring 98 is, in turn, seated in an annular groove which is formed in the front end housing 1. The tilt plate 7 may pivot about the center of the arc of the contact surfaces of the semi-circular bosses 168.

The maximum angle of tilt of the tilt plate 7, in the present embodiment, is shown in FIG. 4A, and plate 7, during the operation of this transmission, is maintained at a uniform angle of tilt regardless of the vehicle movement direction. When the tilt plate is in the position and direction of tilt shown in the full lines in FIG. 4A, the transmission drives the vehicle forward, the action of which is explained below. When tilt plate 7 is shifted to the position of tilt wherein the flat surface of the tilt plate is perpendicular to the axis of shaft 9, the transmission is in hydraulic neutral and the engine may be started and the shaft 9 rotated, without any reciprocating of the pistons 11 and without any pumping effect taking place in the cylinders 157.

Figure 14:
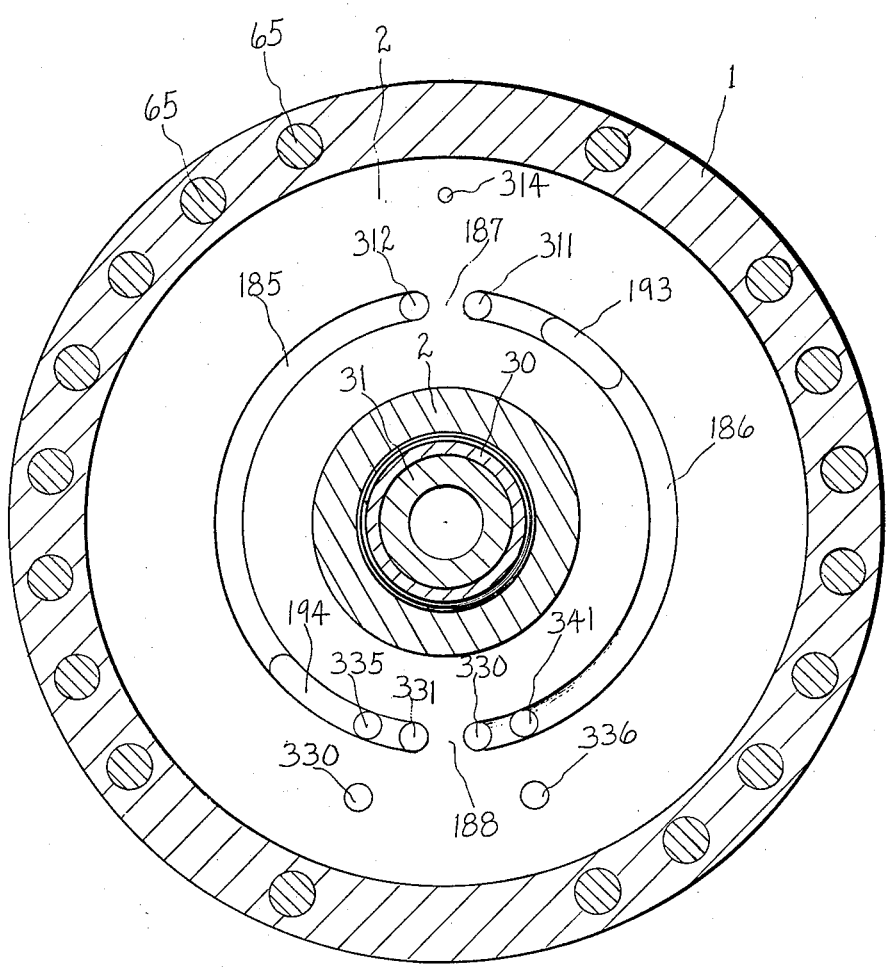

The vehicle may be reversed by moving tilt plate 7 into the position shown by the dot-dash lines in FIG. 14 so that hydraulic fluid is pumped through the hydraulic fluid circulatory system in the opposite direction, resulting in the drive shaft of the vehicle being rotated in the opposite direction.

A simple mechanism for rotating the tilt plate, to its various positions, and holding it in a desired position, is best seen in FIGS. 18, 51, 52 and 53. FIG. 18 is a transverse section through the transmission. Shaft 41 passes through external collar 42 and controls angle of tilt of plate 7.

External collar 42 is threadedly secured, at its inner end 171 to portion 172 of front end housing 1, a gasket 97 preventing leakage of fluid within the transmission. Shaft 41 is concentrically rotatably disposed within collar 42. A shoulder 173 on the inner end of shaft 41, bears against a cooperating seat, formed in the collar 42, whereby shaft 41 is prevented from slipping outwardly. A circular shaped boss 174 integral with shaft 41 on its upper end is approximately cylindrical in shape, although as seen in FIG. 53 the approximate cylindrical outer surface of the boss is slightly bulged in the center to better conform to the geometry of fitting in the slot 175 in plate 7, said boss cooperating therein when the shaft 41 rotates, to vary angle of tilt of plate 7. Since boss 174 is eccentric on shaft 41, when shaft 41 is rotated, boss 174, acting in slot 175 rotates plate 7 about its semicirculate boss 168, into a forward, neutral, or reverse position, as desired.

The O ring 95, in a groove formed on the shaft 41, as shown, prevents leakage of hydraulic fluid out of the transmission, while allowing rotation of shaft 41, back and forth through a small angular distance.

The outer end of the shaft 41 may be attached to a crank, or other types of linkages (not shown), and detents may be provided to provide the proper degree of rotation of the shaft 41. The detents may provide a stop to hold the tilt plate in the forward position, a neutral position, or the reverse position.

While tilt plate 7 may be changed as to its angle of tilt within limits, about the bosses 168 the tilt plate cannot rotate in the same direction that the drive shaft 9 rotates. Referring to drive shaft 9 (FIGS. 4A and 5A and 15), it will be seen that there are nine cylinders 157, in the present configuration of the transmission, which are formed in the annular periphery of the rotating shaft 9. The cylinders 157, each contain pistons 11. The outer ends of the pistons 11 are formed into spherical shaped bosses 176 which are disposed and enclosed in cooperating depressions or spherically shaped holes, formed in the "A" end sliding shoes 14. Shoes 14 bear against the flat surface of the tilt plate 7. The "A" end piston springs 69 bear with one end against the pistons 11 and with the other end against the cylinder end plugs 18, and since said springs are under compression at all times, they, at all times, force pistons 11 against shoes 14 and the shoes 14 against the flat surface of the tilt plate. The springs also exert pressure against the cylinder end plugs 18, which in turn exert pressure against the sliding contacting plate 17. The rear surface of the ring plate 17 then bears against the flat surface 177 of the hydraulic valve and fluid passageway casting 2, and forms an effective fluid seal.

Small holes 178 are formed in the outer ends of the pistons 11, which holes pass through the spherical shaped bosses 176, which bosses are formed in the outer end of the piston, and these small holes terminate in a funnel shape enlargement in their outer ends, as shown (FIG. 5A). These funnel-shaped enlargements permit the shoes 14 to rotate about bosses 176, within certain limits, and still make registration with the fluid passageways 179 in said shoes.

Turning to FIGS. 5A and 60, annular spaces 180 are formed in sliding contact ends of the shoes 14. These spaces 180 are connected to the interior of the cylinders 157, by the passageways just described. The cross sectional area of the spaces 180 is slightly less than the cross sectional area of the cylinders 157. The pressure of the hydraulic fluid in the spaces 180, is at all times equal to the pressure of the hydraulic fluid of the cylinders 157. As a result, most of the force exerted by high pressure fluid within each cylinder 157 is counterbalanced by the opposing force of the fluid in each of the corresponding spaces 180. The excess or differential pressure within the cylinder, then provides a firm contact between the outer ends of the shoes 14, and the flat surface of the tilt plate 7, which contact prevents excessive hydraulic fluid leakage from spaces 180. The annular rims 181 (FIGS. 5A and 60) contact the flat surface of the tilt plate and confine the high pressure fluid within the spaces 180, allowing only a negligible leakage.

Annular grooves 182 are formed concentrically adjacent to the rims 181 and provide lubrication from the outside of the shoe 14, to the radial grooves 183, which connect the annular grooves 182 to the space outside the shoes 14. The semi-circular portions of the circular rims 184, into which rims 184 are divided by grooves 183, also bear against the flat surface of the tilt plate 7, and form a part of the bearing surfaces of the ends of the shoes 14.

The construction of the shoes 14, described above, is similar to the construction of all of the shoes which are fixed to the ends of all the pistons throughout this transmission. By this arrangement of providing spaces 180, connected to the interior of the pistons by the passageways shown, a hydraulic opposing pressure is provided, which almost equals the outward force exerted on the pistons. This outward pressure on the piston is due to hydraulic pressure. But by this arrangement only a small portion of the outer force exerted on the pistons, by the hydraulic fluid within the piston, is actually exerted in metal to metal contact between the ends of the shoes and the flat surface of the tilt plate.

In other words, the only force exerted by the metal to metal contact, between the shoes and tilt plate, is a difference in pressure or differential pressure, between the hydraulic pressure exerted on the pistons from within the cylinder and the hydraulic pressure in the opposing direction, exerted by the high pressure fluid within the spaces 180. Since the frictional losses due to the shoes sliding on the tilt plate are proportional to the force or pressures by which the shoe bears against the tilt plate, in metal to metal contact, it will be seen by this arrangement most of the frictional losses are eliminated. By metal to metal contact, in this analysis of the differential pressure concept, we refer to the close contact between the annular rims 181 respective and 209 and the semi-circular portions of the members 184 and 211 within the respective plates, even though there is a thin lubricating film of oil in between.

When the vehicle engine 9a rotates shaft 9 the pistons 11, shoes 14, springs 69, cylinders and plugs 18 and sliding contact ring plate 17, are carried in rotation with it. The contact ring plate 17 then slides rotationally against the hydraulic valving and fluid passageway casting 2, and forms a fluid seal. At the opposing end of the cylinders the shoes 14 slide over the surface of the tilt plate 7.

It will be evident that when the tilt plate 7 is at an angle, the pistons 11, as the shaft 9 rotates, will be caused to reciprocate. Viewing FIG. 4A it will be seen that when a piston and shoe is contacting the tilt plate 7, at the upper portion of the tilt plate, as viewed in FIG. 4A, the piston 11 is at its maximum outward position. And when the same piston has been carried around one half of a revolution by the rotating shaft 9, the same piston is now at its maximum inward position, as shown by the position of the piston 11 as shown at the lower portion of FIG. 4A. Thus, as the shaft 9 rotates, the pistons 11 reciprocate through a complete cycle during each revolution of the shaft 9.

The reciprocation of the pistons 11 provides a pumping action in each cylinder 157, just as in the case of any piston type pump. Also, just as in any piston type pump, it is necessary to provide a valving means, whereby fluid may flow out of the cylinders when the piston is being pushed inwardly. It is also necessary to provide a valving means whereby the fluid may flow into the cylinders when the pistons are being pushed outwardly. The inlet and outlet passageway through which fluid flows is provided by the passageways 161 concentrically formed in the cylinder and plugs 18.

It is desirable to have a common and mutual valving system which will simultaneously provide the proper valving for all nine of the cylinders carried by the shaft 9. A sliding flat plate type of valving is provided. Observe FIGS. 3, 4A, 14 and 15. In this analysis and description the cylinders 157, as seen in FIG. 16, are identified by reference characters 157a to 157i inclusive to better describe the action. It will be observed that the transverse actions of both FIGS. 14 and 16 are taken looking toward the rear of the transmission and vehicles with the shaft of 9 rotating clockwise, as viewed in said figures.

As seen in FIG. 14, two semi-circular grooves 185 and 186 are formed in the flat surface of the casting 2, which casting contacts sliding contact ring plate 17. When the tilt plate 7 is at the angle of tilt as shown in FIG. 4A, the vehicle is being driven forward. Comparing FIGS. 14 and 16 it will be understood that the passageway 161a, which is the then uppermost specific one of the passageways 161 is at the present instant in contact with the surface 187, which is between the ends of the semi-circular grooves 185 and 186. In this position the fluid in the particular cylinder 157, which empties into the passageway 161a cannot flow out of the cylinder. At this position, however, upon observing the tilt plate 7, it will be seen that for a brief rotational distance, at this upper position, the cylinder is not reciprocating anyway, and there is no need for an outgoing passageway.

Simultaneously, however, in this same rotation position with the shaft 9, the remaining passageways which lead from the remaining cylinders, do connect with one or the other of the semicircular grooves 185 and 186. And the passageways 161 of cylinders 157b, c, d, and e are at the moment connecting with the semi-circular groove 185 and the passageways 161 of cylinders 157f, g, h and i are connecting with the semi-circular groove 185.

Figure 15:
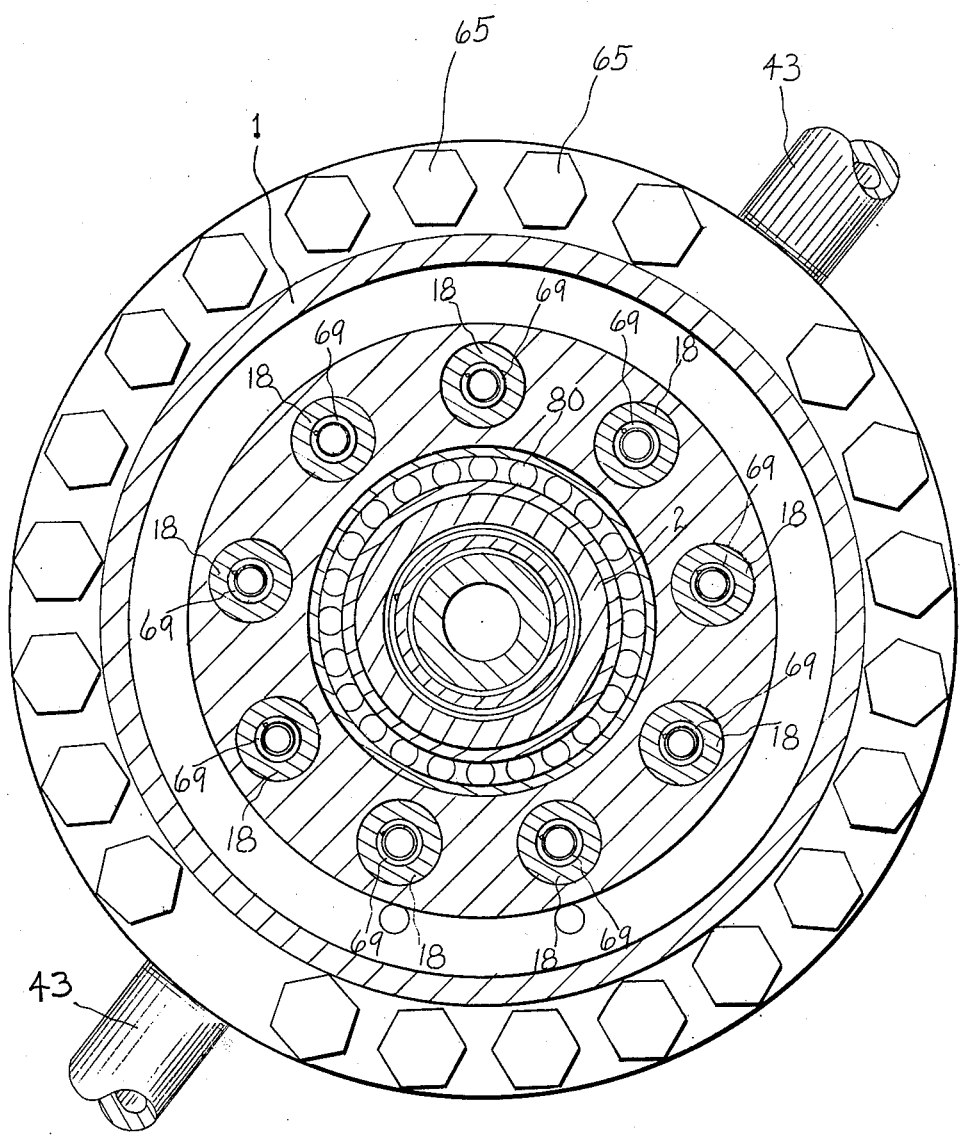

It will be seen, observing the angle of the tilt plate in FIG. 4A, and noting that the shaft is rotating in a clockwise direction, as viewed in FIGS. 14 and 15, that the pistons 11 which are within the cylinders 157b, c, d and e connecting with the respective passageways 161 are being pushed inwardly by the sloping tilt plate 7 as the shaft 9 rotates. Consequently, the pistons are pumping hydraulic outwardly through the respective passageways 161 of cylinders 157b, c, d and e; and into the semi-circular groove 185. Simultaneously the pistons 11 which are within the cylinders 157f, g, h, and i and are connecting with the respective passageways 161 are being pushed outwardly by the springs 59, and fluid is being drawn into these cylinders from the semicircular groove 185, through said passageways.

As seen in FIGS. 14 and 15, it will be apparent that passageway 185, when the angle of the tilt plate is that shown in FIG. 4A is receiving fluid, which is being pumped from the cylinders. The semi-circular groove 186 is then filled with high pressure fluid and is in the high pressure side of the hydraulic fluid circulatory system. Simultaneously, under this tilt plate annular position, the semi-circular groove 185 is serving as a source of fluid supply from which fluid is being drawn into the cylinders 157f, g, h, i, through the respective passageways 161 which are at the moment registering with groove 185. The semi-circular groove 185, when the vehicle is being driven forward, is in the low pressure side of the hydraulic fluid circulatory system. It will be obvious that if the tilt plate 7 should be moved into the angular position shown by the dot-dash lines on FIG. 4A the situation will be reversed. The semi-circular groove 186 will now be in the low pressure side of the hydraulic fluid circulatory system, and the semi-circular groove 185 will now be in the high pressure side of the system. Under this condition, as explained below the drive shaft of the vehicle will be rotated in a counterclockwise direction, and the vehicle will be driven in reverse.

Figure 10:
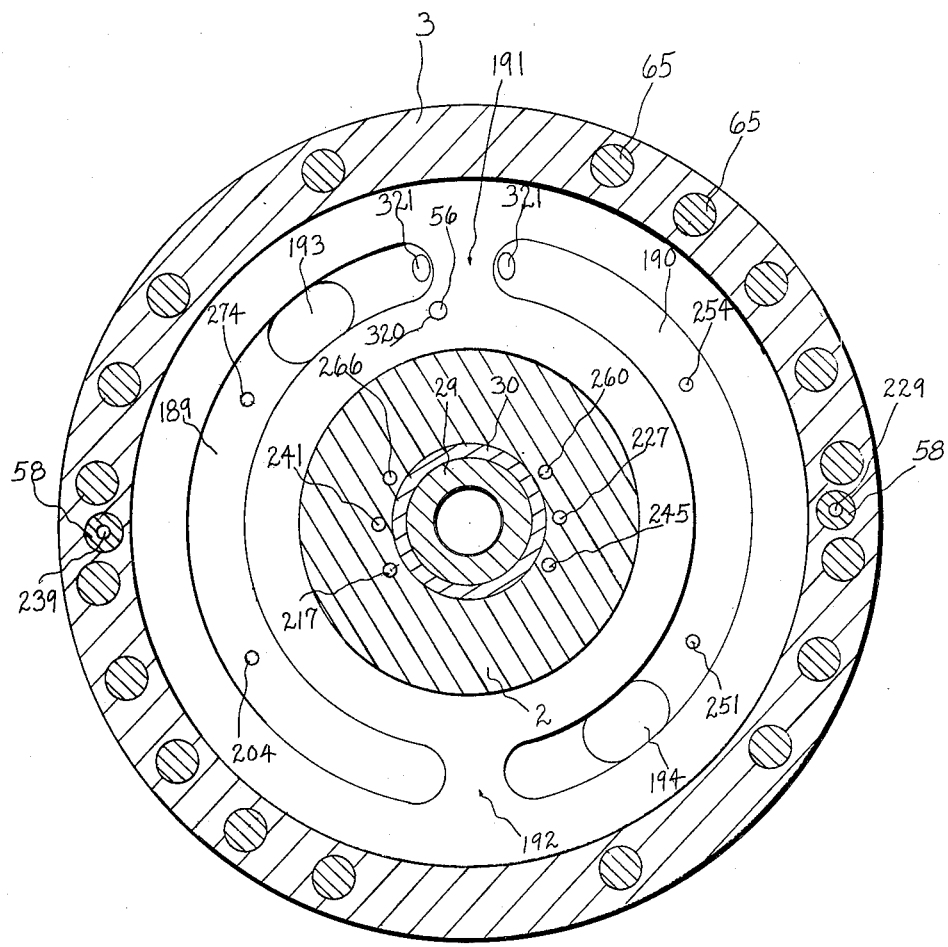
Figure 11:
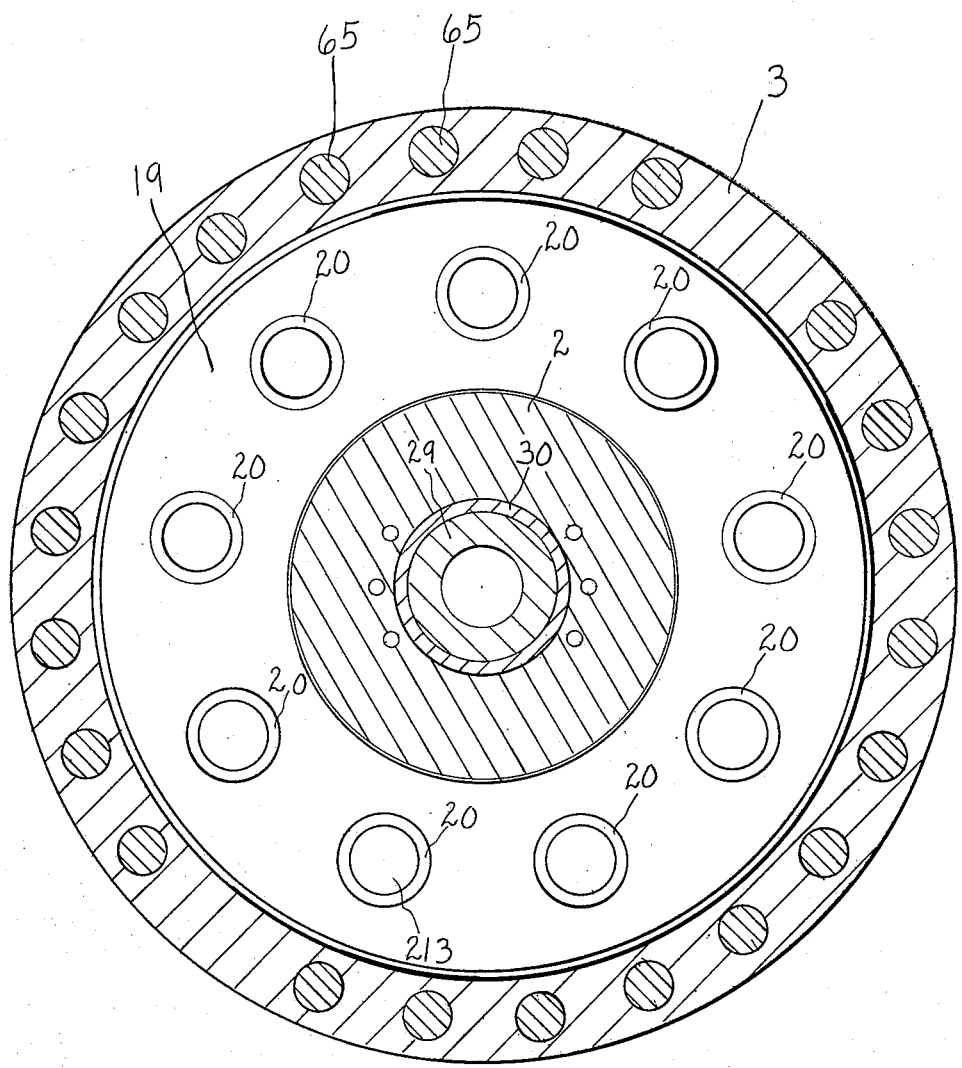

The passageways which permit the flow of hydraulic fluid from the A end to the B end will now be described. Observe FIGURES 10, 14, 34, 40, 54, 57 and 58. FIGURE 10 is a transverse section through the transmission looking forward, showing the semi-circular grooves 189 and 190. As will be apparent, the groove 189 is the high pressure semi-circular groove, when the vehicle is being driven forward, and the semi-circular groove 190, in this case, is the low pressure groove.

When the vehicle is driven forward, the high pressure fluid flows from the semi-circular groove 186 as seen in FIGURE 14, through the passageway 193 and into the semi-circular groove 189, which is shown in FIGURES 10 and 34. Simultaneously, low pressure fluid flows from the B end or hydraulic motor, subsequently to be described, into the low pressure semi-circular groove 190. From the groove 190 the fluid flows through the passageway 194 and into the A end semi-circular groove 185, then into the cylinders of the A end pump, thus completing the fluid circulation.

When the vehicle is being driven in reverse, the fluid flow is in the reverse direction. In this condition, the high pressure fluid flows from the cylinders of the A end pump, as the A end shaft rotates, and into the semi-circular groove 185, which is now the high pressure fluid collector. This high pressure fluid then flows through the passageway 194 and into the semi-circular groove 190, which is now the high pressure groove, which is serving the B end motor and into the cylinders of the B end hydraulic motor. The high pressure fluid rotates the motor, in a manner subsequently fully described, and having done this, the fluid continues as low pressure fluid into the semi-circular groove 189, then through the passageway 193, thence into the A end semi-circular groove 186 and into the A end cylinders on what is now the low pressure side.

*Description of B End or Hydraulic Motor*

B end or hydraulic motor is disposed in the general 4B, 5B location B (FIGURES 4B and 5B). Observe FIGS. 1, 9, 10 and 11.

The A end or hydraulic pump as previously explained, is driven or rotated by the engine of the vehicle, and the pumping action of the A end pump is provided by reciprocating cylinders 11. The B end, or hydraulic motor, on the other hand, receives high pressure fluid, which is forced into it by the pumping action of the A end or hydraulic pump, and this fluid in passing through the B end or motor and returning to the A end or pump, causes the B end to rotate.

The B end motor is comprised of a shaft 10, which is carried at its forward end by tapered roller bearing 81; and at its rear end by tapered roller bearing 82. A collar 22 is threadedly secured in the rear end casting 4, as shown. An O-ring 88 is disposed in an annular groove, which is formed in the collar 22, and this O-ring prevents leakage of hydraulic fluid between the outer periphery of the collar 22 and the encompassing rear end casting 4. The forward end 195 of the collar 22 bears against the rear side of the bearing 82. The forward side of the bearing 82 bears against the shoulder 196, which is formed in the shaft 10 as shown. The pressure for the initial loading of the tapered roller bearings 82 and 81, which is threadedly adjusted by the collar 22, is transmitted through the shaft 10, and to the rear side of the bearing 81 by means of the shoulder 197.

The force of the bearing exerted by the shoulder 197 is resisted by the shoulder 198, which is formed in the hydraulic valving and fluid passageway casting 2 as shown. By this arrangement any desired initial loading may be given the tapered roller bearings 81 and 82 by the threaded adjustment of the collar 22. The collar 22 may be turned with a spanner wrench by means of the holes 199 which are formed in the collar.

A commercial fluid seal 102 is disposed within the collar 22. A collar 47 surrounds the shaft 10, as shown and the O-ring 89, is disposed in a groove formed on the inner cylindrical surface of the collar 47 as shown. The O-ring 89 prevents leakage of hydraulic fluid between the shaft 10 and the surrounding collar 47. The rear end 200 of the collar 47, which collar rotates with the shaft 10, forms a rotational contact with the cooperating annular flat surface of the annular commercial seal 102. This permits the shaft to rotate and yet prevent loss of hydraulic fluid through leakage.

The rear end of the shaft 10, protruding through rear end casting 4, supports a brake band pulley 5 keyed thereon by keys 99. A plate 59 secures the pulley 5 on the shaft 10. The plate 59 is secured by the machine screw 68. Machine screws 100 are threadedly secured in a thickened portion of the pulley flange (FIG. 5B). The protruding threaded ends of the machine screws 100 are utilized for connection with the drive shaft of the vehicle.

Figure 9:
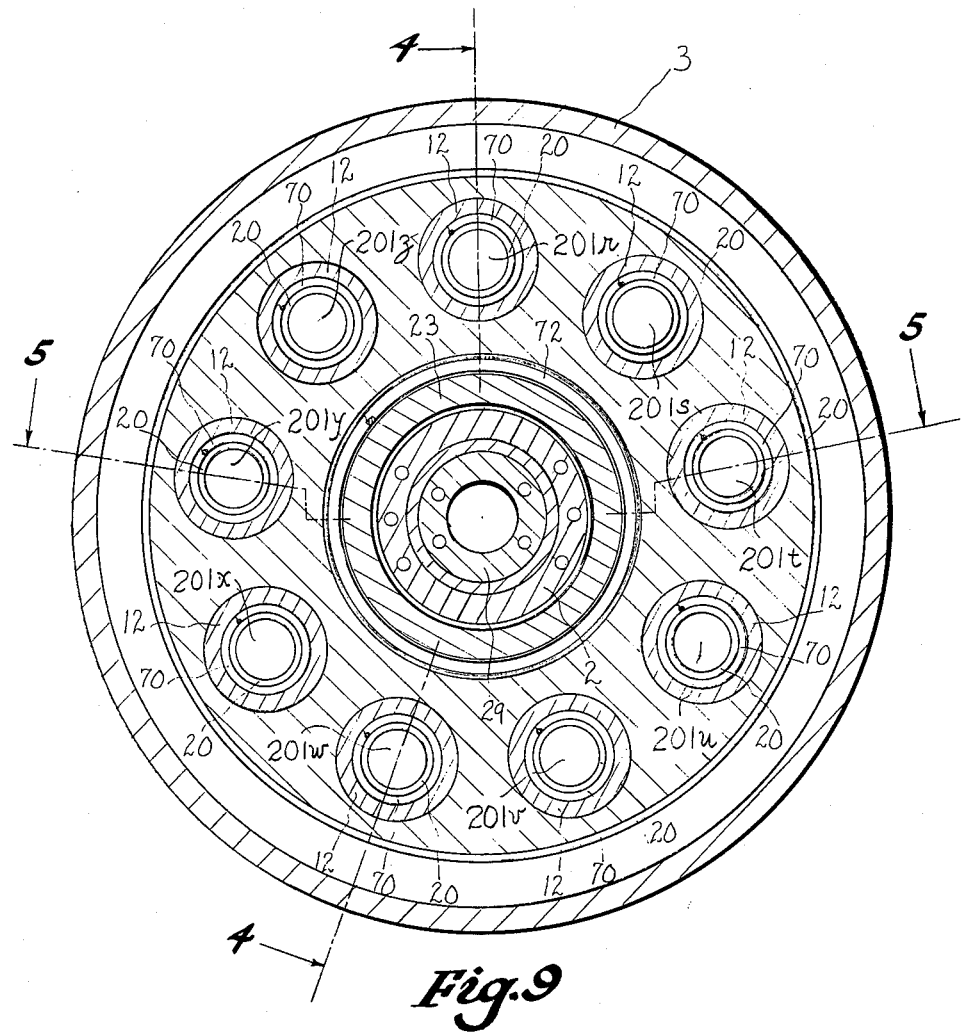

A series of cylinders 201 are formed within the outer cylindrical portion of shaft 10 (FIG. 9). Pistons 12 are disposed in these cylinders. The outer ends of pistons 12 are formed into spherical shaped bosses 202 which are inserted into cooperating holes in the shoes 15 which bear against the B end tilt plate 8. Plate 8 is pivoted on two semi-circular bosses 203, which are rotationally seated in cooperating semi-circular seats machined in the rear end casting 4 (FIGS. 4B and 61). The tilt plate 8 may pivot on the semi-circular bosses 203 over a limited angular distance. The tilt plate 8 as seen in FIG. 4B is shown at its maximum angle of tilt in this preferred embodiment of the invention.

The angle of tilt at which plate 8 is held is controlled hydraulically, by the upper and lower pistons 13, which reciprocate in the cylinders 153 and 154 formed in the rear end casting 4. The control of the high pressure and low pressure hydraulic fluid in and out of the cylinders 153 and 154 to adjust the angle of tilt of the tilt plate 8 is described below.

The fluid passageways 205 in the ends of the pistons 12, allow hydraulic fluid to flow from the interior of the cylinders 201, thence through the passageways 207, in shoes 15, and into the annular fluid spaces 208.

As will be seen in FIG. 62, which shows the end of a shoe 15 which bears against the tilt plate 8, the general construction is the same as that of the shoe 14. The space 208 for hydraulic differential back pressure is formed, the annular rim 209 to contain this high pressure fluid is provided, and the annular groove 210 is provided for better lubrication. The ends of the cylinders 201 are stopped by the cylinder and plugs 20. Fluid leakage between said plugs 20 and the inner cylinder walls is prevented by the O-rings 91 disposed in annular grooves in the cylindrical outer surface of the end plugs 20. The outer cylindrical ends of end plugs 20 are inserted into cooperating holes in the sliding contact ring plate 19. Helical springs 70 are disposed within each of the cylinders, one end of the springs 70 bearing against the inner portion of the outer ends of the cylinders 12, and the opposite ends of the said springs bearing against seats which are formed in the inner ends of the cylinder end plugs 20. The springs 70 by their initial or assembled compression, exert pressure on the sliding contact plate 19 through the cylinder end plugs 20 and press the ring 19 against the flat surface of the rear side of the hydraulic valving and fluid passageway casting 2, thus forming a hydraulic seal. The rear ends of the springs 70 force the ends of shoes 15 against tilt plate 8, thus forming a sliding seal and preventing excessive leakage of high pressure fluid from the spaces 208.

In the operation of the B end, or hydraulic motor, when the vehicle is being driven forward, the high pressure fluid flows through the passageway 193 from the A end pump as previously explained. This high pressure fluid fills the semi-circular groove 189. Observe FIG. 9 which is a transverse section through the transmission looking toward the front end of the vehicle. Various cylinders 201 are successively numbered in a clockwise direction, as viewed in FIGURE 9, by the lettered reference characters 201a to 201z inclusive for better description of the functioning of the B end hydraulic motor. It will be seen in FIGURES 4A and 4B, 9 and 11, that the round holes 213 are concentrically formed in the cylinder end plugs 20, through which the fluid may enter or leave the cylinders.

In the position shown in FIGURE 9, the cylinder 201r is closed by the surface 191, located as shown in FIG. 10, and no hydraulic fluid can flow in or out of the cylinder 201r. In the view looking forward, as shown in FIGURE 9, the shaft 10 is rotating in a counterclockwise direction. The cylinders 201z to 201w are registering with the semi-circular groove 189, which contains high pressure fluid. At the same time, the cylinders 201s to 201v are registering with the semi-circular groove 190, which contains low pressure fluid. High pressure fluid is flowing into the cylinders 201v to 201w from the semi-circular groove 189. Simultaneously, low pressure fluid is flowing out of the cylinders 201s to 201w into the semi-circular groove 190, which contains low pressure fluid.

Turning to FIG. 4B and the sloping position of the tilt plate 8, it is obvious that when the high pressure fluid flows into the cylinders 201z to 201w from groove 189, that a powerful outward force is exerted on the pistons 12 disposed within said cylinders. This force is transmitted to the shoes 15, which are connected to the pistons contained in the cylinders 201z to 201w by the ball and socket arrangement in the manner shown. The outer ends of these shoes bear against the smooth sloping plane surface of the tilt plate 8. Due to the slope of the tilt plate surface, on which the shoes 15 are resting, the shoes slide down the sloping surface. Since the tilt plate 8 cannot rotate and is held in a stationary position with respect to the rotation, the sliding shoes 15, reacting through the pistons, which exert a lateral force on the piston and cylinder walls, cause the shaft 10 to rotate, carrying the pistons 12 and shoes 15, around with it.

While the pistons, contained in the cylinders 201z to 201w are being forced outwardly by the high pressure fluid within the cylinder, the shoes 15 attached to the pistons within the cylinders 201s to 201v are riding up the slope of the inclined plane, formed by the flat surface of the tilted plate. This action causes the pistons within the cylinders 201s to 201v to move inwardly, forcing the hydraulic fluid in front of the piston, out through the openings 213 and into the low pressure semi-circular groove 190. The low pressure fluid then passes through the passageway 194 and returns to the low pressure semi-circular groove 185, of the A end pump, from whence it returns to the various cylinders 157 of the A end, as the A end rotates. This completes the circulation of the hydraulic fluid in the circulatory system.

The B end shaft 10, as viewed in FIGURE 9, is rotating in a counterclockwise direction. FIGURE 9 is looking toward the front of the vehicle. This is in the same direction as the rotation of the A end shaft, since the A end shaft is rotating in a clockwise direction, as viewed in FIGURE 16, and FIGURE 16 looks toward the rear of the vehicle. In other words, the shaft of the B end, as viewed looking toward the rear of the vehicle, is rotating in a clockwise direction, and this is the customary direction of rotation of the drive shaft of a conventional vehicle.

It will be obvious, with reference to the description in the foregoing pages of the hydraulic pumping action of the A end, and the hydraulic motor action of the B end, that when the tilt plate 7 of the A end pump is tilted into the position shown by the dot-dash lines the fluid is forced through the hydraulic circulatory system by the A end pump, in the reverse direction.

In this case, the high pressure and low pressure lines reverse. In this case, the A end semi-circular groove 186, the passageway 193 and the B end semi-circular groove 189 become a part of the low pressure side, and the A end semi-circular groove 185, the passageway 194 and the semi-circular groove 190 become a part of the high pressure side. In this condition, it will be observed that the B end motor will be driven in the opposite direction and the vehicle drive shaft will be rotated in the opposite direction, and the vehicle will be driven in reverse.

The construction and functioning of the hydraulic pressure sensitive hydraulic servo system, which varies and controls the power ratio provided by the transmission will now be described and explained. Observe FIGURES 4A, 4B, 5A, 5B, 10, 12, 21, 22, 23, 24, 25, 26, 27, 28, 29, 30, 31, 42, 43, 44, and 50.

As explained in the first portion of the description of this invention, in which the general principles of operation and the theory of the functioning of the transmission was described, the major portion of the automatic adjustment of the power ratio is performed by a pressure sensitive hydraulic servo system. This servo system senses the hydraulic fluid pressure in the high pressure side of the fluid circulatory system, between the A end and B end. When the torque requirement on the drive shaft of the vehicle becomes greater, as when the vehicle encounters a steeper grade, the fluid pressure in the high pressure side of the system increases. This increase in pressure is detected by the pressure sensitive servo, and hydraulic valving is accomplished which permits high pressure fluid to flow into the cylinder 153. Simultaneously, valving is accomplished which permits a portion of the hydraulic fluid to flow out of the cylinder 154. This increases the angle of tilt of the B end tilt plate 8. This, in turn, forces the B end pistons 12 to reciprocate over a greater distance during a revolution of the shaft 10, and increases the hydraulic displacement per revolution of the B end, or hydraulic motor. When this occurs, the engine of the vehicle and the A end pump must rotate more times to cause the B end to rotate once. This provides a greater torque ratio. The transmission can then provide a greater torque on the B end shaft 10 and on the vehicle drive shaft, with a given fluid pressure in the high pressure side of the transmission. The process of adjustment of the angle of the tilt plate 8 continues until a state is reached at which the fluid pressure at a desired standard or predetermined level, may provide enough torque on the drive shaft of the vehicle to meet the torque requirements.

Conversely, when the torque requirement on the drive shaft of the vehicle decreases, such as when a vehicle has climbed a hill and enters a stretch of roadway having a less steep grade, the reverse occurs. In this case, the pressure-sensitive servo system senses a drop in the pressure of hydraulic fluid in the high pressure side of the circulatory system. This, then, causes hydraulic fluid valving action to occur which would allow high pressure fluid to flow into the cylinder 154 behind the piston 13. Simultaneously, hydraulic fluid valving action occurs which permits hydraulic fluid to flow out of the cylinder 153. This causes the tilt plate 8 to rotate or pivot on its semi-circular bearing bosses 203, to a smaller angular position, or an angular position nearer that of perpendicular.

When this occurs, the length of the stroke of reciprocation of the pistons 12 of the B end are shortened, and the hydraulic displacement of the B end per revolution is less. Then the engine of the vehicle, and the A end, will rotate fewer times to cause the B end to make one revolution. This adjustment continues, until the torque ratio of the transmission has been decreased to the degree that the smaller torque requirement on the vehicle drive shaft can be provided by a hydraulic fluid pressure in the high pressure side of the circulatory system, which is at the predetermined or designed fluid pressure at which the hydraulic system transmission should function.

The detailed description of how this is accomplished will now be given. The first portion of this description will concern the high pressure fluid valving and passageways. Then the low pressure fluid valving and passageways will be described.

Observe FIGURES 10, 12 and 38. As previously stated, the semi-circular groove 189 is filled with high pressure fluid when the vehicle is being driven forward. This is the condition which is assumed in this first description.

The high pressure fluid may flow through the hole 204, and into the annular groove 205 which is formed in the particular threaded plug 44. From the annular space formed by groove 205, the high pressure fluid may flow through the transverse hole 214 in the threaded plug 44, thence through the axial hole 215, formed in the same plug and the fluid may then bear against the valve ball 63. The high pressure fluid then compresses the spring 76 and the hydraulic fluid may then flow through the passageway 216 into the axially disposed hole 217.

From this axially disposed hole 217 the high pressure fluid may continue to flow through the short radial hole 218 (FIG. 38) formed in the casing 2, and thence may flow into the annular space or groove 219, which is formed in the rearward cylindrical portion of the part 2 as shown. The high pressure fluid then flows around the annular groove 219 and enters the radial hole 220, in the lower side, which hole is formed in the threaded ring 24. The high pressure fluid passes around the annular groove and also enters the radial hole 221, also formed in the threaded ring 24, and which is 180 degrees removed from the first hole 220. The high pressure fluid then enters the spaces or passageways 151 and 152 behind the two pins 49. The high pressure fluid exerts a force against the inner ends of the pins 49.

The threaded ring 24 is screwed up tight against the bearing 81, which bearing forms a stop. It will be seen that due to the existence of the annular groove 219, it is not necessary for the final tightening of the threaded ring 24 to have any particular rotational position.

The outer ends of the pins exert a force against the sleeve 23. The sleeve 23 is slideably disposed about the rear cylindrical portion of the hydraulic valving and fluid passageway casting 2 as shown. The rearward force of the two pins 49 is opposed by the compressed spring 72, which has enough initial or assembled compression to balance the hydraulic forces on the inner end of the spring, which are exerted by the pins 49. The spring 72, in this condition of balance, holds the sleeve 23 in its neutral position, as seen in FIGURES 5A and 5B and 38. This balanced condition occurs when the pressure of the high pressure fluid in the circulatory system is at the designed, or desirable fluid pressure.

Now, if the vehicle should suddenly be confronted with a greater torque requirement, such as when suddenly encountering a steeper grade, the hydraulic fluid pressure, in the high pressure side of the hydraulic circulatory system, increases. The fluid pressure against the inner ends of the pins 49 then becomes greater than the resisting force of the spring 72, and the sleeve 23 is moved rearward, or to the right as viewed in FIGURES 5A and 5B and 38.

It will be seen that the high pressure fluid may flow down the axial passageway 217, and then through the short radial hole 222, and into the annular groove 223, which is formed on the outer surface of the rear cylindrical appendage to part 2, as shown. From the annular space 223 the high pressure fluid then flows into the wider annular space 224, which is formed in the interior cylindrical surface of the sleeve 23. The high pressure fluid which fills the annular groove 224, is available at all times for immediate use to flow through passageways, now to be described, into one or the other of the cylinders controlling the angle of the tilt plate 8, as may be required.

When the hydraulic fluid pressure increases, the higher pressure on the inner ends of the pins 49 overcome the balancing force of the spring 72, and the sleeve 23 moves to the right. The annular space 224, formed in the interior of the sleeve 23 registers with the annular space 225, which is formed on the outer surface of the rear cylindrical appendage of the part 2. The high pressure fluid then flows from the annular groove or space 225, into the short radial hole 226, as seen in FIGURE 5B, and thence into the axial passageway 227. This passageway 227 intersects with the radial passageway 228. From the passageway 228 the high pressure fluid flows into the axial passageway 229 in tube 58 leading into space 230.

Now observing FIGURES 6 and 20, the high pressure fluid flows through the passageway 231, thence into the axial passageway 232, and thence into the transverse passageway 233, from whence the fluid enters into the space 153, behind the upper piston 13 as viewed in FIGURE 4B. This additional high pressure fluid, behind the piston 13, then begins to push the piston forward to increase the angle of tilt of the tilt plate 8.

If it were not possible for the hydraulic fluid to escape from the cylinder 154, as seen in FIGURES 4B and 19, from behind the piston 13, there would be a hydraulic blocking which would resist the increase in the angle of tilt of the tilt plate 8, when additional high pressure fluid flowed into the cylinder 153, through the passageways which have just been described. It is necessary to open passageways through which the fluid in space 154 can flow out, simultaneously with the opening of passageways which permit the high pressure fluid to flow into the space 153. The manner in which this is accomplished will now be described.

Observe FIGURES 4A, 4B, 5A, 5B, 6, 10, 12, 19, 20, 24, 34 and 39. Assuming that the vehicle is being driven forward, the semi-circular groove 189 is filled with high pressure fluid and the semi-circular groove 190 is filled with low pressure fluid. When the sleeve 23 is moved to the rear, or to the right as viewed in FIGURES 5A and 5B, due to the increase of the pressure of the high pressure fluid, not only does valving action occur which opens the high pressure passageways, as has been described, but also valving action occurs which opens low pressure passageways from the cylinder 154 to the semi-circular groove 190.

When the sleeve 23 moves to the right, the annular groove 234, which is formed in the interior of sleeve 23, registers with the annular groove 235, which is formed on the outer periphery of the rear cylindrical portion of part 2. When this occurs, fluid from the cylinder 154 may flow through the transverse hole 236 thence into the axial hole 237 (FIGURE 5B), which is concentrically formed in the fluid passageway tube 58. The low pressure fluid may then flow through the radial passageway 240, through the axial hole 241, thence through the short radial hole 242, and into the annular groove 235. From the annular groove 235, the fluid may then flow into the annular groove 234 and into the annular groove 243, which is formed in the casting 2.

Now observing FIGURE 24, it will be seen that the fluid may flow around the annular groove 243, and through the short radial hole 244 and into the axial hole 245. The fluid then flows through the short radial hole 246 (FIGURE 39) pushes up the valve ball 263 against the weak spring 77, flows through the radial hole 247, through the short hole 248, which is formed in the part 44, thence through the transverse hole 249, formed in the part 44, and into the annular groove 250 which is formed in the same part 44. From the annular groove 250, the low pressure fluid flows into the axial hole 251, and into the semi-circular groove 190, and thence into the low pressure side of the hydraulic circulatory system.

Thus, by the system of passageways described above, the low pressure fluid may flow from the cylinder 154, as a result of the moving of the sleeve 23 to the right as viewed in FIGURES 5A and 5B and the valving action made possible as a result of this movement. Then, as a result of the pressure of the fluid in the high pressure side of the circulatory system, in the action described in the above paragraph, high pressure fluid flows into the space or cylinder 153 and, simultaneously, low pressure fluid flows out of the space or cylinder 154. The tilt plate 8 increases the angle of tilt, and the torque ratio of the transmission is increased. The distance of reciprocation of the pistons 12, of the B end motor, is increased, the displacement of the B end motor is increased, and the engine and A end pump must now rotate more times for each revolution of the B end. Then a greater torque is placed along the B end shaft 10 and the vehicle drive shaft, even though the fluid pressure in the high pressure side returns to the design pressure.

The functioning of the transmission, when there is a lessening of torque requirement on the drive shaft of the vehicle, will now be described. This condition occurs, as one illustration, when the vehicle is climbing a grade of a certain steepness, and then encounters a grade which is less steep. Or a vehicle may be traversing through mud or sand, and then encounter firmer terrain, and the torque requirement on the vehicle drive shaft will decrease. As another illustration, if the vehicle is being accelerated by the driver, by pushing down on the foot throttle, and the driver then ceases to accelerate the vehicle, there will be a lessening in the torque requirement on the vehicle drive shaft.

When there is a decrease in the torque requirement on the vehicle drive shaft, for any reason, there is a drop in the pressure level of the hydraulic fluid in the high pressure side of the circulatory system. When this occurs the fluid pressure decreases in the spaces or passageways 151 and 152 (FIGURE 38) and which spaces are behind the ends of the two pins 49. The outer ends of these two pins bear against the end of the sleeve 23, as previously explained, and balance the pressure of the spring 72. When the force exerted by the pins 49 as determined by the fluid pressure, and the opposing force exerted by the spring 72, are equal, the sleeve is in its neutral position, as shown in FIGURES 5A and 5B. But with a pressure drop in the hydraulic fluid, the force exerted by the spring 72 now overcomes the opposing force exerted by the pin 49, and the sleeve moves toward the front of the transmission, or to the left as viewed in FIGURES 4A and 5A.

When this movement to the left of the sleeve 23 occurs, the annular groove 252, which is formed in the rear of the cylindrical portion of the casing 2, then registers with the annular groove 224, which is formed in the interior of the sleeve 23, as shown, and then high pressure fluid flows from the semi-circular groove 189 through the axial hole 204 (FIGURE 10) and into the annular groove 205, which is formed in this threaded plug 44. From this annular groove the high pressure fluid flows through the transverse hole 214 (FIGURE 12) then through the short concentric axial hole 215. The high pressure fluid then pushes the valve balls 63 inward, compressing the spring 76, then flows through the radial hole or passageway 216, and into the axial hole 217. From the hole 217, the fluid flows through the short radial hole 222 (FIGURE 38) and into the annular groove 223. From this annular groove 23, the high pressure fluid flows into the internal annular groove 224, which is formed in the interior cylindrical surface of the sleeve 23.

Figure 30:
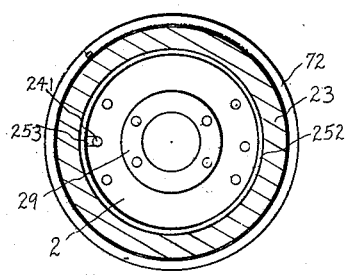

When the sleeve 23 is moved to the left, by the momentarily greater pressure in the spring 72, the annular groove 224 registers with the annular groove 252. When this occurs, the high pressure fluid then, as seen in FIGURE 30, flows around the annular groove 252 and through the short radial hole 253, and into the axial hole 241. The high pressure fluid flows through the hole 241, then through the radial hole 240, and then through the hole 239, which is formed in the fluid passageway 258. The high pressure fluid then flows through the passageway 238 as shown in FIGURES 6 and 19, thence through the axial hole 237, thence through the transverse hole 236, and into the space or cylinder 154. The high pressure fluid, flowing into the cylinder 154, then pushes the piston 13 in an outward direction.

Simultaneously with the above, when the sleeve 23 moves to the left, the annular groove 234 registers with the annular groove 225. Then the fluid, which is now trapped in the cylinder 153, may flow out the transverse passageway 233, then through the axial passageway 232, and through the fluid passageway 231. The low pressure fluid then flows through the axial passageway 229, into the radial passageway 228 and thence into the axial passageway 227.

This low pressure fluid then flows through the short radial hole 226 and into the internal annular groove 234, which at the moment is registering with it. The low pressure fluid then flows around the groove 234, into the annular groove 243, and through the short radial hole 244, and into the axial hole 245. From the hole 245, the low pressure fluid flows through the short radial hole 246 and forces the valve ball 63 back against the pressure of the weak spring 77. The fluid then flows up the radial hole 247. Then the low pressure fluid flows through the short hole 248, through the transverse hole 249, into the annular groove 250 then through the hole 251 and into the semi-circular groove 190.

The semi-circular groove 190 contains low pressure fluid, when the vehicle is going forward. And then the low pressure fluid, which is at the moment flowing out of the space 153, joins the low pressure fluid, in the low pressure side of the circulatory system.

It will thus be seen that, as the result of the simultaneous flowing of high pressure fluid into the cylinder 154, and the flowing out of low pressure fluid from the cylinder 153, the tilt plate is rotated on its axis to a position of less angle of tilt. When this occurs, the difference of reciprocation of the pistons 12 of the "B" end motor is shortened and the displacement of the "B" end motor per revolution is decreased. The engine and the "A" end pump then rotate fewer times in order to rotate the "B" end shaft 10, and the vehicle drive shaft, one revolution. This then causes a decrease in the torque ratio. The fluid pressure level, in the high pressure side of the circulatory system, then increases. This adjustment as to the angle of the tilt plate continues until the pressure of the high pressure fluid again just balances the force of the spring 72, when the sleeve 23 is in its neutral position.

Here follows a description of the functioning of the transmission when the vehicle is being driven in reverse.

As previously explained, when the "A" end tilt plate 7 is in the position shown by the dot-dash lines, the vehicle is driven in reverse, and the fluid flows through the transmission in the opposite direction, as has been previously described. Then the semi-circular grooves 186 of the "A" end and 189 of the "B" end become low pressure fluid carrying grooves. And the semi-circular groove 185 of the "A" end and the semi-circular groove 190 of the "B" end become high pressure fluid containing grooves.

If the vehicle, while being driven in reverse, encounters a steeper grade, or any other condition which will increase the torque requirement on the vehicle drive shaft, the pressure of the fluid in the high pressure side of the circulatory system increases.

Observe FIGURES 4A, 4B, 5A, 5B, 6, 10, 12, 38 and 44. It will be here noted that the fluid of the semi-circular groove 189 is now low pressure. At this low pressure level, the fluid in the semi-circular groove 189 can flow through the passageway 204 into the annular space 205, thence through the transverse hole 214 and through the axial hole 215 and may contact the valve ball 63. The flow of the low pressure fluid, however, is stopped here. The fluid pressure is not great enough to compress the spring 76, as it was when the fluid in the semi-circular groove 189 was high pressure fluid.

But the fluid of the semi-circular groove 190, which is now high pressure fluid, may now flow through the hole 254, around the annular groove 255, through the transverse hole 256, thence through the short concentric hole in part 44 and bear against the ball valve 63. Since this fluid in the semi-circular groove 190 is now high pressure, the force of the fluid against the ball valve 63 overcomes the pressure of the spring 76. The spring 76 is compressed, the ball is forced inward, and the fluid flows through the radial holes 258, thence through the smaller hole 259, and into the axial hole 260. The high pressure fluid now flows through the short radial hole 261, and into the annular groove 223. The annular groove 223 is always in registration with the annular groove 224, and it will thus be seen that the annular groove 224 always contains high pressure fluid, regardless of whether the vehicle is being driven forward or in reverse.

Now observe FIGURE 44, where passageways are shown, whereby the axial hole 260 is always commonly connected with the axial hole 217. The fluid from the hole 260 may flow through the transverse hole 264, thence through the transverse hole 263, and through the transverse hole 262, and into the axial hole 217. This occurs when the vehicle is being driven in reverse and the semi-circular groove 190 is containing high pressure fluid. (When the vehicle is being driven forward, the high pressure fluid flows from the axial hole 217 to the axial hole 260, through the transverse holes or passageways just described.)

This common joining of the axial holes 217 and 260 is desirable in order that there may be at all times equal pressure of the high pressure fluid in the passageways 151 and 152 behind the pins 49. It is also necessary so that the high pressure in the spaces or slots 288 and 290, as shown in FIGURE 38, may always be equal.

Assuming the fluid pressure in the high pressure side of the system has increased, the force exerted on the pins 49 now becomes greater than the opposing force of spring 72, and the sleeve 23 is forced to the right as viewed in FIGURE 5. The annular groove 224 containing high pressure fluid, registers then with the annular groove 225. High pressure fluid then passes through the short radial holes 226, through the axial hole 227, through the radial hole 228, thence through the axial passageway 229, thence into the transverse hole 231, then to the axial hole 232, thence through the transverse passageway 233, and into the cylinder 153, forcing the piston 13 outwardly.

Simultaneously with the above, fluid from the cylinder 154, which at the conditions of the moment is in a low pressure state, flows out of the cylinder 154, through the transverse hole 236, through the axial hole 237, through the transverse hole 238, thence through the passageway 239, thence through the radial hole 240, and thence into the axial hole 241. From the hole 241, the fluid may flow through the short radial hole 242 and into the annular groove 235.

Due to the position of the sleeve 23 at the present moment, the annular groove 235 is registered with the annular groove 234. The low pressure fluid then flows into the annular groove 234 and from this groove, into the annular groove 243. Observing FIGURES 24 and 39, it will be seen that the low pressure fluid may flow around the groove 243 and then passes through the short radial grooves 244 and 265, and into either the axial hole 245 or the axial hole 266. Since in this condition of driving in reverse the semi-circular groove 189 of FIGURE 10, is at low pressure, the fluid from the cylinder 154 then flows through the axial hole 266, thence through the small radial holes 269, and pushes the valve ball 63 outwardly, against the pressure of the weak spring 77. The fluid then flows through the radial hole 270, through the short concentric hole 271, through the transverse hole 272 and into the annular groove 273. From this annular groove the low pressure fluid then flows through the axial hole 274 and into the semi-circular groove 189, and thence the fluid enters the presently low pressure side of the hydraulic circulatory system.

The low pressure fluid, under the conditions during which the vehicle is in reverse, fills the axial passageway 245 as well as the passageway 266, but cannot push the valve ball 63 outwardly which leads it to the radial hole 247, since the semi-circular groove 190 is now containing high pressure fluid. This high pressure fluid enters the hole 251, the annular groove 250, the transverse hole 249, and the short radial hole 246, and enters the radial hole 247. The high pressure fluid in the radial hole 247 then exerts a powerful opposing force on the ball valve 63, which cannot be overcome by the pressure of the low pressure fluid, which is at the moment in the axial hole 245.

Observe FIGURES 39 and 50. The two axial passageways 245 and 266 are connected by communicating passageways as will now be explained. The axial hole 267 connects with the hole 245, and the axial hole 268 connects with the hole 266, as shown. The transverse 275 intersects the axial hole 268, the transverse hole 276 intersects the holes 275 and 277 and the transverse hole 277 intersects the axial hole 267, as seen in FIGURE 50. The connection of the axial holes 245 and 266, by the interconnecting holes described, permits more rapid flow of low pressure fluid in the servo system and tends to better equalize pressure on opposing interior sides of the sleeve 23. And in the case of the position type servo, later to be described, the passageways described in FIGURE 50 which commonly connect the passageways 245 and 266, are necessary for the functioning of the servo.

As a final description of the functioning of the pressure sensitive servo C, the functioning of the transmission, when the vehicle is being driven in reverse and then experiences a lessening of the torque requirement on the drive shaft of the vehicle, will be described and explained. This condition results, for instance, if the vehicle is being driven in reverse, up a grade, and the grade becomes less steep.

If the torque requirements on the drive shaft of the vehicle decrease, the fluid pressure in the high pressure side of the circulatory system of the transmission decreases. When this occurs, the fluid pressure in the passageways 151 and 152 becomes less. The force of the spring 72 is then greater than the opposing fluid pressure on the inner ends of the pins 49, and the sleeve then moves toward the front of the transmission, or to the left as viewed in FIGURE 5A. Then high pressure fluid, from the semi-circular groove 190, flows through the axial hole 254, into the annular groove 255, thence into the transverse hole 256, then through the concentric hole 257 and pushes the valve ball 63 inwardly against the pressure of the spring 76. The high pressure fluid thence flows through the holes 258 and 259, into the axial hole 260, through the short radial hole 261, then into the annular groove 223, and into the annular groove 224, which is always registered with it.

When the sleeve 23 is moved to the left, as viewed in FIGURE 5, the annular groove 224 is registered with the annular groove 252. High pressure fluid then flows around the annular groove 252, through the short radial hole 253, thence into the axial hole 241, thence into the radial hole 240. From the hole 240, the fluid flows through the passageway 239, thence through the transverse hole 238, through the axial hole 237, and then through the radial hole 236 and into the cylinder 154. The high pressure fluid then begins to push the piston 13 outwardly.

Simultaneously, low pressure fluid, which is trapped in cylinder 153, flows through the radial hole 233, through the axial holes 232, thence through the transverse hole 231, thence through the passageway 229 and into the radial hole 228. From the radial hole 228, the low pressure fluid flows through the axial hole 227, and through the short radial hole 226 and into the annular groove 225. Since the sleeve, as before stated, is now in a forward, or leftward, position, the annular groove 225 is now registered with the annular groove 224. The groove 234 is always registered with the annular groove 243. Consequently, the low pressure fluid flows from the annular groove 225, into the annular groove 234, then into the annular groove 243, thence around the groove 243, and through the short radial passageways 244 and 265, as shown in FIGURE 24, and into the axial passageways 245 and 266, respectively. The axial holes 245 and 246 are commonly connected as shown in FIGURES 39 and 50, and as previously explained.

The low pressure fluid, from the cylinder 153, then flows through the passage 266, through the small radial hole 269, and forces the ball valve 63 outwardly, against the pressure of the weak spring 77. The low pressure fluid then flows through the radial hole 270, through the smaller hole 271, into the transverse hole 272 and into the annular groove 273. From the annular groove 273 the low pressure fluid flows through the hole 274 and into the semi-circular groove 189, which, when the vehicle is driven in reverse, contains low pressure fluid. The fluid from the cylinder 153 then enters the low pressure side of the hydraulic circulatory system.

The simultaneous flowing of high pressure fluid into the cylinder 154, and low pressure fluid out of the cylinder 153, causes the tilt plate 8 to rotate about its bearing bosses 203 and assume a lesser angle of tilt, or an angle that is nearer to perpendicular. When this occurs, the lengths of the reciprocation of the pistons 12, of the B end hydraulic motor become less, and the displacement per revolution of the B end hydraulic motor is decreased. Then the vehicle engine and the A end pump rotates fewer times for one rotation of the B end and the power ratio is decreased. This process of adjustment continues until the torque ratio is such, that the transmission can provide a lesser torque, which is now required on the drive shaft of the vehicle, with a fluid pressure in the high pressure side which is equal to the designed pressure, or the pressure required to oppose the force of the servo spring 72. The sleeve 23 is held in neutral position, as shown in FIGURES 5A and 5B.

Observing further, the construction and combination of parts in the servo system and hydraulic passageways just described, the passageways 228 and hole 240 are closed at their outer ends by the plugs 48, which are threadedly secured in place. The outer ends of the holes 232, 233, 236 and 237, are secured by the plugs 61 which are preferably welded. The holes 231 and 238 are secured by the plugs 61a, which are preferably welded in place. The axial holes 227 and 241 are closed at their outer ends by the plug 61 which are weldedly secured. The axial holes 267 and 268 are closed by the plugs 61, which are weldedly secured. The holes 245 and 266, 217 and 260 are closed at their outer ends by the plugs 61, which are weldedly secured. The holes 275, 276 and 277, as shown in FIGURE 50, and the holes 262, 263 and 264 as shown in FIGURE 44, are all closed at their outer ends by the plugs 61, which are weldedly secured in place. The ends of the fluid passageway tubes 58 are secured against hydraulic leakage by the O-rings 96 as shown in FIGURE 5A.

*Description of the Construction and Functioning of the Positioning Servo D Which Accommodates the Transmission to the Characteristics of the Vehicle Engine and Provides the Input to the Transmission of the Two Parameters of Throttle Position and Engine Speed*

As previously explained, the major portion of the adjustment of the transmission as to change in torque ratio is accomplished by the pressure sensitive servo C, which has just been described. However, it is mentioned in previous pages that the torque which an engine of the type normally used in vehicles, such as a piston type gasoline, or diesel engine, is capable of providing, varies in accordance with its speed. Also the throttle position varies the torque capability of the engine. The total of these two parameters, at any instant, determines the torque which an engine can and should provide at that instant. Further, it is obvious that if an engine is loaded at all times at its most desirable torque, greater economy and efficiency can be obtained. Also the wear and tear resulting from overloading an engine is avoided. The transmission of this invention provides a constant and automatic shifting of the torque ratio, so that the engine is actually loaded at all times at its torque of maximum efficiency, and is never overloaded. The method by which this transmission automatically varies its torque ratio, to provide and be affected by the two additional inputs or parameters of engine speed and throttle position, will now be described.

Observe FIGURES 4A, 4B, 5A, 5B, 33, 35, 36, 38, 41, 43, 45, 46, 47, 48 and 49. The throttle position as an input, is fed into the transmission by the throttle position rod 37, which is secured in place by the collar nut 38, threadedly secured in place (FIGURE 33). An O-ring 93 is disposed between the end of the nut 38 and the sleeve 36 to prevent leakage of hydraulic fluid. The outer end of the throttle position rod 37 is secured to the fuel feeding foot throttle of the vehicle by suitable linkage (FIG. 64) and the rod 37 is rotated in correlation to movement of the foot throttle. The upper end of the rod 37 is provided with a tongue 278, which is engaged in a cooperating groove in the cam stem 279 of the cam 35 so that cam 35 rotates with rod 37. Cam 35 bears against the ball 64 and as cam 35 is rotated, its surface bears against the ball 64. Ball 64 and the cylindrical sleeve 31 are moved in a linear direction, to the left, as viewed in FIGURES 4, 33, 38 and 39 in correlation to movement of cam 35.

The sleeve 31 is prevented from rotation by the pin 55 (FIGURE 33). One end of the pin 55 is secured in sleeve 31, and the outer end of the pin projects into a slot 280 in sleeve 30. This permits sleeve 31 to move in a linear direction for a limited distance, independently of the linear movement of the sleeve 30, but prevents the sleeve 31 from rotating within the sleeve 30.

Sleeve 30 is prevented from rotation by the pin 103, which is secured at its inner end in the sleeve 29. The outer end of the pin 103 projects into a slot 281, which is formed in the sleeve 30, permitting sleeve 30 to move linearly, in relation to sleeve 29, over a limited distance, but prevents rotation of sleeve 30 independently of sleeve 29.

The sleeve 29 is threadedly secured at its outer end, to the spring end stop 27. The spring end stop is also secured against rotation, after it has been screwed into place by the pins 104, which are shown by the dotted lines in FIGURE 34. The spring end stop 27 is provided with four fingers 282 (FIGURE 34), which project into cooperating slots 283, and are slideably disposed therein. As a result of the construction shown and described, the spring end stop 27 cannot rotate since its fingers 282 project into the slots 283. The sleeve 29 cannot rotate, because of the securing pins 104. The sleeve 30 cannot rotate because of the pin 103 and the slot 281. The sleeve 31 cannot rotate because of the pin 55 and the slot 280. However, as shown by the construction, the sleeve 29, the sleeve 30, and the sleeve 31, can all move, for a limited distance, independently of each other.

When the sleeve 31 is cammed to the left, as viewed in FIGURES 4A and 33, by the rotation of the cam 35, the thrust bearing 84 is moved with it. The right hand race of the thrust bearing bears against the sleeve 31 and is non-rotating. The left race of the thrust bearing 84 bears against the centrifugal weight supporting casting 33. The centrifugal weight supporting casting 33 is supported at its outer, or left end as viewed in FIGURE 33, by the two ears 284 and 285, which bear against the inner cylindrical surface of the shaft 9. The pins 50 are secured at their inner ends in cooperating holes formed in the ears 284 and 285, respectively. The outer ends of the pins are secured in the slots 286, which are formed in the interior cylindrical surface of the shaft 9. This construction permits the centrifugal weight supporting casting 33 to move in a linear direction, independently of the shaft 9, but the part 33 must rotate with the shaft 9.

Four centrifugal weights 34 are pivoted on the pins 51, secured in holes in ears 284 and 285.

The weights 34 are normally disposed in the position seen in FIGURE 46, when the engine of the vehicle is not running. The weights are held in this position by the spiral springs 78, as shown in FIGURE 47. The springs 78 are secured at one end to the pins 52, secured in cooperating holes in the ears 284 and 285. The spiral springs then coil around the pivoting pins 51 (FIGURE 47) and the outer ends of the spiral springs are secured to the pins 105 attached to weights 34.

The springs 78 exert force in a direction to resist the outward rotation of the weights 34 about their pivot pins 51. Small flanged rollers 60 are provided with flanges on their inner ends which are rotatably disposed on pins 54. The pins 54 are firmly secured in cooperating holes in the centrifugal weights 34. The rollers 60 are disposed in the cam slots 155.

When the engine rotates, and simultaneously rotates the shaft 9 with it, the centrifugal weights 34 are carried around with the shaft. The initial or assembled force of the spiral springs 78 prevents the movement or rotation of the centrifugal weights about their pivots, until the speed of rotation of the shaft reaches a certain predetermined figure, such as 350 or 400 revolutions per minute. When this speed is reached, the centrifugal force overcomes the initial force of the springs 78, and the centrifugal weights begin to rotate about their pivot pins 51. When this occurs, the rollers 60, which are carried on the centrifugal weights 34, begin to ride up the cam slots 155, in the casting 32.

It will be seen in FIGURES 33 and 49 that the cam slot casting 32 may slide linearly independently of the centrifugal weight supporting casting 33, for a certain limited distance, in a direction to the left, as viewed in said figures. When the centrifugal weights rotate about their pivot pins 51, due to centrifugal force, and the flanged rollers 60 roll up the cam slots 155, it will be seen that the cam groove casting 32 is caused or forced to move linearly, in a direction to the left, as viewed in FIGURE 33. This is due to the action of the centrifugal weights 34 and the rollers 60. This leftward movement is a movement which is relative to the centrifugal weight supporting casting 33. This relative movement remains the same, regardless of whether the centrifugal weight supporting casting 33 is moving or not. The amount of the movement in a linear direction of the cam slot casting 32, relative to the casting 33, depends on the amount of rotation of the centrifugal weights 34, about their pivot pins 51. The amount of this rotation of the centrifugal weights depends upon, and is a function of, the speed of rotation of the vehicle engine and the shaft 9, which is driven by it.

It will also be noted that the cam groove casting 32 surrounds or encompasses the centrifugal weight supporting casting 33, and the casting 32 rides upon and is supported by the casting 33. Thus, when the cam 35 is rotated, and the sleeve 31 is forced or cammed to the left, as viewed in FIGURE 33, it pushes the thrust bearing 84 to the left with it. The thrust bearing 84, in turn, pushes the centrifugal weight supporting casting 33 to the left ahead of it. As previously stated, the cam groove casting 32 rides upon the casting 33 and is supported by it. But the linear distance which the cam groove casting is moved to the left, relative to the centrifugal weight supporting casting 33, is determined by the rotational position of the centrifugal weights 34. The centrifugal weights 34, and their flanged rollers 60 which are disposed in the cam slots 155, in fact, form a positive mechanical linkage between the parts 33 and 32. This mechanical linkage holds the parts 32 and 33 in a definite relative linear position at any instant, in addition to sliding the part 33 to the left, relative to the part 32, as the centrifugal weights pivot about their pins.

Thus, when the centrifugal weight supporting casting 33 is moved to the left by the cam 35, the cam groove casting 32 rides upon it, and moves with it. The cam groove casting 32 may also move to the left, independently of the moving of the casting 33, and may independently move linearly, simultaneously with the moving of the casting 33.

The springs 73 bear with one end against the shaft 9, as shown, and the opposite ends of the springs 78 bear on the cam groove casting 32, as shown. The force of the springs 73 tends to move the cam groove casting 32 to the right, as viewed in FIGURE 33. Since the cam groove casting 32 is mechanically and positively linked to the centrifugal weight supporting casting 33 by the centrifugal weights 34 and rollers 60, as described, the force of the springs 73 also provides a tendency or force to move the casting 32 to the right, as viewed in FIGURE 33, against the centrifugal weight supporting casting 33. The right end of the casting 33, as viewed in FIGURE 33, bears against the thrust bearing 84, and exerts linear force through this thrust bearing, and against the sleeve 31. The sleeve 31 is then, as a result of these forces exerted by the springs 73, kept pressed into contact with the cam 35, through the ball 64. And when the sleeve has been pushed to the left by the rotation of the cam 35, and the cam 35 then returns to the position shown in FIGURE 38, the sleeve 31, the thrust bearing 84, the centrifugal weight supporting casting 33, and the cam groove casting 32, which rides upon the part 33, will all move to the right, as viewed in FIGURE 38, and will follow and keep contact with the cam 35, due to the pressure of the springs 73.

It will be seen that the cam groove casting 32 bears against the thrust bearing 83 as shown. The opposing side of the thrust bearing 83 rests against the end of the sleeve 30, bearing against the left side or shoulder of the rim 287 as shown. The spring 74 bears against the right shoulder of the rim 287, as viewed in FIGURES 33 and 38. The spring 74 is sufficiently strong to partially, though not entirely, neutralize the force of the four springs 73. The force of the spring 74 keeps the left end of the sleeve 30, as seen in FIGURE 38, pressed against the thrust bearing 83 at all times. The force of the spring 74 is sufficient to cause the sleeve 30 to quickly follow any movement into the left, as viewed in FIGURES 4 or 33, of the cam groove casting 32.

The part 32, as previously stated, moves linearly by riding on the part 33 and, in addition, moves independently an additional amount, by the further movement caused by the action of the centrifugal weights 34 and rollers 60. In other words, the linear position of the cam groove casting 32 is at all times the sum of the linear movement of the sleeve 31, due to its being cammed to the left by the cam 35, and the separate and additional linear movement resulting from the pivoting and camming action of the centrifugal weights 34 and rollers 60. The camming action and movement of the sleeve 31, and the equal movement of the casting 33, is due to throttle position.

The independent linear movement of the cam groove casting 32, relative to the casting 33, is due to centrifugal action, in correlation with engine rotation speed. Furthermore, as seen from the construction and functioning of this combination of parts, the linear position of the cam groove casting 32, at any time, is the result of the sum of the two values, or parameters, of throttle position and engine speed. Also, since the sleeve 30 follows the linear position of the cam groove casting 32, at all times, due to the pressure of the spring 74, the linear position of the sleeve 30 also is equal to the sum of the two parameters of throttle position and engine speed.

The sleeve 30 is a valving sleeve, or pilot valve, for the positioning type servo D. The sleeve 30 opens and closes hydraulic fluid valves, in such a way, that the sleeve 29 at all times follows the controlling valving sleeve 30. The manner by which this is accomplished will now be described.

Observe FIGURES 4A, 4B, 5A, 5B, 33, 34, 35, 36, 38, 39 and 43. Suppose the sleeve 30 is moved to the left as viewed in FIGURE 4, due to the throttle position and speed of rotation input which have been described. It will be seen that the slot 288, in the sleeve 30, is at all times filled with high pressure fluid, which fluid enters through the axial hole 260 and the passage 289, as shown in FIGURE 38. Also the slot 290 is at all times filled with high pressure fluid through the axial hole 217 and the passage 291. Viewing FIGURE 39, the slot 292 is at all times filled with low pressure fluid, the fluid entering the axial hole 245 and passage 293. Also the slot 294 is filled at all times with low pressure fluid, the fluid entering through the axial hole 266 and passage 295.

When the sleeve 30 moves to the left, the passage 296 is uncovered and high pressure fluid flows through the passage 296, into the passage 297, and through the passage 298, and into the annular space 299. This high pressure fluid bears against the sides of the annular rim 300, which is integrally formed with the sleeve 29, and forces the sleeve in a direction to the left, as viewed in FIGURE 38. The threaded collar 45 confines the high pressure fluid on one side as seen.

Simultaneously, viewing FIGURE 39, when the sleeve 30 moves to the left, the passage 301 is uncovered. Then the fluid in the annular space 304, which space is now decreasing in volume, may now flow out of this annular space, through the passage 303, into the passage 302, then into the passage 301 and into the low pressure slot 292. From this slot 292 the low pressure fluid flows through passage 293, into the axial hole 245, through radial hole 246 and forces the valve ball 63 upward, against the pressure of the weak spring 77, provided the vehicle is being driven forward. It will be recalled if the vehicle is being driven forward, the semi-circular groove 190 is the low pressure groove, and the fluid pressure in the hole 247 is low pressure. The fluid in this case, then flows through the hole 247, through the concentric hole 246, through the transverse hole 249, and around the annular groove 250. The fluid then flows into the hole 251 and into the semi-circular groove 190 and into the low pressure side of the circulatory system.

If the vehicle is being driven in reverse, the fluid in the semi-circular groove 190, and in the hole 247, is high pressure and the ball 63 is forced firmly against its seat, and cannot be forced back from its seat by low pressure fluid in the hole 246. In this case the low pressure fluid as seen in FIGURES 39 and 50, flows through the hole 267, thence through the hole 277, through hole 276, then through hole 275, then through hole 268 and then into the hole 269. When the vehicle is being driven in reverse, the fluid in the semi-circular groove 189 and in the hole 270 is low pressure.

The fluid in the passage 269, then forces the valve ball 63 outwardly from its seat and compresses the weak spring 77. The fluid enters the hole 270, flows through the concentric hole 271, through the transverse hole 272, thence into the annular groove 273, thence through hole 274, and into the semi-circular groove 189, which is now low pressure. From this groove the fluid joins the low pressure side of the hydraulic circulatory system.

As a result of the above described hydraulic fluid valving action, and the related hydraulic servo functioning, the sleeve 29 is forced to follow the movement of the sleeve valve 30 to the left, as viewed in FIGURE 4A, to the extent and distance that the sleeve 30 moves, and to stop when the sleeve 30 stops. When the sleeve 30 stops its movement to the left, the sleeve 29 not only stops also but is hydraulically locked into this position until the sleeve 30 moves again.

The action resulting when the sleeve 30 moves in the opposite direction, or to the right as viewed in FIGURE 38, will be discussed. If the sleeve 30 moves to the right, the passage 305 is uncovered. The high pressure fluid from the slot 290 will then flow through the passage 305, into the passage 306 and through the passage 307 and into the angular space 304. The high pressure fluid then bears against the left side of the rim 300, which is integrally formed with the sleeve 29, and forces the sleeve 29 to the right. Of course in this position shown in drawing of FIGURE 38, the sleeve 29 is already at its extreme rightward position, and can travel no farther. But in the description in the paragraph above, it is supposed that neither the valving sleeve 30, nor the sleeve 29 is at its extreme rightward position.

In order to prevent hydraulic blocking, the low pressure fluid must be able to flow out of the annular space 299. When the sleeve 30 is moved to the right and the passage 308 is uncovered and registers in whole or in part with the slot 294, low pressure fluid now flows through the passage 309, thence through the passage 308, and into the slot 294.

If the vehicle is being driven forward, the semi-circular groove 190 is the low pressure groove. Observing FIGURES 34 and 50, the low pressure fluid flows from the slot 294, through the passage 295 into the passage 266, through the hole 268, then into the hole 275, into the hole 276, thence into the hole 277, then into the hole 267, and into the passage 246. At this point the low pressure fluid forces the valve ball 63 out of its slot and flows into the hole 247, into the concentric hole 248, through the transverse hole 249, and around the annular groove 250. The fluid then flows through the hole 251 and into the semi-circular groove 190. From this groove 190 the low pressure fluid returns to the low pressure side of the circulatory system.

Now consider the case of the vehicle being in reverse. In this case the fluid in the semi-circular groove 190 is high pressure and the fluid in the semi-circular groove 189 is low pressure. When this is true the low pressure fluid flows from the passageway 266, into the passage 269 and pushes the ball 63 from its seat. The fluid then flows into the hole 270, then into the smaller concentric hole 271, through the transverse hole 272, into the annular groove 273, thence through the hole 274 and into the semi-circular groove 189. From this groove 189 the low pressure fluid then flows into the low pressure side of the circulatory system.

It will be seen that as a result of the valving and hydraulic servo action described, when the sleeve valve 30 moves to the right, as viewed in FIGURE 39, the sleeve 29 is forced to move with it and to cease moving when the sleeve valve 30 has ceased to move. Also, when the valving sleeve 30 is stationary, the sleeve 29 is hydraulically locked into position and cannot move until the valving sleeve 30 starts to move again.

As before stated, the spring end stop 27 is threadedly secured to the sleeve 29 and must move as the sleeve 29 moves. It is obvious that as the spring end stop moves to the left, as viewed in FIGURES 4A, 4B, 5A and 5B, the pressure sensitive servo spring 72 is shortened. This means that the initial compression of the spring 72, due to its shorter length, is greater and it will exert a greater force against the threaded ring 25 and the sleeve 23. When this occurs, the hydraulic fluid power in the spaces 151 and 152, as shown in FIGURE 38, must be greater, in order to exert enough pressure on the inner ends of the pins 49 to cause the pressure of the outer ends of the pins, on the sleeve 23, to balance the increased pressure of the spring 72. When this occurs, there is then established a higher hydraulic fluid pressure level, about which the pressure sensitive servo C functions, as it varies the power ratio between the "A" and the "B" end of the transmission.

A higher fluid pressure level, about which the pressure sensitive servo must function, means that the engine is loaded at a greater torque.

It will then be seen that when the throttle position, and speed of the engine, are introduced into the transmission, by the methods and means described, the concrete result of this is the shortening or lengthening of the servo spring 72. This, in turn, varies the pressure level on the high pressure side of the circulatory system, at which the transmission functions. Thus a "vernier" correction is introduced into the transmission, which will cause the transmission to not only automatically vary its torque ratio, to accommodate to the torque requirement on the vehicle drive shaft, but there will be also automatically introduced the additional corrections or adjustments due to throttle position, and speed of the engine.

Several additional features, which are necessary or desirable on the transmission will now be described.

A two-way or double acting, high pressure release valve is provided which is located in the "A" end, or hydraulic pump. Observe FIGURES 12, 14, 38 and 56. It will be seen that the hole 311 is formed in the hydraulic valving and passageway casting 2. This hole begins at the upper end of the semi-circular groove 186, as viewed in FIGURE 14 and extends for a distance to the casting 2. A hole 312 is also formed in the casting 2. This hole begins at the upper end of the semi-circular groove 185, as viewed in FIGURE 14, and extends for a distance into the casting 2. A cylindrical plug 40 is disposed in the hole 313, which is formed in the casting 2. The plug 40 is seated against the openings, formed by the holes 311 and 312, by the pressure of the spring 75 as shown. The upper end of the spring 75 is retained by the plug 57, which is threadedly secured in place as shown. A small hole 314 is formed in the casting 2, and extends from the outer surface or space of the part 2, to the hole 314 as shown. The hole 314 permits the free flow of oil or fluid into and out of the hole 313, and prevents the hydraulic blocking of the reciprocation of the plug 40, when this plug is forced upward by excess hydraulic fluid pressure.

When the vehicle is being driven forward, as before stated, the semi-circular groove 185 is the high pressure groove. A sudden excess of high pressure in the high pressure side of the hydraulic circulatory system, will cause high pressure fluid, which fills the hole 311 to force the cylindrical plug 40 upward, against the pressure of the spring 75. The high pressure fluid will then escape from the hole 311, pass under the raised lower end of the plug 40, and flow into the hole 312a; from the hole 312 the fluid flows into the semi-circular groove 185, which, when the vehicle is driven forward, is in the low pressure side of the circulatory system. Thus the high pressure fluid may bypass from the high pressure to the low pressure side.

When the vehicle is being driven in reverse, as before stated, the semi-circular groove 185 is the high pressure groove. A sudden excess of high pressure in the high pressure side of the hydraulic circulatory system, will cause high pressure fluid which now fills the hole 312, to force the cylindrical plug 40 upward against the pressure of the spring 75. The high pressure fluid will then escape from the hole 312, flow under the raised lower end of the plug 40, and flow into the hole 311. From the hole 311 the fluid then flows into the semi-circular groove 186, which, when the vehicle is being driven in reverse, is in the low pressure side of the hydraulic fluid circulatory system. Thus the high pressure fluid, when the vehicle is being driven in reverse, and when the high pressure side experiences a sudden high pressure surge, may bypass from the high pressure groove 185 to the low pressure groove 186.

The feature of a manually operated hydraulic bypassing and hydraulic valve is provided, and now will be described. Observe FIGURES 10, 32, 33 and 37.

A valve plug 39 is disposed in a cooperating hole 315, which is formed in the hydraulic valving and fluid passageway casting. A small hole 316 intersects with a second small hole 317 as shown in FIGURE 33, and thus forms a passageway from the space 318 to the outside of the casting 2. This prevents high pressure fluid from building up beneath the inner end of the valve plug 39. An O-ring 94 prevents hydraulic fluid leakage to the outside of the transmission, around the cylindrical plug 39. An annular groove 319, of semi-circular cross-section, is formed around the lower end of the cylindrical plug 39, as shown. Two pins 56 are inserted into the cooperating holes, as shown. The pins 56 extend into the semi-circular groove 319, as shown in FIGURE 37, and permit the plug 39 to rotate, but prevent the plug from slipping linearly from its position.

A transverse hole 320 is formed in the cylindrical plug 39, as shown in FIGURES 32 and 33. Holes 321 and 322 are formed in the casting 2, in oblique directions, as shown in FIGURE 32, and these holes intersect the larger holes 315.

The cylindrical plug 39 may be rotated in the hole 315 by external manual means (not shown).

The hole 321 leads from the semi-circular groove 189 and the hole 322 leads from the semi-circular groove 190. When the cylindrical plug is rotated to the position shown in FIGURE 32, the transverse hole 320 does not register with the holes 321 and 322, and there can be no flow of hydraulic fluid, from this semi-circular groove 189, to the semi-circular groove 190, or vice-versa, through the holes or passageways 321, 320 and 322. But when the cylindrical plug 39 is rotated 90 degrees from that position shown in FIGURE 32, the transverse hole 320 then registers with the holes 321 and 322. Then the hydraulic fluid may flow from the semi-circular groove 189, to the semi-circular groove 190, through the holes or passageways 321, 320 and 322. Or the fluid may flow in the reverse direction, from the semi-circular groove 190, to the semi-circular groove 189.

By this construction, the fluid may bypass from the high pressure side to the low pressure side of the circulatory system and the transmission may be thrown into hydraulic neutral, by this manual means.

Another feature of this transmission is also included, which consists of a hydraulic bypass for small hydraulic flow, which is tied to the foot throttle position linkages. This bypass permits the vehicle engine, when connected to the transmission of this invention, to be started and to idle at low speed without propelling the vehicle. Yet when the foot of the driver bears down slightly upon the foot throttle, this bypassing arrangement is shut off, and a positive hydraulic drive propels the vehicle, with no slippages. Observe FIGURES 12, 14, 33 and 55.

The collar nut 38 is threadedly secured in place, and secures the sleeve 36 into position, as shown. The O-ring 92 prevent hydraulic fluid leakage around the outer cylindrical surface of the collar nut 38 and sleeve 36. The throttle position rod 37 is rotatably secured within the parts 36 and 38, and is retained by the shoulder 324 as shown. Narrow elongated holes 325, 326 and 327 are transversely formed across the throttle position rod 37, as shown, V-shaped grooves 328 and 329 are formed in the side of the sleeve 36 as shown. The holes 330 and 331 are formed in the casting 2, as shown. The hole 330 leads for a distance into the casting 2, from the semi-circular groove 186, and the hole 331 leads for a distance into the casting 2, from the semi-circular groove 185. The holes 330 and 331 are partially intersected by the sleeve 36 as shown in FIGURE 55.

When the throttle position rod 37 is in the rotational position shown, the hydraulic fluid may freely flow in limited quantities, from the semi-circular groove 186, when the vehicle is being driven forward. The fluid in this case flows through the hole 330, into the V-shaped groove 328, thence through the narrow transverse holes 325, 326 and 327, thence into the V-shaped grooves 329, then into the hole 331 and from this hole into the semi-circular groove 185.

The fluid flows in the direction just described when the transmission is set to drive the vehicle forward, for then, as previously explained, the semi-circular groove 186 is on the high pressure side of the circulatory system.

When the transmission is set to drive the vehicle in reverse, the semi-circular groove 185 is on the high pressure side of the circulatory system. Then the fluid, when the engine is running at idling speed, and the foot of the driver is not pressed down on the fuel feeding foot throttle, flows from the high pressure to the low pressure side in the reverse direction. In this case, the fluid flows from the semi-circular groove 185, into the hole 331, into the V-shaped groove 329, thence through the transverse holes 325, 326 and 327, into the V-grooves 328, thence into the hole 330 and into the semi-circular groove 186.

It will be readily seen, since the flat holes 325, 326 and 327 are very thin, and since the bottom of the V-grooves 328 and 329 match the narrow thickness of the holes, that a comparatively small rotation of the throttle position rod 37 will be sufficient to cut off the flow of hydraulic fluid through the passageways mentioned. Thus, when the driver of the vehicle presses down very slightly on the foot throttle, a sufficient rotation has been given to the throttle position rod to cut off all by-passing of fluid. Thus, even before the engine has accelerated beyond idling speed, the transmission is driving the vehicle with positive hydraulic compression. It will also be seen that the foot throttle may be pressed down the full remaining distance of its travel, without the engine idling by-passing arrangement again coming into operation.

As a further special hydraulic feature of this invention, the replenishing valves will be described. Observe FIGURES 12 and 14.

It is obvious that in the hydraulic circulatory system of the transmission there is a certain amount of hydraulic fluid leakage, out of the high pressure spaces and passageways, to lower pressure passageways or areas, since the volumetric efficienty is not 100 percent. Some of this leakage will be from the hydraulic circulatory system or passageways, with the fluid escaping into the reservoir, or low pressure supply of fluid, which fills the lower portion of the cylindrical housing. This escape of leakage or fluid must be replenished. This is accomplished by an intake valving system, which will now be described.

The replenishing occurs at all times in the low pressure side of the circulatory system. If the vehicle is being driven forward, the semi-circular groove 186 is the high pressure groove. In this case the hydraulic fluid losses through leakage are replenished into the low pressure semi-circular groove 185. The fluid losses from the circulatory system, as they occur, can create a pressure in the low pressure side of the circulatory system which is at a lower pressure than atmospheric pressure, due to hydraulic leakage. This, in turn, causes the fluid in the reservoir to flow, due to the fluid in the fluid reservoir being at atmospheric pressure, and hence at a higher pressure than that of the low pressure side of the circulatory system, from the reservoir (not shown) into the low pressure side of the circulatory system. This flow enters the hole 330, which connects with the annular groove 331, which is formed in the threaded plug 44 as shown. The fluid then flows through the transverse hole 332, then through the concentric hole 333. The fluid then pushes back the valve ball 63, against the pressure of the weak spring 77, and flows into the larger hole 334. From this hole 334, the fluid flows through the hole 335, and then enters the semi-circular groove 185, and is thus replenished into the low pressure side of the circulatory system.

If the engine is driving the vehicle in reverse, the semi-circular groove 186 is the low pressure groove and is in the low pressure side of the circulatory system. Observe FIGURES 12 and 14. The replenishing fluid then flows, when required, from the fluid pool or reservoir, through the hole 336, and into the annular groove 337, which is formed in the part 44, as shown. The fluid then flows through the transverse hole 338, and through the small concentric hole 339. From this hole, the fluid pushes the valve ball 63 out of its seat, against the pressure of the weak spring 77, and enters the larger hole 340. From the hole 340, the fluid flows through the hole 341, and into the semi-circular groove 186, and is thus replenished into the low pressure side of the circulatory system.

Another unique feature of the invention will now be described. This feature can best be shown by observing FIGURE 12.

Figure 2:
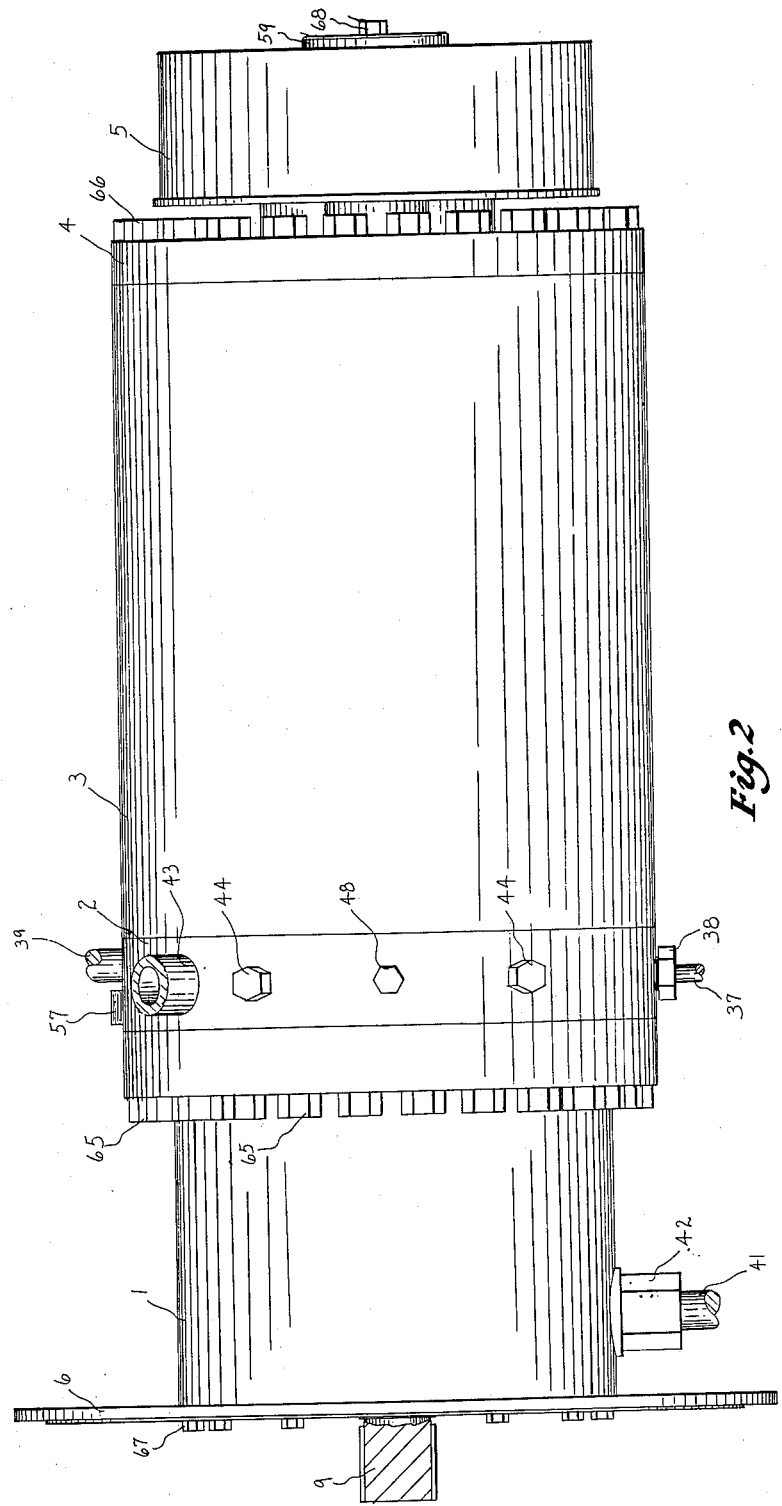
FIGURE 2 is an elevational view.
Figure 3:
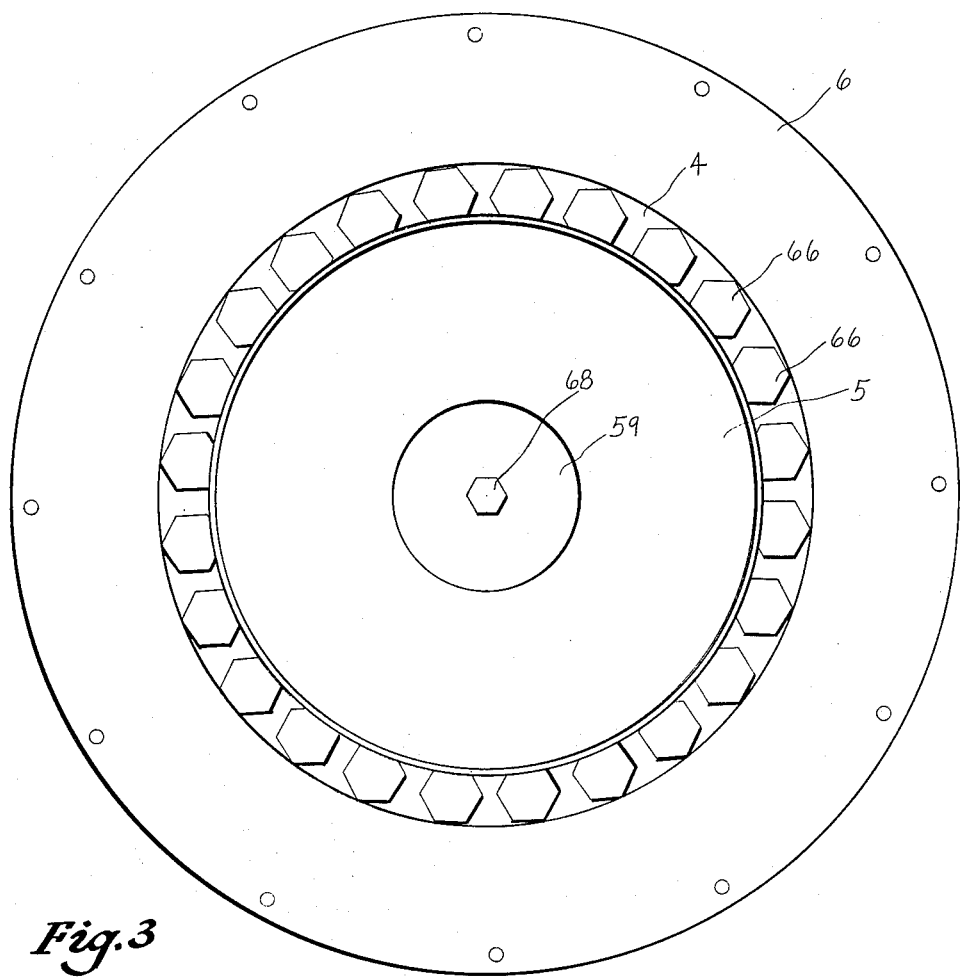
FIGURE 3 is a rear view of the transmission.

In FIGURE 2, the tight fittings 43 are shown threadedly secured in the hydraulic valving and fluid passageway casting 2. The passage 342 leads from the upper pipe fitting 43 to the passage 193. The passage 193 leads from the "A" end to the "B" end, and is the high pressure side when the vehicle is being driven forward. The passage 343 leads from the lower pipe fitting 43, as viewed in FIGURE 12, to the passage 194. The passage 194 leads from the "A" end to the "B" end, and is the low pressure side when the vehicle is being driven forward.

By the use of these pipe fittings hydraulic fluid may be introduced from an outside source (not shown) to rotate the "B" end of the transmission. In this case if the high pressure inlet source of outside supply fluid is attached to the fitting 43 leading to the passage 342, and if the low pressure outlet to the outside fluid source is connected to the fitting 43 which leads to the passage 343, the "B" end is driven in the same direction as when the vehicle is being driven forward. However, if the outside high pressure fluid inlet source is attached to the pipe fitting 43 which leads to the passage 343, and the low pressure outlet to the outside fluid source is attached to the fitting 43 which leads to the passage 342, the "B" end is driven in the same direction as when the vehicle is being driven in reverse.

When utilizing the transmission in this manner, the "A" end is manually set to hydraulic neutral and is thus taken out of operation.

In this functioning of the transmission, the "B" end functions in cooperation with the pressure sensitive servo sleeve, and the "B" end is then automatically varied in displacement adjustment, in accordance with the torque on the output shaft of the transmission. But, in this use of the transmission, the positioning servo D does not function and operate, but remains at its minimum fluid pressure adjustment, since the servo D is actuated by the fuel feeding and throttle position, and speed of rotation, of the "A" end. Since the engine is not being used in this case, and the "A" end is not rotating, these two inputs are not involved and the "vernier" correction of the positioning servo D, which adjusts the transmission to the speed of rotation and throttle position of the engine, is not used.

We wish it to be understood that we do not consider the invention limited to the precise details of structure shown and set forth in this specification, for obvious modifications will occur to those skilled in the art to which the invention pertains.

We claim:

1. In a hydraulic power transmission for use in interconnecting a rotational source of power including an internal combustion engine having a throttle, said power source having a driving shaft, and a rotational load having a driven shaft, the improvement comprising: first means displacing a hydraulic fluid under pressure driven by said driving shaft, second means positively displacing said fluid and connected to said driven shaft, third means sensitive to incremental changes in transmitted torque to said load by said second means for varying the effective displacement of said second means, fourth means sensitive to the rotational speed of said power source, and fifth means sensitive to the throttle adjustment of said engine, said third, fourth and fifth means independently varying the effective displacement of said second means.

2. In a hydraulic transmission for use in connecting a source of rotational power with a varying rotational load, said power source including an internal combustion engine having throttle means, the improvement comprising: an axial piston pump means displacing a hydraulic fluid and driven by said power source, axial piston motor means driven by said fluid of positive variable displacement type, a pivotally mounted tilt plate for varying the displacement of said motor means, third means for controlling the pivotal position of said tilt plate sensitive to incremental changes in torque transmitted to said load, fourth means for automatically controlling the pivotal position of said tilt plate sensitive to the rotational speed of said power source, and fifth means for controlling the pivotal position of said tilt plate sensitive to the position of said throttle means.

3. In a hydraulic transmission for use in connecting a source of rotational power with a varying rotational load, said power source including an internal combustion engine having throttle means, the improvement comprising: an axial piston pump means displacing a hydraulic fluid and driven by said power source, axial piston motor means driven by said fluid of positive variable displacement type, means including a pivotally mounted tilt plate for varying the displacement of said motor means, third means for controlling the pivotal position of said tilt plate sensitive to incremental changes in torque transmitted to said load, fourth means for automatically controlling the pivotal position of said tilt plate responsive to the speed of said power source, and fifth means for controlling the pivotal position of said tilt plate sensitive to the position of said throttle means; said third means including a valve having a spring exposed to the effective pressure of said fluid, said fourth and fifth means each including means for varying the length of said spring.

4. In combination, an internal combustion engine having a throttle, and capable of operating at a predetermined optimum speed, an automatic hydraulic transmission coupled to said engine and driving a variable load, said transmission having a hydraulic pump driven by said engine, a hydraulic motor of variable positive displacement type, said hydraulic motor being connected to said load, first means for varying the displacement of said motor responsive to changes in transmitted torque to said load by said motor, second means for varying the displacement of said motor sensitive to the adjusted position of said throttle, and third means for varying the displacement of said motor means sensitive to the rotational speed of said engine.

References Cited in the file of this patent

UNITED STATES PATENTS

| | | |
|---|---|---|
| 1,099,238 | Day | June 9, 1914 |
| 1,981,805 | Kacer et al. | Nov. 20, 1934 |
| 2,161,439 | Thoma | June 6, 1939 |
| 2,257,724 | Bennetch | Oct. 7, 1941 |
| 2,337,499 | Roth | Dec. 21, 1943 |
| 2,374,588 | Doran | Apr. 24, 1945 |
| 2,465,485 | Robinson | Mar. 29, 1949 |
| 2,500,580 | Segsworth | Mar. 14, 1950 |
| 2,658,343 | McGill | Nov. 10, 1953 |
| 2,737,020 | Berry | Mar. 6, 1956 |
| 2,874,533 | Schott | Feb. 24, 1959 |